US010646951B2

(12) United States Patent
Goto et al.

(10) Patent No.: US 10,646,951 B2
(45) Date of Patent: May 12, 2020

(54) WELDING DEVICE

(75) Inventors: Akira Goto, Utsunomiya (JP); Shinichi Miyasaka, Utsunomiya (JP); Tatsuro Ikeda, Utsunomiya (JP); Takahiro Morita, Utsunomiya (JP)

(73) Assignee: HONDA MOTOR CO., LTD., Tokyo (JP)

(*) Notice: Subject to any disclaimer, the term of this patent is extended or adjusted under 35 U.S.C. 154(b) by 883 days.

(21) Appl. No.: 13/876,590

(22) PCT Filed: Sep. 27, 2011

(86) PCT No.: PCT/JP2011/072121
§ 371 (c)(1),
(2), (4) Date: Mar. 28, 2013

(87) PCT Pub. No.: WO2012/043587
PCT Pub. Date: Apr. 5, 2012

(65) Prior Publication Data

US 2013/0180961 A1 Jul. 18, 2013

(30) Foreign Application Priority Data

Sep. 30, 2010 (JP) ................................ 2010-222769
Oct. 1, 2010 (JP) ................................ 2010-224301
Oct. 1, 2010 (JP) ................................ 2010-224303

(51) Int. Cl.
*B23K 11/11* (2006.01)
*B23K 11/36* (2006.01)
(Continued)

(52) U.S. Cl.
CPC ........... *B23K 11/115* (2013.01); *B23K 11/315* (2013.01); *B23K 11/36* (2013.01); *B23K 37/0408* (2013.01); *B23K 37/0443* (2013.01)

(58) Field of Classification Search
CPC . B23K 11/115; B23K 11/315; B23K 37/0443; B23K 37/0408; B23K 11/36
(Continued)

(56) References Cited

U.S. PATENT DOCUMENTS 3,415,973 A * 12/1968 Verbeck ................ B23K 11/20
219/118
3,582,602 A * 6/1971 Ettinger ................ B23K 9/206
219/98
(Continued)

FOREIGN PATENT DOCUMENTS

| | | |
|---|---|---|
| CN | 102458751 | 5/2012 |
| DE | 4323148 | 1/1995 |

(Continued)

OTHER PUBLICATIONS

Chinese Office Action with English translation dated Oct. 22, 2014, 15 pages.

(Continued)

*Primary Examiner* — Ibrahime A Abraham
*Assistant Examiner* — John J Norton
(74) *Attorney, Agent, or Firm* — Rankin, Hill & Clark LLP

(57) ABSTRACT

A welding device includes a lower tip and an upper tip, as welding tips, and pressuring members. The pressuring members are supported by a support member disposed in the upper tip. The pressuring members are displaced by the action of pressuring member displacement mechanisms and, together with the upper tip, come into contact with a metal plate arranged on the outermost part of a laminated body.

5 Claims, 79 Drawing Sheets

(51) Int. Cl.
*B23K 11/31* (2006.01)
*B23K 37/04* (2006.01)

(58) Field of Classification Search
USPC .................................... 219/86.33, 119, 78.01
See application file for complete search history.

(56) References Cited

U.S. PATENT DOCUMENTS

| | | | | | |
|---|---|---|---|---|---|
| 3,997,755 | A * | 12/1976 | Moliner | B23K 11/0053 | 219/119 |
| 4,543,462 | A * | 9/1985 | Rossell | B23K 11/3009 | 219/119 |
| 4,831,228 | A * | 5/1989 | Schumacher | B23K 11/31 | 219/86.22 |
| 4,908,938 | A * | 3/1990 | Thorwarth | B23K 11/002 | 219/119 |
| 5,187,340 | A * | 2/1993 | Machule | B29C 65/04 | 156/272.2 |
| 5,714,730 | A * | 2/1998 | Geiermann | B23K 11/315 | 219/86.25 |
| 6,037,558 | A * | 3/2000 | Geiermann | B23K 11/14 | 219/86.25 |
| 6,825,436 | B1 * | 11/2004 | Aoyama | B23K 11/002 | 219/117.1 |
| 7,633,032 | B2 * | 12/2009 | Wang | B23K 11/115 | 219/161 |
| 2003/0192863 | A1 * | 10/2003 | Wang | B23K 11/11 | 219/117.1 |
| 2004/0238500 | A1 * | 12/2004 | Brown | B23K 35/0205 | 219/119 |
| 2005/0284847 | A1 * | 12/2005 | Aoyama | B23K 9/20 | 219/93 |
| 2008/0240895 | A1 * | 10/2008 | Aoyama | B07C 5/08 | 414/331.13 |
| 2009/0302010 | A1 | 12/2009 | Goto et al. | | |
| 2012/0074104 | A1 | 3/2012 | Goto et al. | | |

FOREIGN PATENT DOCUMENTS

| | | | | |
|---|---|---|---|---|
| FR | 2878175 | | 5/2006 | |
| FR | 2878175 | A1 * | 5/2006 | B23K 11/115 |
| GB | 1152236 | | 5/1969 | |
| JP | 59-010984 | | 1/1984 | |
| JP | 07-003875 | U | 1/1995 | |
| JP | 07-136771 | | 5/1995 | |
| JP | 2001-259854 | | 9/2001 | |
| JP | 2003-211271 | | 7/2003 | |
| JP | 2005-088069 | | 4/2005 | |
| JP | 2006-341260 | | 12/2006 | |
| JP | 2006341260 | A * | 12/2006 | |
| JP | 3894545 | | 3/2007 | |
| JP | 2008-023554 | | 2/2008 | |
| JP | 2009-262159 | | 11/2009 | |
| JP | 2012-011398 | | 1/2012 | |

OTHER PUBLICATIONS

Japanese Office Action with partial English translation dated Jan. 7, 2014, JP Application No. 2010-224301, four pages.

European Office Action dated Sep. 16, 2014, 3 pages.

Extended European Search Report dated Dec. 16, 2014, 6 pages.

Chinese Office Action and Search Report Including English Translation, dated Jun. 15, 2015, 16 pages.

Indian Office Action dated Jul. 30, 2018, 7 pages.

* cited by examiner

WELDING DEVICE

TECHNICAL FIELD

The present invention relates to a welding apparatus (device) for welding a stacked body of a plurality of workpieces.

BACKGROUND ART

FIG. 74 is a schematic front view for illustrating a spot welding process for joining high resistance workpieces 1, 2, which are made of a so-called high tensile strength steel and have a large thickness to exhibit a high electric resistance. The two high resistance workpieces 1, 2 are stacked to form a stacked body 3. The stacked body 3 is gripped and pressed between a first welding tip 4 and a second welding tip 5. When the first welding tip 4 and the second welding tip 5 are energized, a portion is heated to form a melted portion 6 in the vicinity of the contact surface between the high resistance workpieces 1, 2. Then, the melted portion 6 is solidified to generate a solid phase, which is referred to as a nugget.

Since the high resistance workpieces 1, 2 have the high electric resistance, a large amount of Joule heating is generated in the vicinity of the contact surface during the energization, so that the melted portion 6 grows larger as shown in FIG. 75 in a relatively short time. Therefore, the melted portion 6 is liable to be scattered (spatter generation is liable to be caused). Thus, in the spot welding process for joining the high resistance workpieces 1, 2, it is necessary to highly accurately control a welding current in view of preventing the spatter generation. However, such control cannot be achieved easily. This problem is caused even in the case of joining a thinner high tensile strength steel workpiece.

In the case of joining three or more workpieces, the workpieces may contain different materials and may have different thicknesses. For example, as shown in FIG. 76, an outermost workpiece (a low resistance workpiece 7) may have the smallest thickness. Incidentally, in FIG. 76, the low resistance workpiece 7 is made of a mild steel, exhibits a low electric resistance, and is stacked on the high resistance workpieces 1, 2 shown in FIGS. 74 and 75 to form a stacked body 8.

In the process of spot welding the stacked body 8, a larger amount of Joule heating is generated in the vicinity of the contact surface between the high resistance workpieces 1, 2 than in the vicinity of the contact surface between the low resistance workpiece 7 and the high resistance workpiece 2. This is because a higher contact resistance is generated in the vicinity of the contact surface between the high resistance workpieces 1, 2.

Therefore, in the stacked body 8, a melted portion 9 is developed first in the vicinity of the contact surface between the high resistance workpieces 1, 2. As shown in FIG. 77, the melted portion 9 may grow larger before another melted portion is developed in the vicinity of the contact surface between the low resistance workpiece 7 and the high resistance workpiece 2. When the energization is continued to form the other melted portion in the vicinity of the contact surface between the low resistance workpiece 7 and the high resistance workpiece 2, the spatter generation may be caused in the vicinity of the contact surface between the high resistance workpieces 1, 2.

However, if the energization is stopped, the melted portion and hence the nugget are not grown to a sufficiently large size in the vicinity of the contact surface between the low resistance workpiece 7 and the high resistance workpiece 2. Accordingly, a desired bonding strength is hardly achieved between the low resistance workpiece 7 and the high resistance workpiece 2.

This problem may occur also with an indirect feeding type welding apparatus.

FIG. 78 is a schematic side view of a stacked body 14 of three the metallic plates 11, 12, 13 gripped by an indirect feeding type welding apparatus 15. The indirect feeding type welding apparatus 15 has a first welding gun (not shown) for supplying a welding current and a second welding gun 16 for welding the stacked body 14. The welding current is transferred from the first welding gun through an external feed terminal 17 to the second welding gun 16. Such a structure of the indirect feeding type welding apparatus 15 is known from Japanese Laid-Open Patent Publication No. 07-136771, Japanese Laid-Open Utility Model Publication No. 59-010984, etc.

Specifically, the first welding gun has a positively (+) polarized upper electrode 18 and a negatively (−) polarized lower electrode 19. The second welding gun 16 has an upper tip 20 corresponding to the first welding tip and a lower tip 21 corresponding to the second welding tip. The external feed terminal 17 is prepared by interposing an insulator 23 between conductive terminals 22*a*, 22*b*. The upper electrode 18 and the upper tip 20 are electrically connected by the conductive terminal 22*a* and a lead 24, and the lower electrode 19 and the lower tip 21 are electrically connected by the conductive terminal 22*b* and a lead 25.

In the welding process, the stacked body 14 is gripped between the upper tip 20 and the lower tip 21 of the second welding gun 16. The welding current flows through the stacked body 14 from the upper tip 20 to the lower tip 21 in the thickness direction. A portion is heated to form a melted portion in the vicinity of each of the contact surface between the metallic plates 11, 12 and the contact surface between the metallic plates 12, 13. Then, the melted portions are solidified to generate solid-phase nuggets, whereby the metallic plates 11, 12 are connected and the metallic plates 12, 13 are connected to each other.

In a case where the metallic plates 11, 12 are the high resistance workpieces, which are made of a high tensile strength steel, have a large thickness, and exhibit a high electric resistance, and the metallic plate 13 is the low resistance workpiece, which is made of a mild steel and exhibits a low electric resistance, a larger amount of Joule heating is generated in the vicinity of the contact surface between the metallic plates 11, 12 (the high resistance workpieces) than in the vicinity of the contact surface between the metallic plates 12, 13 (the low resistance workpiece and the high resistance workpiece). This is because a higher contact resistance is generated in the vicinity of the contact surface between the metallic plates 11, 12.

Therefore, in the stacked body 14, as shown in FIG. 79, a melted portion 26 is developed first in the vicinity of the contact surface between the metallic plates 11, 12. The melted portion 26 may grow larger before another melted portion is developed in the vicinity of the contact surface between the metallic plates 12, 13. When the energization is continued to form the other melted portion in the vicinity of the contact surface between the metallic plates 12, 13, a part of the melted portion 26 may be scattered from a gap between the metallic plates 11, 12, and thus the spatter generation may be caused around the gap.

However, if the energization is stopped, the melted portion and hence the nugget are not grown to a sufficiently large size in the vicinity of the contact surface between the metallic plates 12, 13. Accordingly, a desired bonding strength is hardly achieved between the metallic plates 12, 13.

In Japanese Patent No. 3894545, the applicant has proposed that, in the process of spot welding such a stacked body, the pressing force of the first welding tip, applied to the low resistance workpiece, is made smaller than that of the second welding tip. In this case, the contact pressure of the low resistance workpiece against the high resistance workpiece is reduced. Therefore, the contact resistance between the low resistance workpiece and the high resistance workpiece is increased, so that a sufficient amount of Joule heating is generated at the contact surface. Consequently, the nugget between the low resistance workpiece and the high resistance workpiece can be grown to approximately the same size as the nugget between the high resistance workpieces, whereby the resultant stacked body can exhibit an excellent bonding strength.

SUMMARY OF INVENTION

A general object of the present invention is to provide a welding apparatus capable of forming a sufficiently large nugget in the vicinity of a contact surface between workpieces in a stacked body.

A principal object of the present invention is to provide a welding apparatus capable of eliminating the possibility of spatter generation.

According to an aspect of the present invention, there is provided a spot welding apparatus for spot welding a stacked body of a plurality of workpieces, comprising first and second welding tips, between which the stacked body is interposed, a pressing member for pressing an outermost workpiece of the stacked body, the first welding tip and the pressing member being brought into contact with different portions of the outermost workpiece, and a holder for holding the first welding tip and the pressing member, which is displaced by a holder displacement mechanism, wherein the holder has a pressing member displacement mechanism for displacing the pressing member, and the pressing member displacement mechanism is electrically isolated from the holder.

According to another aspect of the present invention, there is provided a spot welding apparatus for spot welding a stacked body of a plurality of workpieces, comprising first and second welding tips, between which the stacked body is interposed, a first displacement mechanism for displacing at least one of the first and second welding tips, a pressing member for pressing an outermost workpiece of the stacked body, the first welding tip and the pressing member being brought into contact with different portions of the outermost workpiece, a second displacement mechanism for displacing the pressing member independently from the first or second welding tip, and a pressing mechanism for generating a pressing force of the pressing member.

According to a further aspect of the present invention, there is provided an indirect feeding type welding apparatus comprising first and second welding guns, wherein a current is supplied from the first welding gun through an external feed terminal to the second welding gun, whereby the second welding gun is used for welding a stacked body of a plurality of workpieces, and the second welding gun contains first and second welding tips movable close to and away from each other, and further contains a displaceable pressing member for pressing an outermost workpiece of the stacked body.

In any aspect, the pressing forces of the first welding tip and the pressing member are balanced with the pressing force of the second welding tip, so that the pressing force of the first welding tip is smaller than that of the second welding tip. Therefore, in the stacked body between the first welding tip and the substantially opposite second welding tip, the total of the pressing forces acts on a wider or larger area in a position closer to the second welding tip. Thus, the total force acting on the contact surface between the outermost workpiece (in contact with the first welding tip) and the adjacent workpiece is smaller than the total force acting on the other contact surface between the workpieces.

Since the pressing forces are distributed in this manner, the contact area at the contact surface between the outermost workpiece and the adjacent workpiece is smaller than the contact area at the other contact surface between the workpieces. Therefore, the contact resistance can be made higher to increase the generation amount of Joule heating at the contact surface between the outermost workpiece and the adjacent workpiece. Consequently, the nugget can be grown larger on the contact surface, and thus the bonding strength can be improved, between the outermost workpiece and the adjacent workpiece.

Since the metallic plates are pressed by the pressing member, the outermost workpiece can be prevented from separating from the adjacent workpiece. Consequently, spatter scattering of the softened melted portion from a gap between the outermost workpiece and the adjacent workpiece can be prevented.

The first welding tip and the pressing member are preferably attached to one holder (support member). In this case, the welding apparatus can be prevented from having a complicated or large structure. Therefore, even in a case where an intricately-shaped stacked body is welded, the stacked body can be located in a desired welding position without interference from the first welding tip and the pressing member.

It is preferred that the first displacement mechanism is used for displacing the first welding tip, the second displacement mechanism is used for displacing the pressing member, and the displacement mechanisms are independent from each other. In this case, the first welding tip and the pressing member can be easily contacted with and separated from the stacked body independently from each other. Thus, the pressing force of the pressing member acting on the stacked body can be easily controlled.

The pressing member may be utilized as an auxiliary electrode having a polarity opposite to that of the first welding tip, and a branching current may flow from the first welding tip to the auxiliary electrode or from the auxiliary electrode to the first welding tip in an energization process.

In this case, the current flows through the outermost workpiece in the direction from the first welding tip to the auxiliary electrode or the opposite direction. Therefore, the contact surface between the outermost workpiece and the adjacent workpiece is sufficiently heated by the current. Consequently, the nugget can be grown sufficiently larger at the contact surface, so that the resultant bonded product can be further excellent in bonding strength.

The welding apparatus may further comprise, in the vicinity of the second welding tip, another auxiliary electrode having a polarity opposite to that of the second welding tip. In this case, after the branching current from the first welding tip to the auxiliary electrode (in the vicinity of the first welding tip) or from the auxiliary electrode to the first welding tip has vanished, another branching current may flow from the other auxiliary electrode (in the vicinity of the second welding tip) to the second welding tip or from the second welding tip to the other auxiliary electrode.

In this case, the nugget can be grown sufficiently larger in the vicinity of the contact surface between the outermost workpiece against which the second welding tip is in abutment and the workpiece adjacent thereto.

For example, in a case where the stacked body interferes with the first welding tip and the pressing member and thereby cannot be readily welded, it is preferred that a first support tip and a support pressing member are interposed between the first welding tip and the stacked body and between the pressing member and the stacked body respectively, and a second support tip is interposed between the second welding tip and the stacked body.

In such a structure, pressing positions of the first and second welding tips and the pressing member can be away from the stacked body, while the first and second support tips and the support pressing member are brought into contact with the stacked body. Therefore, even when the stacked body has a complicated shape, the stacked body can be easily welded.

In this structure, the pressing forces of the first support tip and the support pressing member are balanced with the pressing force of the second support tip. Thus, the total of the pressing forces acts on a wider area in a position closer to the second support tip than to the first support tip.

It is to be understood that the support pressing member may act as an electrode in the same manner as the pressing member, so that a current may flow in the direction from the support tip to the support pressing member or the opposite direction. In this case, the current flows through the outermost workpiece in the stacked body. Therefore, the contact surface between the outermost workpiece and the adjacent workpiece is sufficiently heated by the current. Consequently, the nugget can be grown sufficiently larger at the contact surface, so that the resultant joined regions can be further excellent in bonding strength.

DESCRIPTION OF EMBODIMENTS

Several preferred embodiments of the welding apparatuses of the present invention will be described in detail below with reference to the accompanying drawings.

Spot welding apparatuses will be described below.

Figure 1:
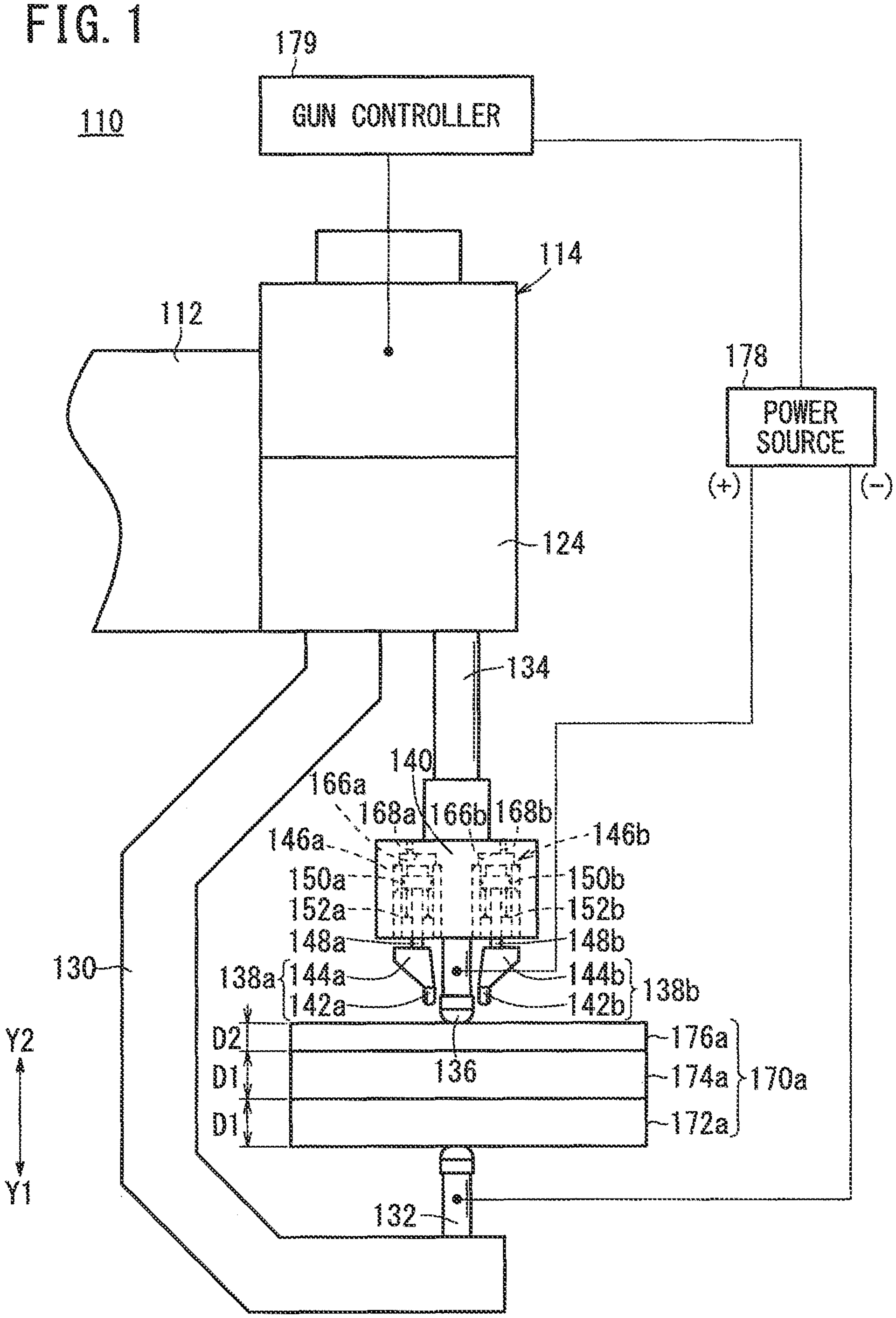
FIG. 1 is an enlarged view of essential features showing a welding apparatus (spot welding apparatus) according to a first embodiment of the present invention.

FIG. 1 is an enlarged view of a spot welding apparatus 110 according to a first embodiment. The spot welding apparatus 110 contains a robot having an arm (not shown) and a welding gun 114 supported on a wrist 112 of the arm.

The welding gun 114 is a so-called C-type gun having an approximately C-shaped fixed arm 130 under a gun body 124. A lower tip 132 is disposed as a second welding tip on the lower end of the fixed arm 130 in confronting relation to the gun body 124, and extends toward the gun body 124.

The gun body 124 contains a ball screw mechanism (not shown) for displacing a holder (support) 140 in the vertical direction of FIG. 1. Thus, the ball screw mechanism is a holder (support) displacement mechanism for displacing the holder 140.

A displacement shaft 134 projects from the gun body 124 and extends toward the lower tip 132, and is displaced by a ball screw in the ball screw mechanism in the vertical direction (arrow Y2 or Y1 direction) of FIG. 1. The ball screw is rotated by a servomotor (not shown) in the ball screw mechanism.

The holder 140 is disposed on the end of the displacement shaft 134 to support an upper tip 136 used as a first welding tip and pressing members 138*a*, 138*b*.

The pressing member 138*a* has an end 142*a* having a rod shape extending parallel to the upper tip 136, and further has a base 144*a* having an approximately trapezoidal shape as viewed from the front. An air cylinder 146*a* is disposed as a pressing member displacement mechanism in the holder 140, and the base 144*a* is connected with a piston rod 148*a* in the air cylinder 146*a*. The holder 140 is a conductor, and thereby can transfer a current to the upper tip 136.

Figure 2:
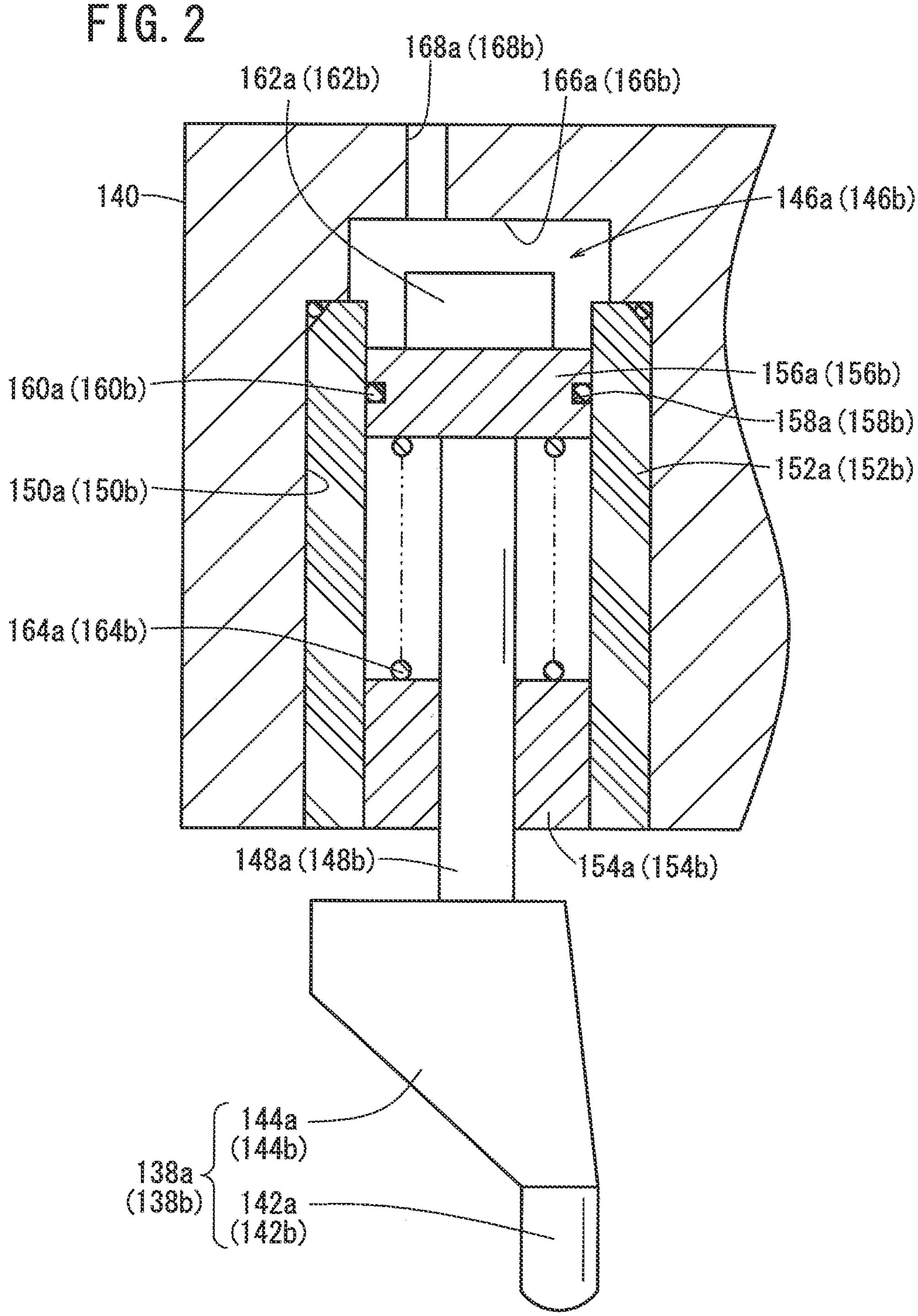
FIG. 2 is an enlarged vertical cross-sectional view of essential features showing a holder in the spot welding apparatus of FIG. 1.

As in the enlarged view of essential features showing in FIG. 2, the holder 140 has a bore 150*a*, into which the piston rod 148*a* is inserted. A sleeve 152*a* is inserted into the bore 150*a*, and a bearing 154*a* is inserted into the sleeve 152*a*. Furthermore, the piston rod 148*a* is inserted into the bearing 154*a*, and a piston 156*a* is slidably in contact with the sleeve 152*a*.

A round groove 158*a* is formed circumferentially on the side wall of the piston 156*a*, and a sealant O-ring 160*a* is placed in the round groove 158*a*. A stopper 162*a* is disposed on the head of the piston 156*a*, and extends toward the top of the bore 150*a*. The stopper 162*a* is composed of an insulator.

The sleeve 152*a* is composed of an aluminum material or an aluminum alloy material, and its surface is subjected to a hard alumite treatment. Thus, an oxide film containing a hard alumite is formed on the outer and inner peripheral walls of the sleeve 152*a*. The oxide film has an insulating property, and also the sleeve 152*a* has an insulating property. In other words, the sleeve 152*a* is an insulator, whereby the piston 156*a* is electrically isolated from the holder 140.

Alternatively, the sleeve 152*a* may be composed of an insulator such as a bakelite material or the like. In a case where the sleeve 152*a* is composed of a conductive material, the sleeve 152*a* may be electrically isolated from the holder 140 by disposing an insulator therebetween.

The piston rod 148*a* is inserted in a coil spring 164*a*. One end of the coil spring 164*a* is stopped by the top of the bearing 154*a*, and the other end is in contact with the bottom of the piston 156*a*. When the piston rod 148*a* is displaced (lowered) in the downward direction of FIGS. 1 and 2, the coil spring 164*a* is compressed. Meanwhile, the coil spring 164*a* acts to apply an elastic force for displacing (lifting) the piston rod 148*a* in the upward direction.

A room 166*a* is formed between the bore 150*a* and the piston 156*a*. An air supply/discharge passage 168*a* is communicated with the room 166*a* as a through-hole in the holder 140. The air supply/discharge passage 168*a* is connected with a tube in a compressed air supply/discharge mechanism (not shown). Thus, a compressed air is supplied to and discharged from the room 166*a* by the compressed air supply/discharge mechanism.

The other pressing member 138*b* and the air cylinder 146*b* have the same structures as above. The components of the pressing member 138*b* and the air cylinder 146*b*, which are identical to those of the pressing member 138*a* and the air cylinder 146*a*, are denoted by identical reference numerals and are marked with an additional character "b" instead of "a". Therefore, detailed explanations thereof are omitted.

A stacked body 170*a* to be welded contains three metallic plates 172*a*, 174*a*, 176*a* arranged upwardly in this order. Each of the metallic plates 172*a*, 174*a* has a thickness D1 (e.g. about 1 to 2 mm), and the metallic plate 176*a* has a thickness D2 smaller than the thickness D1 (e.g. about 0.5 to 0.7 mm). Thus, the metallic plates 172*a*, 174*a* have the same thickness, and the metallic plate 176*a* is thinner than the metallic plates 172*a*, 174*a*. In other words, the metallic plate 176*a* has the smallest thickness among the three metallic plates 172*a*, 174*a*, 176*a* in the stacked body 170*a*.

For example, each of the metallic plates 172*a*, 174*a* is a high resistance workpiece made of a so-called high tensile strength steel, such as a high-performance high tensile strength steel sheet JAC590, JAC780, or JAC980 (defined according to the Japan Iron and Steel Federation Standard). For example, the metallic plate 176*a* is a low resistance workpiece made of a so-called mild steel, such as a high-performance steel sheet JAC270 for press-forming (defined according to the Japan Iron and Steel Federation Standard). The metallic plates 172*a*, 174*a* may be made of the same or different metal materials.

The stacked body 170*a* to be welded is interposed between the lower tip 132 and the upper tip 136, and is energized by the lower tip 132 and the upper tip 136. The lower tip 132 is electrically connected to a negative terminal of a power source 178, and the upper tip 136 is electrically connected to a positive terminal of the power source 178. Therefore, in the first embodiment, a current flows from the upper tip 136 to the lower tip 132.

As described in detail hereinafter, the distances Z1, Z2 between the upper tip 136 and the pressing members 138*a*, 138*b* are controlled to achieve an appropriate pressure distribution in the metallic plate 176*a* and the metallic plate 174*a* located immediately beneath the metallic plate 176*a*.

In this structure, the servomotor in the ball screw mechanism, the compressed air supply/discharge mechanism with the air cylinders 146*a*, 146*b*, and the power source 178 are electrically connected to a gun controller 179 serving as a control means. Thus, the operation, actuation, and deactuation of the servomotor, the compressed air supply/discharge mechanism, and the power source 178 are controlled by the gun controller 179.

The spot welding apparatus 110 of the first embodiment is basically constructed as described above. Operations and advantages of the spot welding apparatus 110 will be described below in relation to a spot welding method according to the first embodiment.

In the spot welding method for welding the stacked body 170*a*, i.e. for joining the metallic plates 172*a*, 174*a* to each other as well as joining the metallic plates 174*a*, 176*a* to each other, first the robot moves the wrist 112 and thus the welding gun 114 to position the stacked body 170*a* between the lower tip 132 and the upper tip 136.

After the gun body 124 is lowered to a predetermined position, the servomotor in the ball screw mechanism is actuated to start the rotation of the ball screw under the control of the gun controller 179. Then, the upper tip 136 and the pressing members 138*a*, 138*b* are moved downward in the arrow Y1 direction closer to the stacked body 170*a*. Consequently, the stacked body 170*a* is gripped between the lower tip 132 and the upper tip 136.

Figure 3:
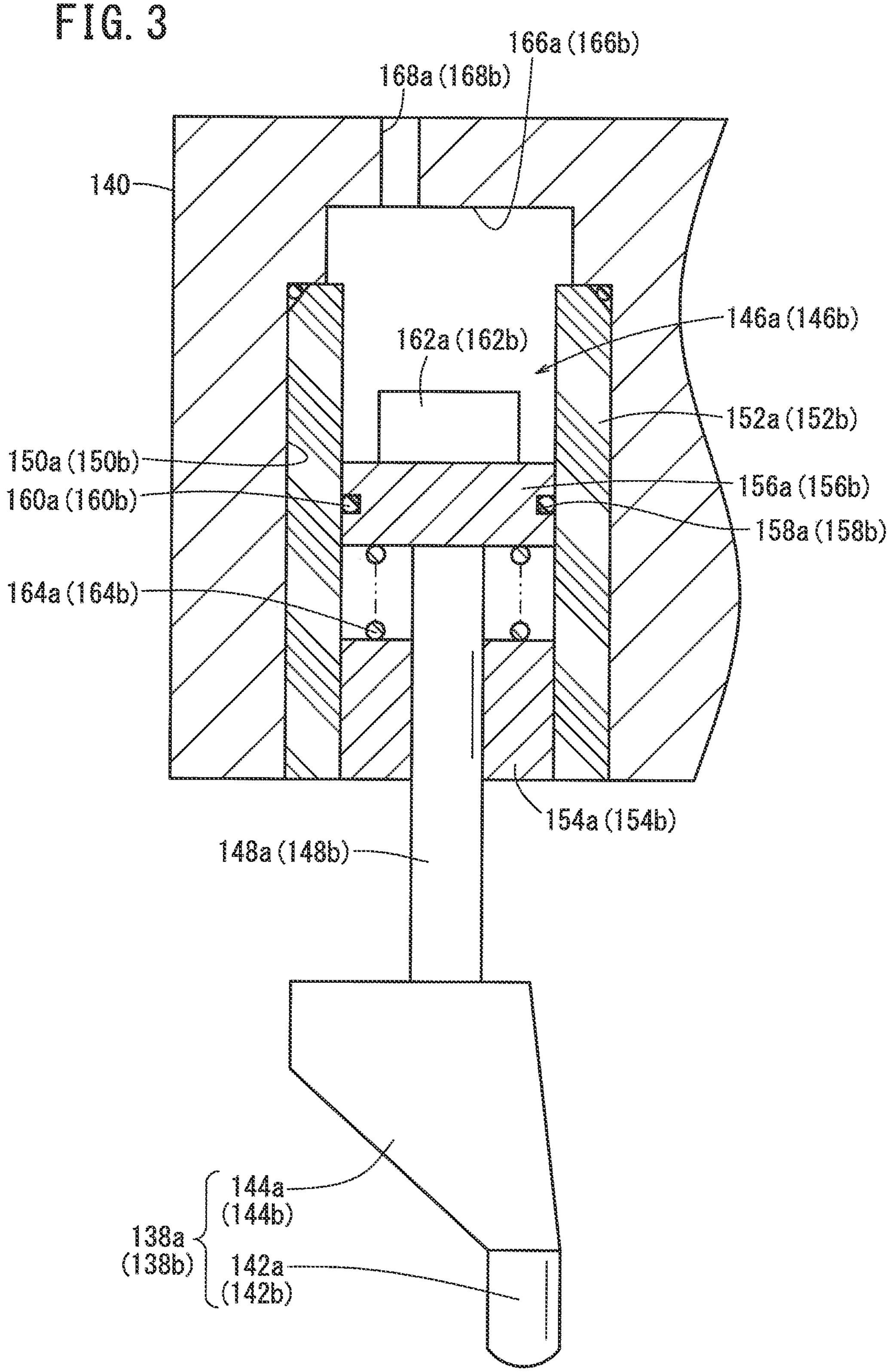
FIG. 3 is an enlarged vertical cross-sectional view of essential features showing a condition in which a downward movement of a pressing member shown in FIG. 2 is moved downward.

Meanwhile, the compressed air supply/discharge mechanism is actuated by the gun controller 179, whereby the compressed air is supplied through the air supply/discharge passages 168*a*, 168*b* to the rooms 166*a*, 166*b*. The pistons 156*a*, 156*b* are pressed by the compressed air in the rooms 166*a*, 166*b*, so that the pistons 156*a*, 156*b* and the piston rods 148*a*, 148*b* are lowered down while compressing the coil springs 164*a*, 164*b* as shown in FIG. 3. Leakage of the compressed air from the rooms 166*a*, 166*b* is prevented by the O-rings 160*a*, 160*b* attached to the pistons 156*a*, 156*b*.

Figure 4:
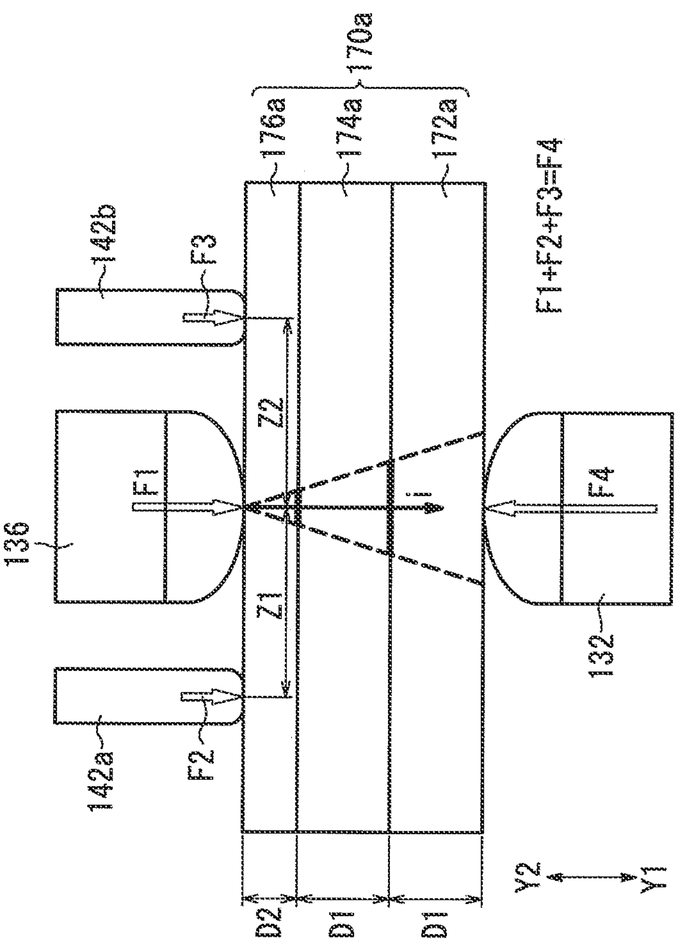
FIG. 4 is a schematic front view of essential features showing a stacked body to be welded, gripped by an upper tip (first welding tip), a lower tip (second welding tip), and pressing rods (pressing members)

The piston rods 148*a*, 148*b* are moved downward, and thus the pressing members 138*a*, 138*b* disposed on the ends of the piston rods 148*a*, 148*b* are lowered toward the stacked body 170*a* in the arrow Y1 direction. Consequently, before, at the same time as, or after the gripping of the stacked body 170*a* between the lower tip 132 and the upper tip 136, the pressing members 138*a*, 138*b* are brought into contact with the metallic plate 176*a*. FIG. 4 is a schematic vertical cross-sectional view of the stacked body 170*a* in this step.

Figure 5:
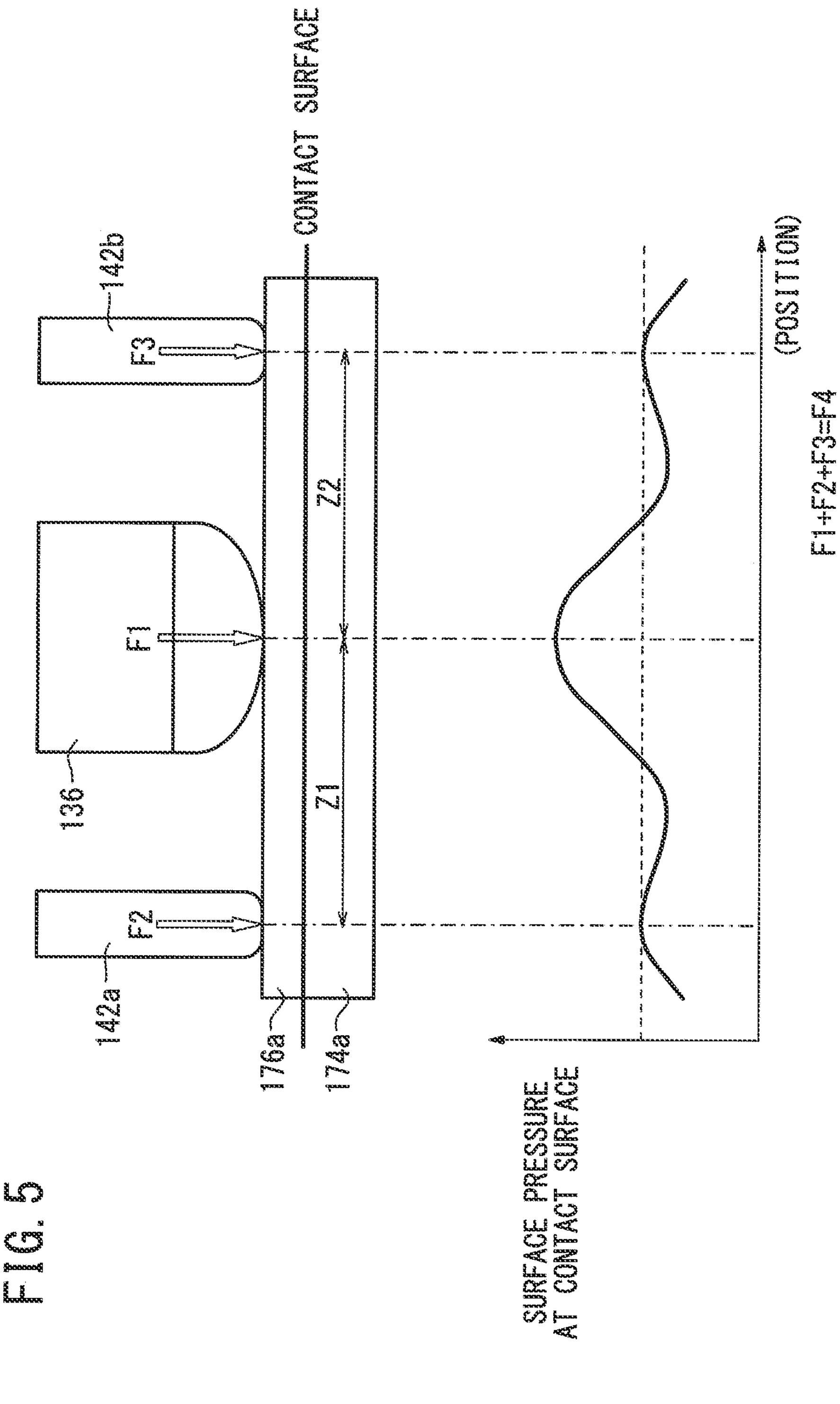
FIG. 5 is a schematic front view (with a graph) for illustrating an appropriate surface pressure distribution between an uppermost workpiece and a workpiece located immediately beneath the uppermost workpiece in the stacked body.

The distances Z1, Z2 between the upper tip 136 and the pressing members 138*a*, 138*b* are controlled such that as shown in FIG. 5, a portion pressed by the upper tip 136 exhibits the highest surface pressure, and portions pressed by the pressing members 138*a*, 138*b* exhibit the second highest surface pressure, at the contact surface between the metallic plates 176*a*, 174*a*. The distance Z1 is preferably equal to the distance Z2.

In other words, at the contact surface, some portions exhibit surface pressures lower than the above high pressures obtained due to the upper tip 136 and the pressing members 138*a*, 138*b*. Consequently, a pressing force distribution shown in FIG. 4 is achieved. The distribution will be described in detail below.

The gun controller 179 controls the rotating force of the servomotor for rotating the ball screw in the ball screw mechanism and the pressing forces of the compressed air against the pistons 156*a*, 156*b* (the moving forces of the air cylinders 146*a*, 146*b*) such that the total pressing force (F1+F2+F3) of the upper tip 136 and the pressing members 138*a*, 138*b* against the metallic plate 176*a* is well balanced with the pressing force (F4) of the lower tip 132 against the metallic plate 172*a*. By this control, the total pressing force (F1+F2+F3) applied to the stacked body 170*a* in the arrow Y1 direction is made approximately equal to the pressing force (F4) applied to the stacked body 170a in the arrow Y2 direction. The pressing force F2 is preferably equal to the pressing force F3.

In this case, the relation of F1<F4 is satisfied. Therefore, as schematically shown in FIG. 4, in the stacked body 170a, the total pressing force of the lower tip 132 and the upper tip 136 acts on a wider (larger) area as the force proceeds from the upper tip 136 toward the lower tip 132. Thus, the force acting on the contact surface between the metallic plates 174a, 176a is smaller than the force acting on the contact surface between the metallic plates 172a, 174a. In a case where the distances Z1, Z2 are excessively small, the stacked body 170a does not have the above described portions, which exhibit surface pressures lower than the high pressures obtained due to the upper tip 136 and the pressing members 138a, 138b. In this case, the appropriate distribution is hardly achieved.

Figure 6:
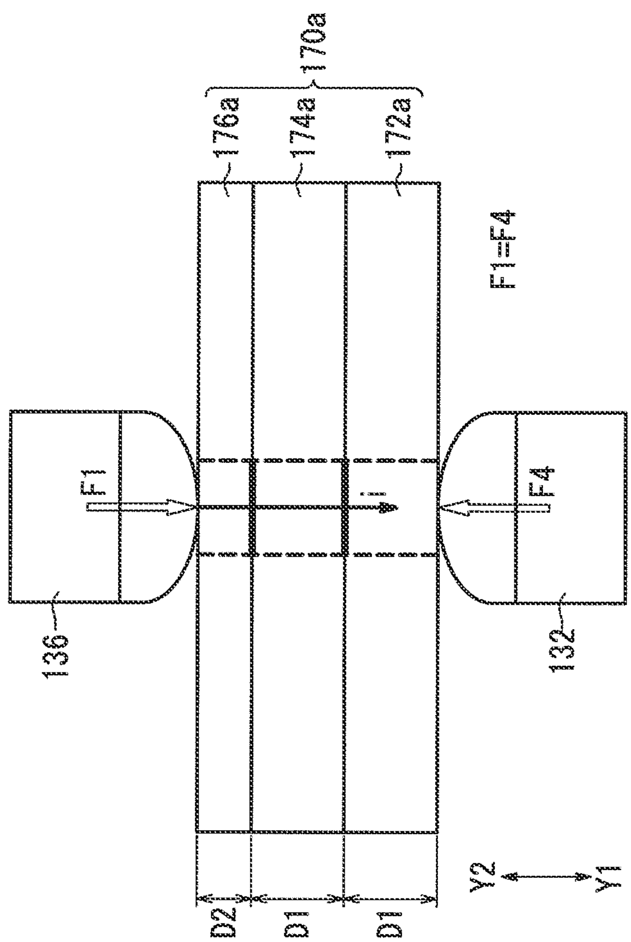
FIG. 6 is a schematic front view of the stacked body, gripped only by the lower and upper tips.

In a case where the pressing members 138a, 138b are not used for satisfying the relation of F1=F4, a pressing force distribution schematically shown in FIG. 6 is achieved in the stacked body 170a by the lower tip 132 and the upper tip 136. As shown in FIG. 6, in this case, the total force acts uniformly over the stacked body 170a from the upper tip 136 to the lower tip 132. In other words, the force acting on the contact surface between the metallic plates 174a, 176a is equal to the force acting on the contact surface between the metallic plates 172a, 174a.

In FIGS. 4 and 6, at the contact surface between the metallic plates 174a, 176a, an area, on which the force acts, is represented by a thick solid line. As is clear from the comparison between FIGS. 4 and 6, the area, on which the force acts, is smaller under the condition of F1<F4 than under the condition of F1=F4. Thus, the metallic plate 176a has an area pressed against the metallic plate 174a, and the area is smaller under the condition of F1<F4 than under the condition of F1=F4. In other words, the contact area between the metallic plates 174a, 176a is smaller under the condition of F1<F4.

When the total pressing force is distributed from the upper tip 136 to the lower tip 132 in the above manner to achieve the smaller contact area between the metallic plates 174a, 176a, a reaction force is generated in the direction from the stacked body 170a toward the upper tip 136. In the first embodiment, the pressing members 138a, 138b are subjected to the reaction force.

As described above, the holder 140 having the pressing members 138a, 138b and the air cylinders 146a, 146b is supported by the displacement shaft 134 connected to the ball screw mechanism in the gun body 124. Therefore, the reaction force acting on the pressing members 138a, 138b is absorbed by the gun body 124 (the welding gun 114).

Thus, the reaction force derived from the stacked body 170a can be prevented from acting on the robot. For this reason, the robot is not required to have a high rigidity. In other words, the robot can be reduced in size, resulting in low equipment investment.

Next, the gun controller 179 sends, to the power source 178, a control signal for starting energization. Then, as shown in FIG. 4 (and FIG. 6), a current i starts to flow in the direction from the upper tip 136 toward the lower tip 132. This current flow is achieved because the upper tip 136 and the lower tip 132 are connected to the positive and negative terminals of the power source 178 respectively as described above. The contact surface between the metallic plates 172a, 174a and the contact surface between the metallic plates 174a, 176a are heated by Joule heating generated due to the current i.

Figure 7:
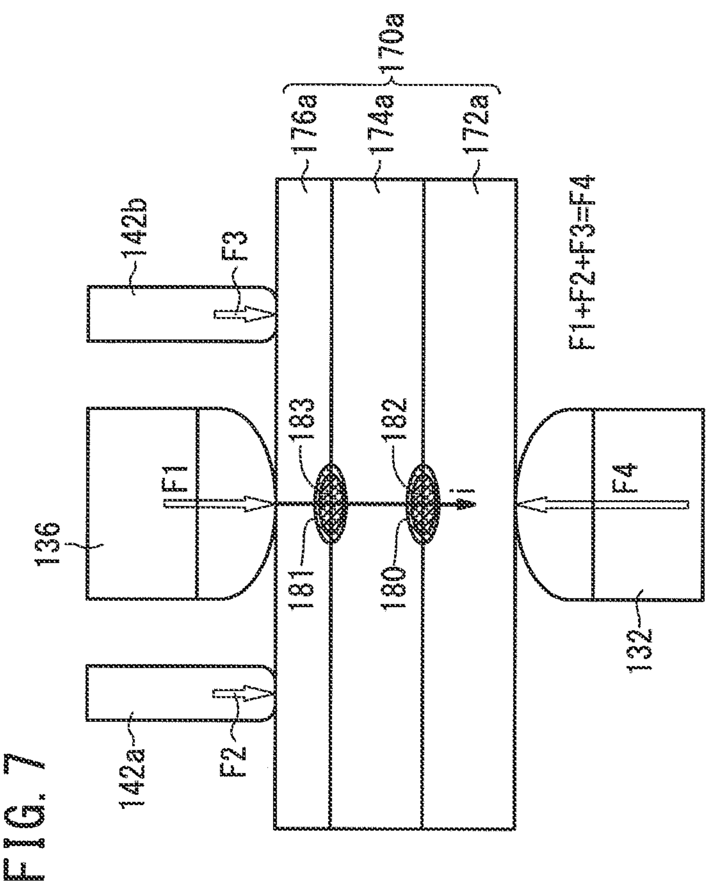
FIG. 7 is a schematic vertical cross-sectional view of the stacked body at the start of energization for generating a current flow from the upper tip to the lower tip after the state of FIG. 4.

As described above, the contact area between the metallic plates 176a, 174a is smaller in FIG. 4 than in FIG. 6. Therefore, the contact resistance and the current density at the contact surface between the metallic plates 174a, 176a are higher in FIG. 4 than in FIG. 6 (i.e. under the condition of F1<F4 than under the condition of F1=F4). Thus, the generated amount of Joule heating (i.e. the amount of generated heat) is larger under the condition of F1<F4 than under the condition of F1=F4. Consequently, under the condition of F1<F4, as shown in FIG. 7, a heated region 180 in the vicinity of the contact surface between the metallic plates 172a, 174a and a heated region 181 in the vicinity of the contact surface between the metallic plates 174a, 176a are grown to approximately the same size.

The contact surface between the metallic plates 172a, 174a and the contact surface between the metallic plates 174a, 176a are heated to a sufficient temperature and melted by the heated regions 180, 181. Thus obtained melted portions are cooled and solidified, whereby nuggets 182, 183 are formed between the metallic plates 172a, 174a and between the metallic plates 174a, 176a respectively. Though the nuggets 182, 183 are shown in FIG. 7 to facilitate understanding, the nuggets 182, 183 are in the liquid-phase states of the melted portions during the energization. Such melted portions are shown in this manner also in the following drawings.

As described above, the heated region 180 in the vicinity of the contact surface between the metallic plates 172a, 174a and the heated region 181 in the vicinity of the contact surface between the metallic plates 174a, 176a have approximately the same size. Therefore, also the nuggets 182, 183 have approximately the same size.

In the process of forming the melted portion, the metallic plate 176a is pressed against the metallic plate 174a by the pressing members 138a, 138b. The metallic plate 176a having a low rigidity can be prevented by such pressing from warping and thus from separating from the metallic plate 174a during the energization (heating). Thus, spatter scattering of the softened melted portion from a gap between the metallic plates 176a, 174a can be prevented.

The sleeves 152a, 152b are interposed between the holder 140 and the pistons 156a, 156b (or the bearings 154a, 154b) respectively. As described above, the sleeves 152a, 152b are an insulator, so that the current to be applied to the upper tip 136 is not transferred from the holder 140 to the pistons 156a, 156b and hence the pressing members 138a, 138b.

After the melted portions are sufficiently grown in a predetermined time, the energization is stopped, and the holder 140 is moved upward to separate the upper tip 136 from the metallic plate 176a. Alternatively, the upper tip 136 and the lower tip 132 may be electrically isolated only by lifting the holder 140 to separate the upper tip 136 from the metallic plate 176a.

At the same time as or after the stop of the energization, the compressed air is discharged from the rooms 166a, 166b (see FIG. 2) by the compressed air supply/discharge mechanism. Consequently, the elastic forces of the coil springs 164a, 164b become higher than the pressing forces of the compressed air on the pistons 156a, 156b. Thus, the pistons 156a, 156b are moved upward by the elastic forces of the coil springs 164a, 164b, and are returned to the original positions set before the compressed air supply. Also the pressing members 138a, 138b are moved upward and returned to the original positions.

By the upward movement, the stoppers 162a, 162b disposed on the heads of the pistons 156a, 156b are brought into contact with the tops of the bores 150a, 150b (the rooms

166*a*, 166*b*). The pistons 156*a*, 156*b* are prevented from being further lifted by the contact. Since the stoppers 162*a*, 162*b* are composed of an insulator as described above, even when the pistons 156*a*, 156*b* are lifted and brought into contact with the tops of the rooms 166*a*, 166*b* during the energization of the upper tip 136 and the lower tip 132, the current is not transferred from the holder 140 to the pistons 156*a*, 156*b*.

The operations from the start to the end of the spot welding method are performed under the control of the gun controller 179.

The energization is stopped in this manner, so that the heating of the metallic plates 172*a*, 174*a*, 176*a* is stopped. The melted portions are cooled and solidified with time to form the nuggets 182, 183 respectively. The metallic plates 172*a*, 174*a* are joined to each other by the nugget 182, and the metallic plates 174*a*, 176*a* are joined to each other by the nugget 183, to obtain a bonded product.

The bonded product is excellent in the bonding strengths between the metallic plates 172*a*, 174*a* and between the metallic plates 174*a*, 176*a*. This is because a sufficient amount of Joule heating is generated and the nugget 183 is sufficiently grown at the contact surface between the metallic plates 174*a*, 176*a* as described above.

As described above, in the first embodiment, the nugget 183 between the metallic plates 174*a*, 176*a* can be grown to a size approximately equal to that of the nugget 182 between the metallic plates 172*a*, 174*a* while preventing the spatter generation, whereby the bonded product can be produced with the excellent bonding strength between the metallic plates 174*a*, 176*a*.

Since only the air cylinders 146*a*, 146*b* are attached to the common holder 140 for supporting the upper tip 136, the welding apparatus can be prevented from having a complicated or large structure. Therefore, even in a case where an intricately-shaped stacked body is welded, the stacked body can be located in a desired welding position without interference from the pressing members 138*a*, 138*b* and the upper tip 136.

Since the pressing members 138*a*, 138*b* are closer to the air cylinders 146*a*, 146*b*, the offset loads on the air cylinders 146*a*, 146*b* can be easily reduced.

In the first embodiment, the nugget 183 between the metallic plates 174*a*, 176*a* can be grown further larger by increasing the pressing forces F2, F3 of the pressing members 138*a*, 138*b*. However, the size of the nugget 183 tends to become saturated at certain levels of the pressing forces F2, F3. In other words, the nugget 183 is hardly grown larger than a certain size by excessively increasing the pressing forces F2, F3. Furthermore, in the case of excessively increasing the pressing forces F2, F3, the pressing force F1 has to be excessively lowered in order to balancing the total force of the pressing forces F1, F2, F3 with the pressing force F4. As a result, the size of the nugget 182 between the metallic plates 172*a*, 174*a* is reduced.

Consequently, it is preferred that the difference between the pressing force F1 of the upper tip 136 and the pressing forces F2, F3 of the pressing members 138*a*, 138*b* is determined in view of maximizing the sizes of the nuggets 182, 183.

In any case, various pressure application means such as spring coils, servomotors, and hydraulic cylinders may be used instead of the air cylinders 146*a*, 146*b*.

The combination of the materials of the metallic plates 172*a*, 174*a*, 176*a* is not particularly limited to the above combination of the steel materials. The metallic plates 172*a*, 174*a*, 176*a* may be composed of any material as long as they can be spot-welded. For example, all the metallic plates 172*a*, 174*a*, 176*a* may be composed of a mild steel. Alternatively, the metallic plates 174*a*, 176*a* may be composed of a mild steel while only the metallic plate 172*a* may be composed of a high tensile strength steel.

Figure 8:
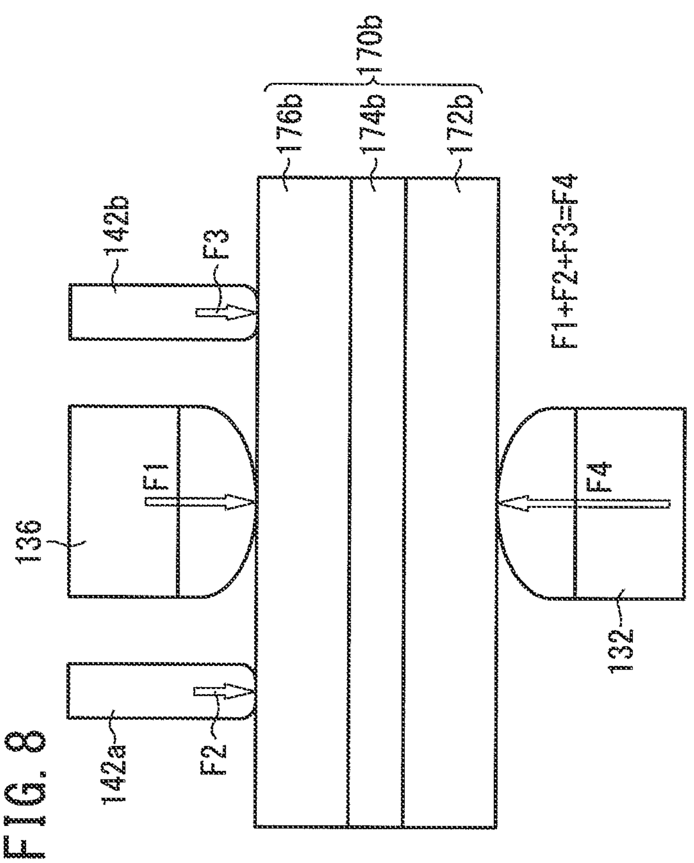
FIG. 8 is a schematic front view of essential features showing a stacked body different from that of FIG. 4, gripped by the lower tip, the upper tip, and the pressing rods (pressing members)

Though the uppermost metallic plate 176*a* is thinner than the metallic plates 172*a*, 174*a* to be welded in the above embodiment, the stacked body 170*a* is not limited thereto. A stacked body 170*b* shown in FIG. 8 may be used instead of the stacked body 170*a*. In the stacked body 170*b*, a metallic plate 174*b* having the smallest thickness is interposed between metallic plates 172*b*, 176*b*. In this case, for example, the metallic plate 172*b* is composed of a high tensile strength steel while the metallic plates 174*b*, 176*b* are composed of a mild steel, but the combination of the materials is not particularly limited thereto.

It is to be understood that the middle metallic plate may have the largest thickness, and the undermost metallic plate may be thinner than the other two metallic plates.

Figure 9:
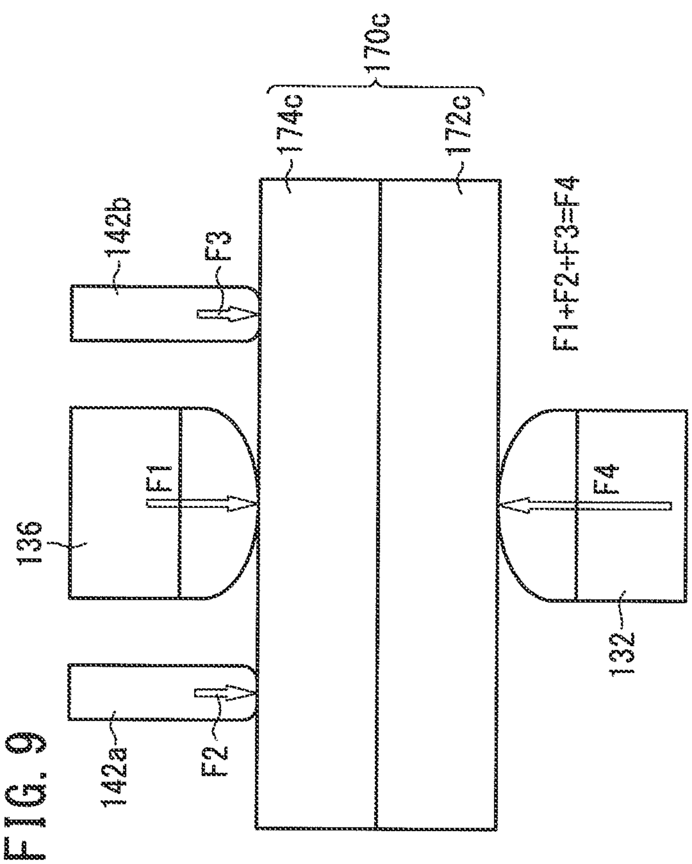
FIG. 9 is a schematic front view of essential features showing a stacked body different from those of FIGS. 4 and 8, gripped by the lower tip, the upper tip, and the pressing rods (pressing members)

The number of the metallic plates is not particularly limited to 3. For example, a stacked body 170*c* shown in FIG. 9 may be used instead of the stacked body 170*a*. In the stacked body 170*c*, a metallic plate 174*c* is stacked on a metallic plate 172*c*, and the both are composed of a high tensile strength steel.

In a second embodiment, the pressing members 138*a*, 138*b* are used as auxiliary electrodes, to which a current is applied. The components of the second embodiment, which are identical to those of FIGS. 1 to 9, are denoted by identical reference characters. Therefore, detailed explanations thereof are omitted.

Figure 10:
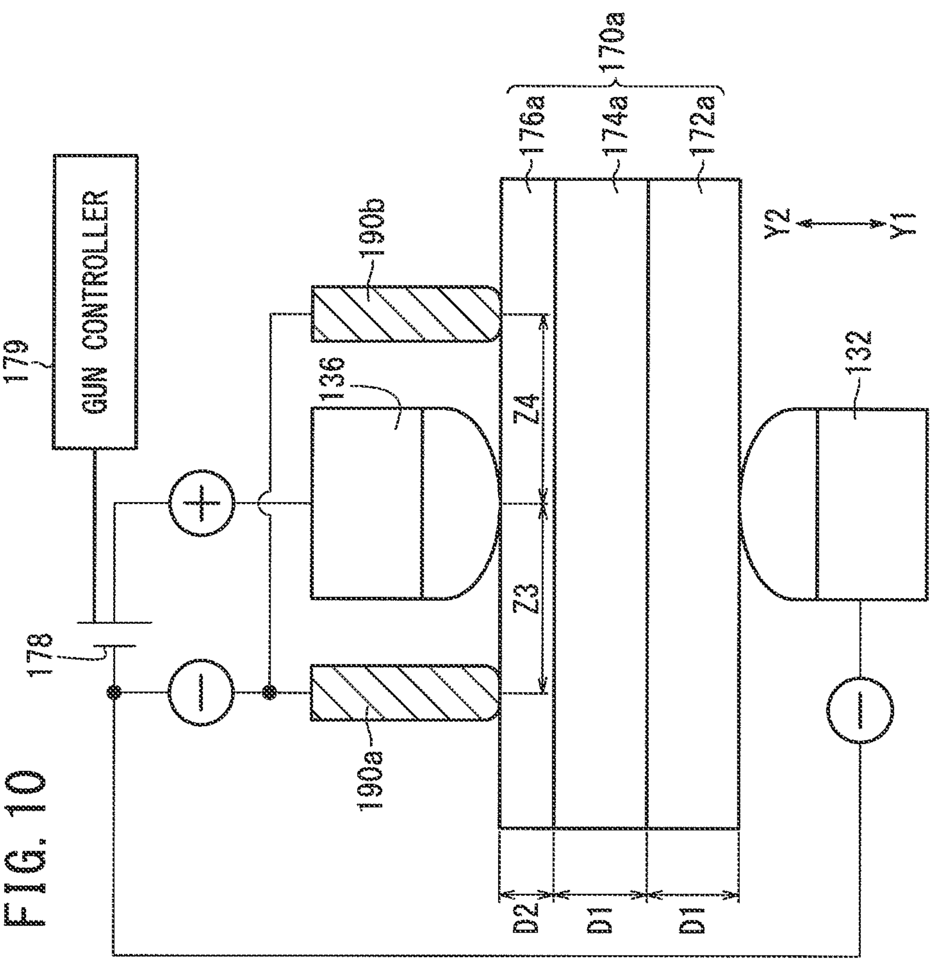
FIG. 10 is a schematic front view of essential features showing the stacked body, gripped by the upper tip, the lower tip, and auxiliary electrodes in a welding apparatus (spot welding apparatus) according to a second embodiment of the present invention.

FIG. 10 is a partially enlarged horizontal cross-sectional view of essential features showing a spot welding apparatus according to the second embodiment. The spot welding apparatus of the second embodiment is substantially equal to the apparatus of the first embodiment except that the pressing members 138*a*, 138*b* are electrically connected to the negative terminal of the power source 178. Also in the second embodiment, the current flows from the upper tip 136 to the lower tip 132. In the second embodiment, the pressing members 138*a*, 138*b* are hereinafter referred to as the auxiliary electrodes 190*a*, 190*b* to facilitate the understanding of the differences from the first embodiment.

As described above, the lower tip 132 and the auxiliary electrodes 190*a*, 190*b* are electrically connected to the negative terminal of the power source 178, and the upper tip 136 is electrically connected to the positive terminal of the power source 178. Therefore, the auxiliary electrodes 190*a*, 190*b* have polarities opposite to that of the upper tip 136 though all the components are brought into contact with the uppermost metallic plate 176*a* in the stacked body 170*a*. In the following drawings, when the upper tip 136 is electrically connected with the auxiliary electrodes 190*a*, 190*b* and a branching current i2 is generated, the polarities of the auxiliary electrodes 190*a*, 190*b* are shown. On the other hand, when the branching current i2 is not generated, the polarities of the auxiliary electrodes 190*a*, 190*b* are not shown.

The distances Z3, Z4 between the upper tip 136 and the auxiliary electrodes 190*a*, 190*b* are controlled such that some portions exhibit surface pressures lower than those from the upper tip 136 and the auxiliary electrodes 190*a*, 190*b* to achieve an appropriate pressure distribution as in the first embodiment (see FIG. 5). Therefore, the upper tip 136 is separated from the auxiliary electrodes 190*a*, 190*b* at certain distances. However, when the distances Z3, Z4 are excessively large between the upper tip 136 and the auxiliary electrodes 190*a*, 190*b*, the resistances therebetween are increased, so that it is difficult to obtain a flow of the branching current i2 to be hereinafter described (see FIG. 12).

Thus, the distances Z3, Z4 are controlled such that the above appropriate surface pressure distribution is achieved in the metallic plates 176*a*, 174*a*, and an appropriate branching current i2 flows under the resistances between the upper tip 136 and the auxiliary electrodes 190*a*, 190*b*.

The main part of the spot welding apparatus of the second embodiment is basically constructed as described above. Operations and advantages of the apparatus will be described below.

In a spot welding method using the spot welding apparatus for spot welding the stacked body 170*a*, first the robot moves the welding gun to position the stacked body 170*a* between the upper tip 136 and the lower tip 132 in the same manner as the first embodiment. Thereafter, the upper tip 136 and the lower tip 132 are moved close to each other, whereby the stacked body 170*a* is gripped therebetween.

Before, at the same time as, or after the gripping, the compressed air is supplied to the rooms 166*a*, 166*b* through the air supply/discharge passages 168*a*, 168*b* (see FIGS. 1 and 2). The pistons 156*a*, 156*b* and the piston rods 148*a*, 148*b* are moved downward by the compressed air, so that the auxiliary electrodes 190*a*, 190*b* are lowered toward the stacked body 170*a* in the arrow Y1 direction. Consequently, the auxiliary electrodes 190*a*, 190*b* are brought into contact with the metallic plate 176*a* as shown in the schematic vertical cross-sectional view of FIG. 10. Of course, the coil springs 164*a*, 164*b* are compressed during the downward movement of the pistons 156*a*, 156*b* and the piston rods 148*a*, 148*b*.

Also in the second embodiment, the gun controller 179 controls the pressing forces F2, F3 of the auxiliary electrodes 190*a*, 190*b* against the metallic plate 176*a* such that the total pressing force (F1+F2+F3) of the upper tip 136 and the auxiliary electrodes 190*a*, 190*b* is well balanced with the pressing force F4 of the lower tip 132.

Also in the second embodiment, it is preferred that the difference between the pressing force F1 of the upper tip 136 and the pressing forces F2, F3 of the auxiliary electrodes 190*a*, 190*b* is determined in view of maximizing the sizes of the nugget between the metallic plates 172*a*, 174*a* and the nugget between the metallic plates 174*a*, 176*a* as in the first embodiment.

Figure 11:
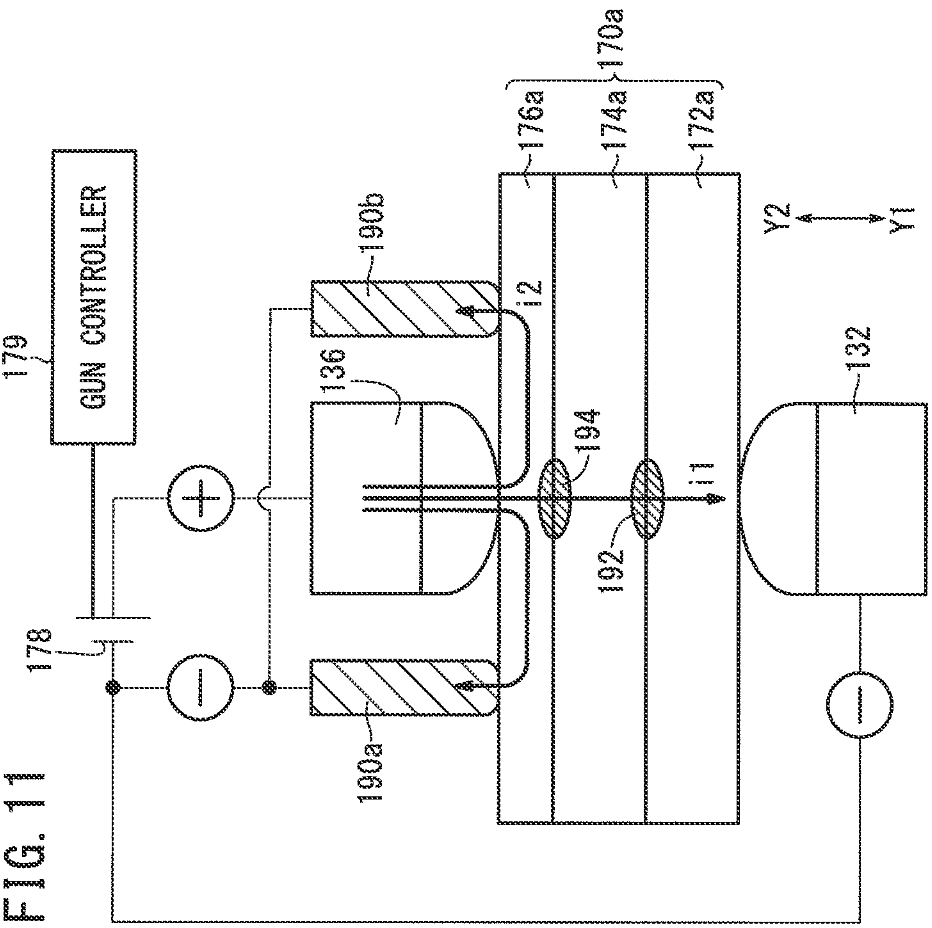
FIG. 11 is a schematic vertical cross-sectional view of the stacked body at the start of energization for generating a current flow from the upper tip to the lower tip after the state of FIG. 10.

Next, energization is started. In the second embodiment, since the upper tip 136 and the lower tip 132 are connected to the positive and negative terminals of the power source 178 respectively, as shown in FIG. 11, a current i1 flows from the upper tip 136 toward the lower tip 132. Heated regions 192, 194 are formed between the metallic plates 172*a*, 174*a* and between the metallic plates 174*a*, 176*a* respectively by Joule heating generated due to the current i1.

Also the auxiliary electrodes 190*a*, 190*b* having the negative polarities are in contact with the metallic plate 176*a*. Therefore, in addition to the current i1, the branching current i2 flows from the upper tip 136 toward the auxiliary electrodes 190*a*, 190*b*.

Thus, in the second embodiment, the branching current i2 is generated not in the metallic plates 172*a*, 174*a* but in the metallic plate 176*a*. As a result, the metallic plate 176*a* exhibits a larger current value in this method as compared to conventional spot welding methods using only the upper tip 136 and the lower tip 132.

Figure 12:
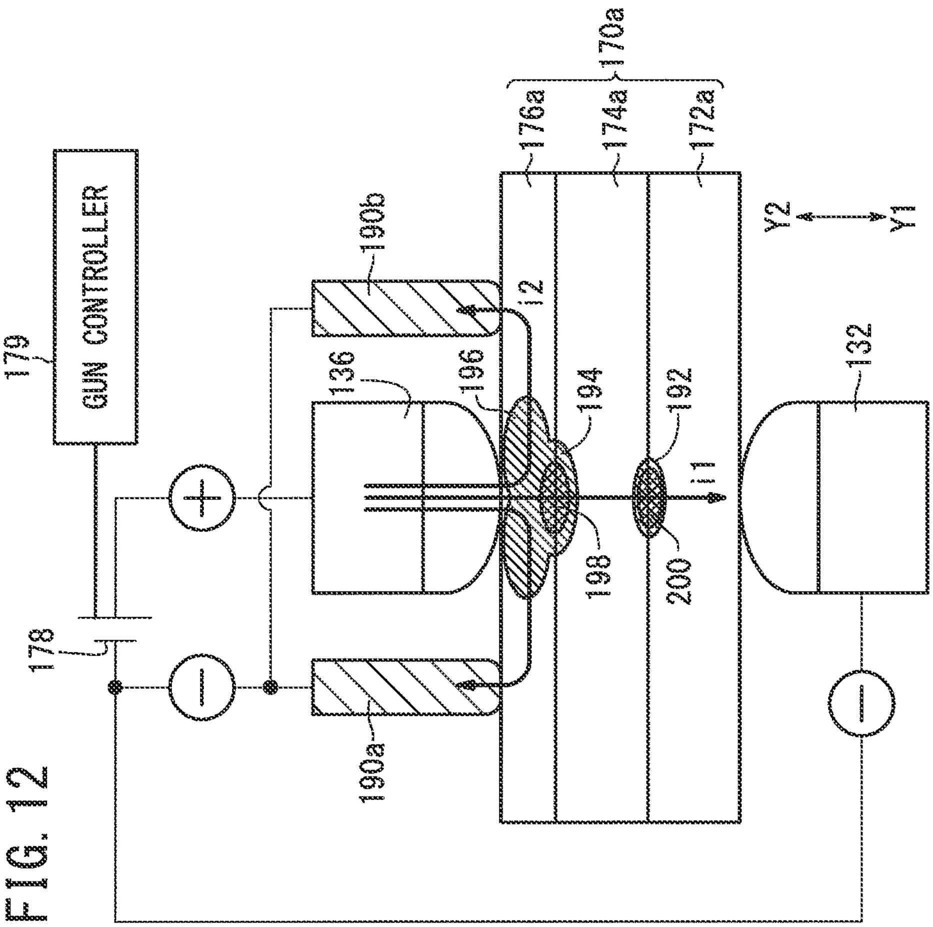
FIG. 12 is a schematic vertical cross-sectional view of the stacked body in the process of further performing the energization continuously after the state of FIG. 11.

In this method, another heated region 196 different from the heated region 194 is formed in the metallic plate 176*a*. As shown in FIG. 12, the heated region 196 is grown with time and then integrated with the heated region 194.

The contact surface between the metallic plates 174*a*, 176*a* is subjected to heat from both of the integrated heated regions 194, 196. Furthermore, in the second embodiment, the contact resistance at the contact surface between the metallic plates 174*a*, 176*a* is higher than that at the contact surface between the metallic plates 172*a*, 174*a* as in the first embodiment. Therefore, the contact surface is heated to a sufficient temperature and melted, so that a nugget 198 is formed between the metallic plates 174*a*, 176*a*.

As the ratio of the branching current i2 is increased, the heated region 196 can be made larger. However, when the ratio of the branching current i2 is excessively high, the current value of the current i1 is reduced, whereby the sizes of the heated regions 192, 194 are reduced. Thus, the size of the nugget 200 is liable to be reduced, while the size of the nugget 198 becomes saturated. The ratio of the branching current i2 is preferably selected in view of growing the nugget 200 to a sufficient size under the current i1.

For example, the ratio between the current i1 and the branching current i2 can be controlled by changing the distances Z3, Z4 between the upper tip 136 and the auxiliary electrodes 190*a*, 190*b* (see FIG. 10) as described above. The ratio between the current i1 and the branching current i2 is preferably e.g. 70:30.

A melted portion and hence the nugget 198 are grown with the passage of time as long as the energization is continued. Therefore, the nugget 198 can be sufficiently grown by performing the energization over an appropriate time.

The current value of the current i1 in the metallic plates 172*a*, 174*a* is smaller than that in a conventional spot welding method. Therefore, the amount by which the metallic plates 172*a*, 174*a* are heated can be prevented from excessively increasing in the process of growing the melted portion (the nugget 198) between the metallic plates 174*a*, 176*a*. Consequently, the apparatus is capable of eliminating the possibility of the spatter generation.

In this process, a melted portion to be solidified into the nugget 200 is formed by the current i1 between the metallic plates 172*a*, 174*a*. When the branching current i2 is continuously applied, the total amount of the current i1 is reduced, and the heated region 192 and hence the nugget 200 are liable to be reduced in size, as compared with the case without the branching current i2.

Figure 13:
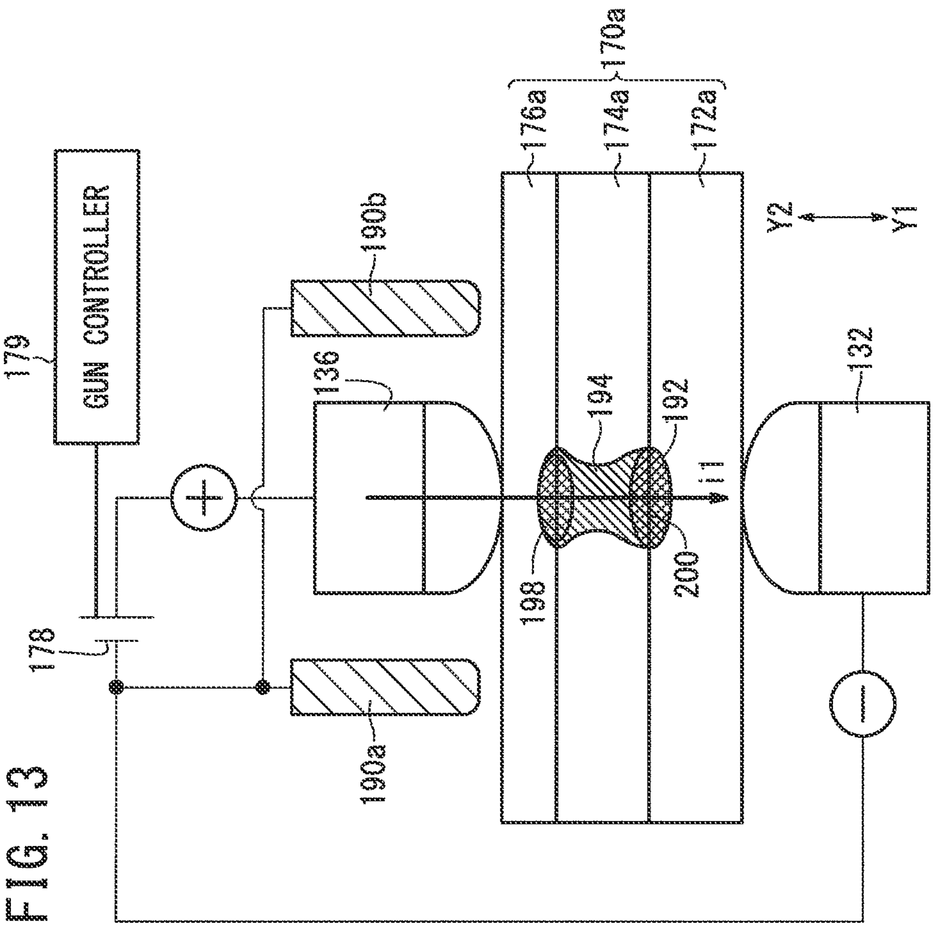
FIG. 13 is a schematic vertical cross-sectional view of the stacked body in the process of further performing the energization from the upper tip to the lower tip continuously after only the auxiliary electrodes are separated from the stacked body.

Therefore, in the case of further increasing the size of the nugget 200, it is preferred that only the auxiliary electrodes 190*a*, 190*b* are separated from the metallic plate 176*a* as shown in FIG. 13, and even thereafter current continues to be conducted from the upper tip 136 to the lower tip 132. When the auxiliary electrodes 190*a*, 190*b* are separated from the metallic plate 176*a*, the current value of the current i1 is increased, and the total amount of the current i1 is increased in the energization.

Only the auxiliary electrodes 190*a*, 190*b* may be separated from the metallic plate 176*a* by using the compressed air supply/discharge mechanism for discharging the compressed air from the rooms 166*a*, 166*b* (see FIG. 2). The pistons 156*a*, 156*b* are moved upward due to the elastic forces of the coil springs 164*a*, 164*b* by discharging the compressed air. Thus, the pistons 156*a*, 156*b*, the piston rods 148*a*, 148*b*, and the auxiliary electrodes 190*a*, 190*b* disposed on the ends of the piston rods 148*a*, 148*b* are moved upward. Consequently, the auxiliary electrodes 190*a*, 190*b* are separated from the metallic plate 176*a*, and are returned to the original positions. A negative pressure may be provided in the rooms 166*a*, 166*b* to lift the piston rods 148*a*, 148*b*.

As a result, the branching current i2 vanishes, so that only the current i1 flows in the metallic plate 176*a* from the upper tip 136 to the lower tip 132, and the heated region 196 (see FIG. 12) disappears.

Thereafter, the metallic plates 172*a*, 174*a* are under a common spot welding condition. Thus, the generated amount of Joule heating is increased in the thick metallic plates 172*a*, 174*a*, whereby the heated region 192 is expanded and further heated to a higher temperature. The contact surface between the metallic plates 172*a*, 174*a* is heated to a sufficient temperature and melted by the heated region 192 having the higher temperature, and the melted portion (the nugget 200) is grown larger.

Figure 14:
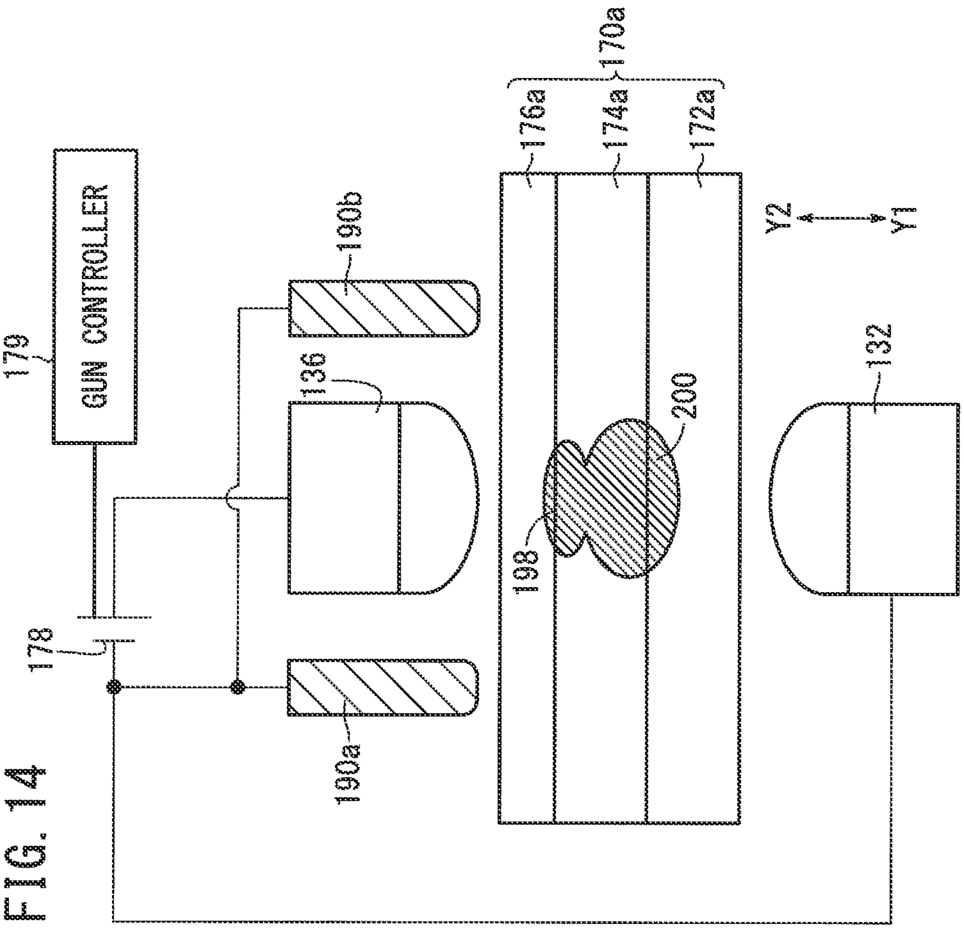
FIG. 14 is a schematic vertical cross-sectional view of the stacked body after completion of the energization (spot welding) by separating the upper tip from the stacked body after the state of FIG. 13.

Thereafter, the energization may be continued until the melted portion (the nugget 200) grows sufficiently, e.g. until the melted portion for forming the nugget 200 is integrated with the melted portion for forming the nugget 198 as shown in FIG. 14. The relation between the energization time and the growth of the nugget 200 may be confirmed in advance by a spot welding test using test pieces.

The contact surface between the metallic plates 172*a*, 174*a* is preheated by the heated region 192 formed by passage of the current i1 while the nugget 198 is grown between the metallic plates 174*a*, 176*a*. Therefore, the affinity of the metallic plates 172*a*, 174*a* with each other is improved before the melted portion to be converted to the nugget 200 is grown larger. Consequently, the spatter generation is hardly caused.

As described above, in the second embodiment, the spatter generation can be prevented in both of the process of growing the nugget 198 between the metallic plates 174*a*, 176*a* and the process of growing the nugget 200 between the metallic plates 172*a*, 174*a*.

After the melted portion for forming the nugget 200 is sufficiently grown in a predetermined time, the energization is stopped, and the upper tip 136 is separated from the metallic plate 176*a* as shown in FIG. 14. Alternatively, the upper tip 136 and the lower tip 132 are electrically isolated by separating the upper tip 136 from the metallic plate 176*a*.

The operations from the start to the end of the spot welding method are performed under the control of the gun controller 179.

When the energization is stopped in the above manner, the heating of the metallic plates 172*a*, 174*a* is stopped. The obtained melted portion is cooled and solidified with the passage of time, whereby the metallic plates 172*a*, 174*a* are joined to each other by the nugget 200.

Consequently, in the stacked body 170*a*, the metallic plates 172*a*, 174*a* are joined to each other, and the metallic plates 174*a*, 176*a* are joined to each other, to obtain a bonded article as a final product.

The bonded product is excellent in the bonding strengths between the metallic plates 172*a*, 174*a* and between the metallic plates 174*a*, 176*a*. This is because the nugget 198 between the metallic plates 174*a*, 176*a* is sufficiently grown under the flow of the branching current i2 in the metallic plate 176*a* as described above.

As described above, in the spot welding apparatus of the second embodiment, the auxiliary electrodes 190*a*, 190*b* can be formed only by electrically connecting the pressing members 138*a*, 138*b* to the negative terminal of the power source 178. Therefore, the structure of the spot welding apparatus is not complicated due to the auxiliary electrodes 190*a*, 190*b*.

Also in the second embodiment, the offset loads on the air cylinders 146*a*, 146*b* can be easily reduced as in the first embodiment.

Also in the second embodiment, the object to be welded is not limited to the stacked body 170*a*. The number of the metallic plates, the materials, and the thicknesses may be variously changed in the stacked body. Several specific examples will be described below.

Figure 15:
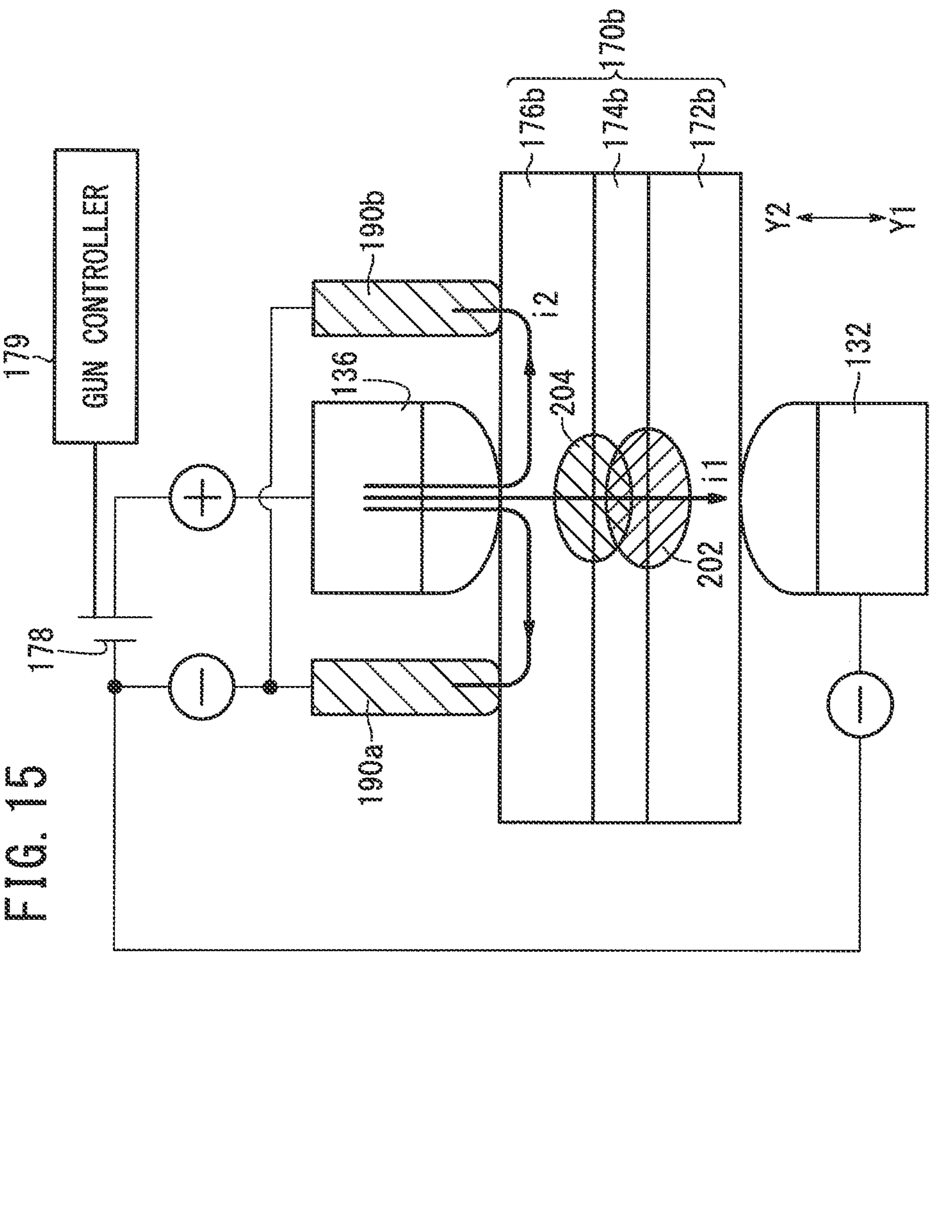
FIG. 15 is a schematic front view of essential features showing a stacked body different from that of FIG. 10, gripped by the lower tip, the upper tip, and the auxiliary electrodes, at the start of the energization.

In the stacked body 170*b* shown in FIG. 15, the metallic plate 174*b* having the smallest thickness is interposed between the metallic plates 172*b*, 176*b* as described above. For example, the metallic plate 172*b* is a high resistance workpiece composed of a high tensile strength steel, and the metallic plates 174*b*, 176*b* are low resistance workpieces composed of a mild steel.

In a case where the stacked body 170*b* is spot-welded only by the upper tip 136 and the lower tip 132, the contact surface between the metallic plates 172*b*, 174*b* is melted first. This is because the metallic plate 172*b* is the high resistance workpiece, whereby the contact resistance between the metallic plates 172*b*, 174*b* is higher than that between the metallic plates 174*b*, 176*b*. Therefore, when the energization of the upper tip 136 and the lower tip 132 is continued to sufficiently grow the nugget at the contact surface between the metallic plates 174*b*, 176*b*, the spatter generation may be caused at the contact surface between the metallic plates 172*b*, 174*b*.

In contrast, as shown in FIG. 15, since the auxiliary electrodes 190*a*, 190*b* are used in the second embodiment, both the heated regions 192, 194 are formed at the contact surface between the metallic plates 172*b*, 174*b* and the contact surface between the metallic plates 174*b*, 176*b* respectively. This is because the contact surface between the metallic plates 174*b*, 176*b* is sufficiently heated by the branching current i2 in the metallic plate 176*b* in the same manner as the above stacked body 170*a*.

Figure 16:
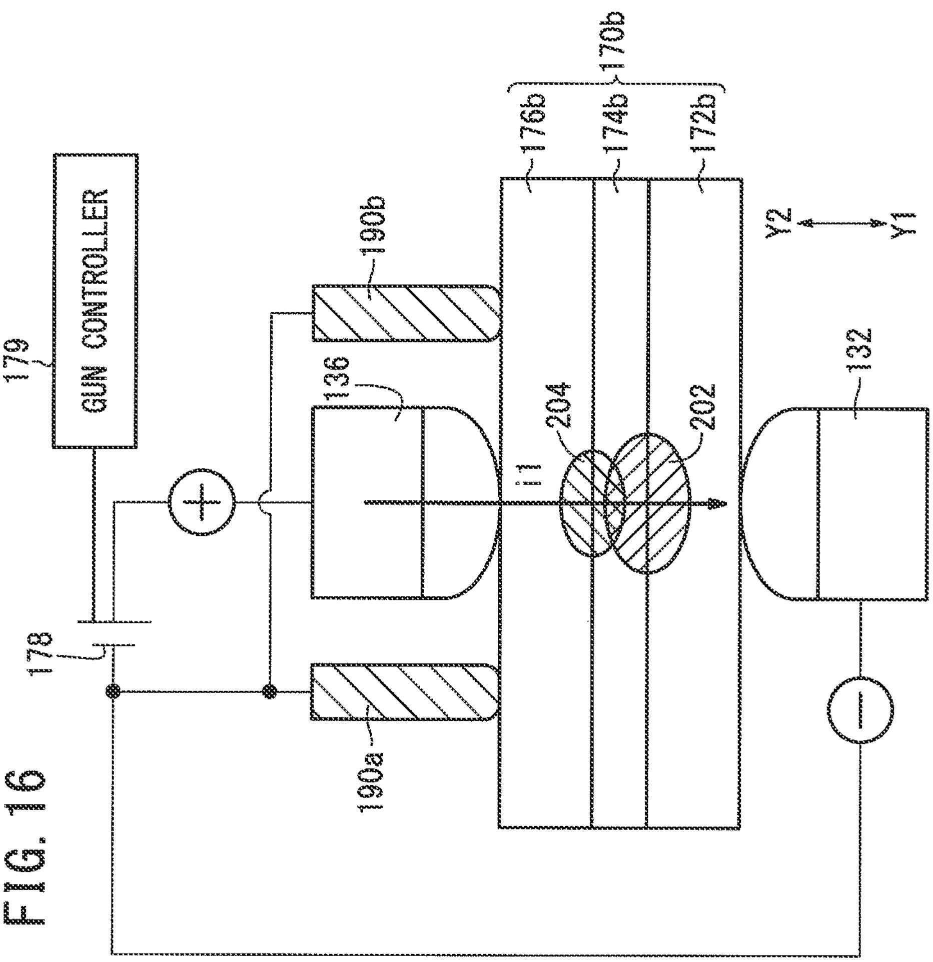
FIG. 16 is a schematic vertical cross-sectional view of the stacked body in the process of further performing the energization from the upper tip to the lower tip continuously after the auxiliary electrodes are electrically disconnected from a negative terminal of a power source.
Figure 17:
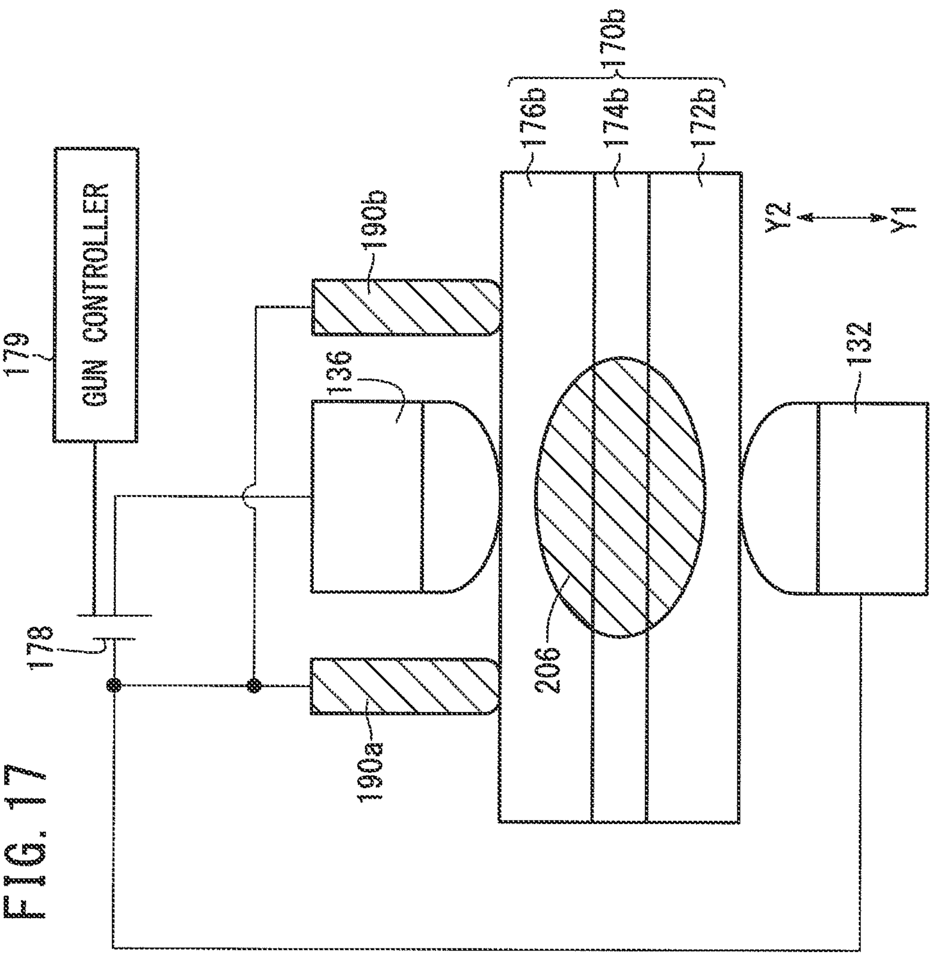
FIG. 17 is a schematic vertical cross-sectional view of the stacked body at the end of the energization (spot welding)

Consequently, nuggets 202, 204 are formed as shown in FIG. 16. After the branching current i2 has vanished, the current i1 may be continuously applied. In this case, for example, as shown in FIG. 17, a sufficiently larger nugget 206 can be developed over the contact surface between the metallic plates 172*b*, 174*b* and the contact surface between the metallic plates 174*b*, 176*b*.

As is clear from the above explanations of the spot welding of the stacked assemblies 170*a*, 170*b*, by using the auxiliary electrodes 190*a*, 190*b*, the heated regions and hence the nuggets can be shifted closer to the auxiliary electrodes 190*a*, 190*b*.

Though the metallic plate 172*b* is composed of the high tensile strength steel and the metallic plates 174*b*, 176*b* are composed of the mild steel in the above example, of course, the combination of the materials are not particularly limited thereto.

Figure 18:
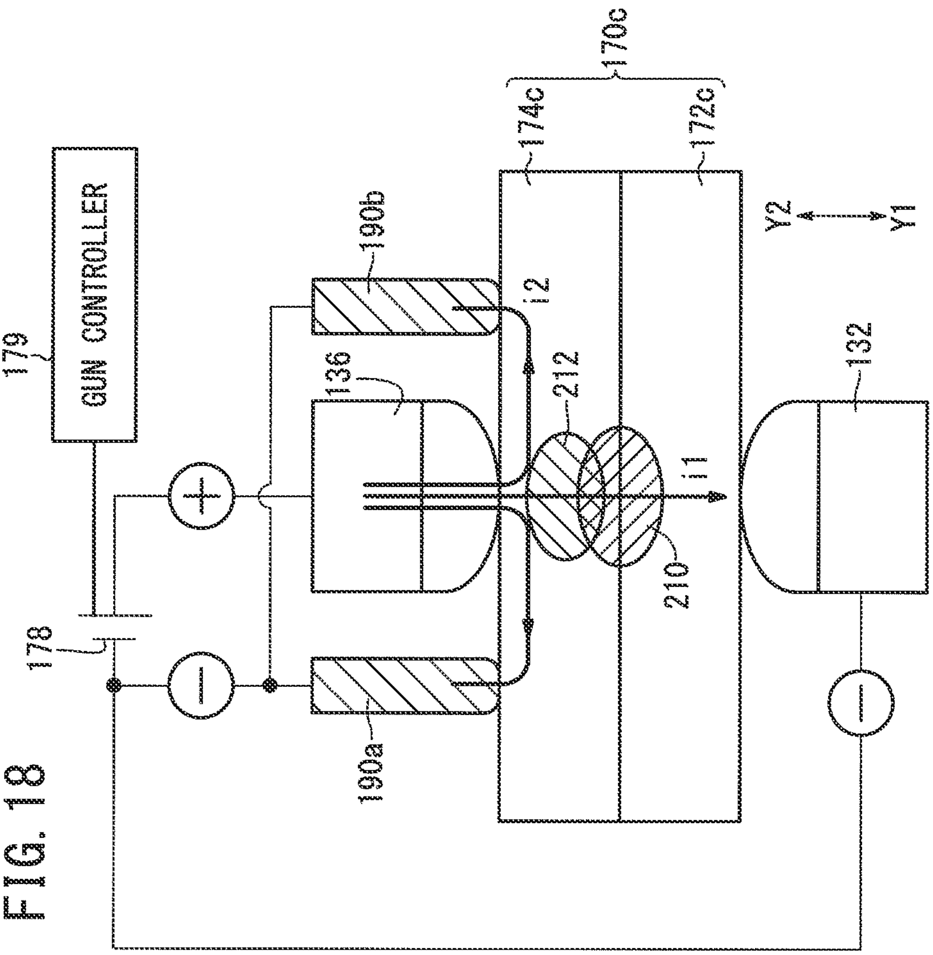
FIG. 18 is a schematic front view of essential features showing a stacked body different from those of FIGS. 10 and 15, gripped by the lower tip, the upper tip, and the auxiliary electrodes, at the start of the energization.
Figure 75:
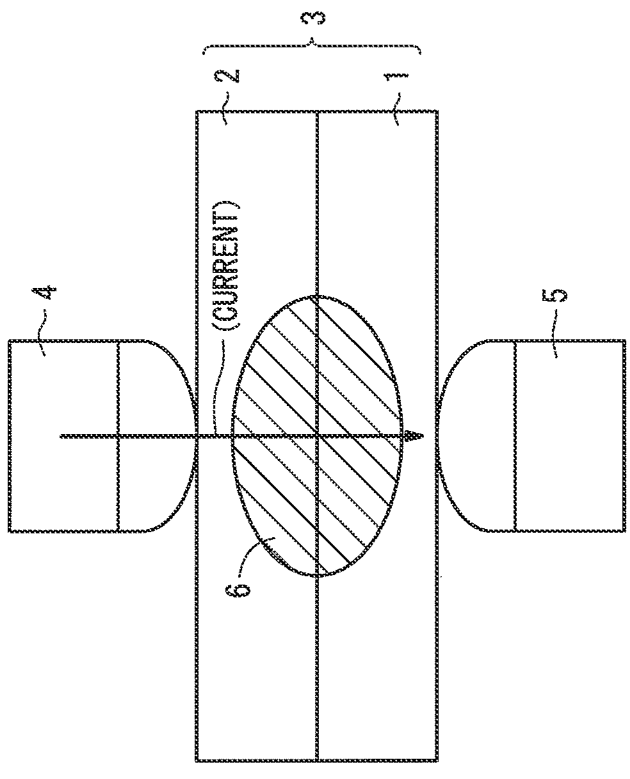
FIG. 75 is a schematic vertical cross-sectional view of a melted portion grown larger after the state of FIG. 74.
Figure 76:
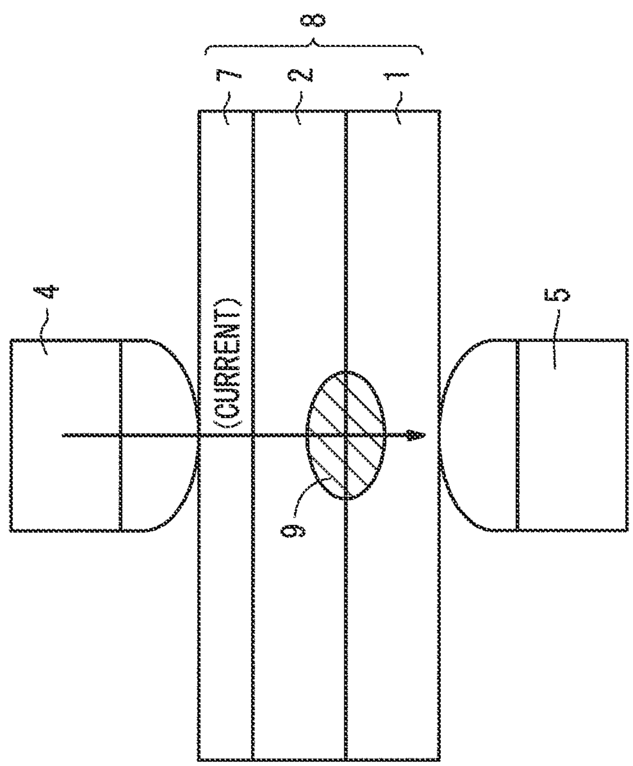
FIG. 76 is a schematic vertical cross-sectional view of a stacked body different from that of FIG. 74, gripped only by the lower and upper tips, in the process of generating a current flow from the upper tip to the lower tip.
Figure 77:
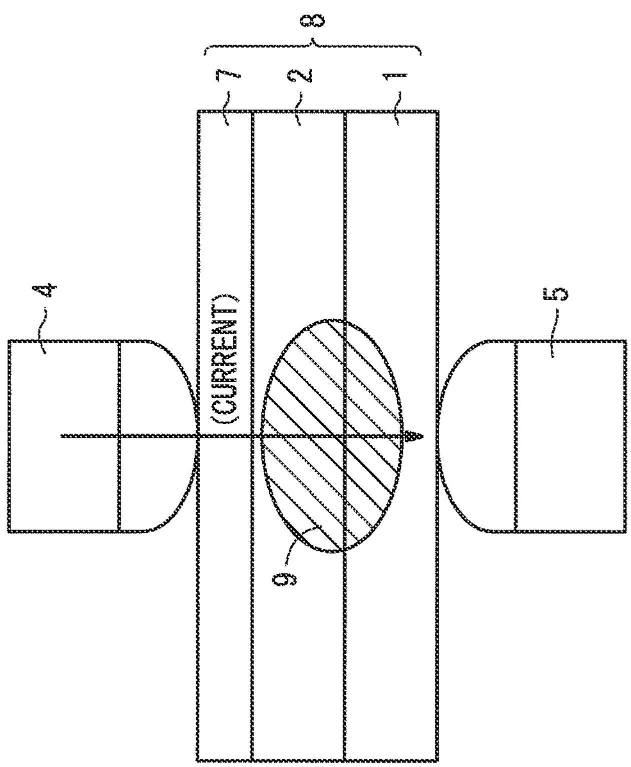
FIG. 77 is a schematic vertical cross-sectional view of a melted portion grown larger after the state of FIG. 76.
Figure 78:
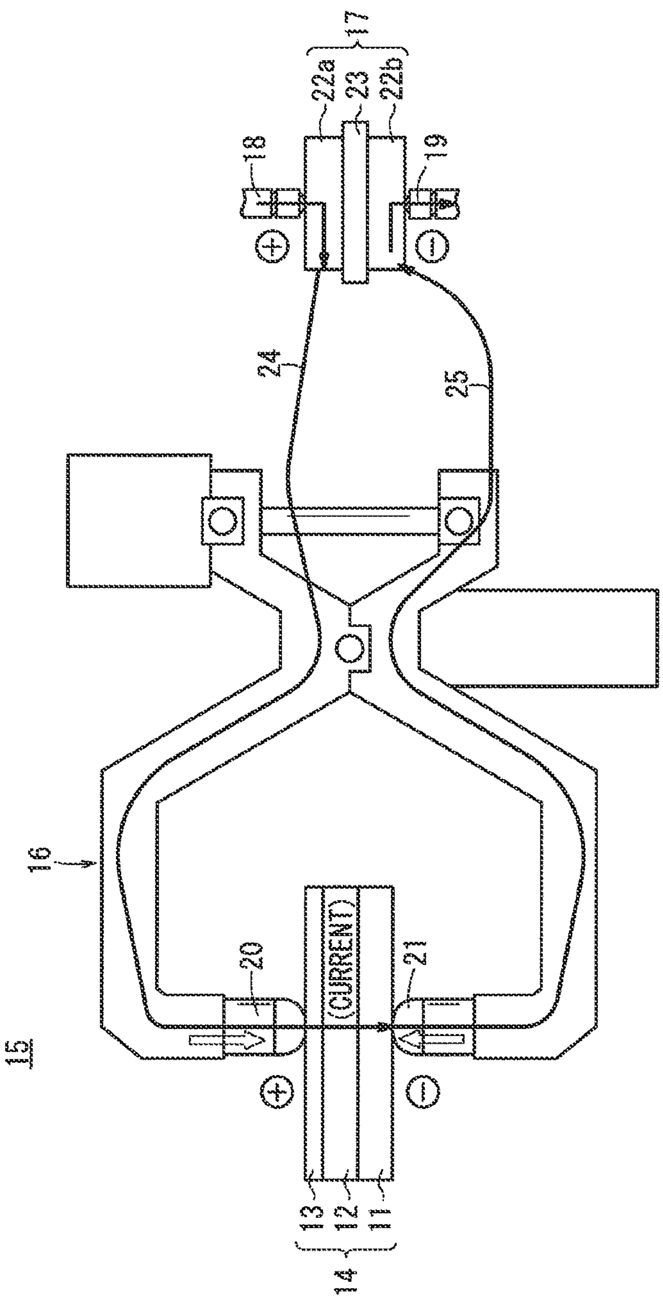
FIG. 78 is a side view of essential features showing a conventional indirect feeding type welding apparatus.
Figure 79:
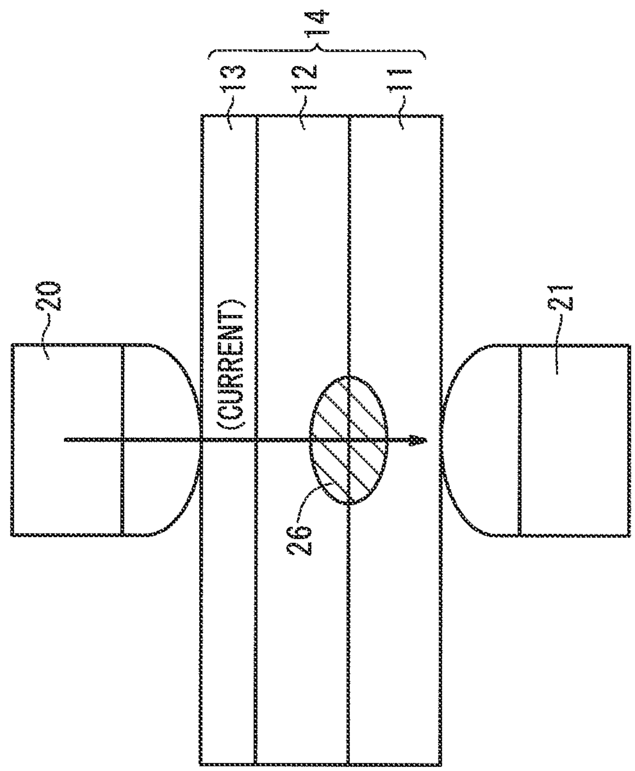
FIG. 79 is a schematic vertical cross-sectional view of a stacked body, gripped only by a lower tip and an upper tip in the indirect feeding type welding apparatus of FIG. 78, in the process of generating a current flow from the upper tip to the lower tip.

The stacked body 170*c* shown in FIG. 18 is provided by stacking the metallic plate 174*c* on the metallic plate 172*c* and may be spot-welded by using the auxiliary electrodes 190*a*, 190*b*, the both metallic plates being composed of a high tensile strength steel. As shown in FIGS. 75 and 77, in the case of not using the auxiliary electrodes 190*a*, 190*b*, the melted portions 6, 9 grow larger at the contact surface between the metallic plates 172*c*, 174*c* (the high resistance workpieces 1, 2) in a relatively short time. Therefore, the spatter generation is liable to be caused.

In contrast, as shown in FIG. 18, since the auxiliary electrodes 190*a*, 190*b* are used in the second embodiment, a heated region 210 is formed at the contact surface between the metallic plates 172*c*, 174*c*, and a heated region 212 is formed above the contact surface (i.e. in the vicinity of the auxiliary electrodes 190*a*, 190*b* in the metallic plate 174*c*). This is because the metallic plate 174*c* is sufficiently heated by the flow of the branching current i2 in the metallic plate 174*c*. Thus, also in this case, the heated regions and hence the nuggets (see FIG. 18) can be shifted closer to the auxiliary electrodes 190*a*, 190*b*.

Figure 19:
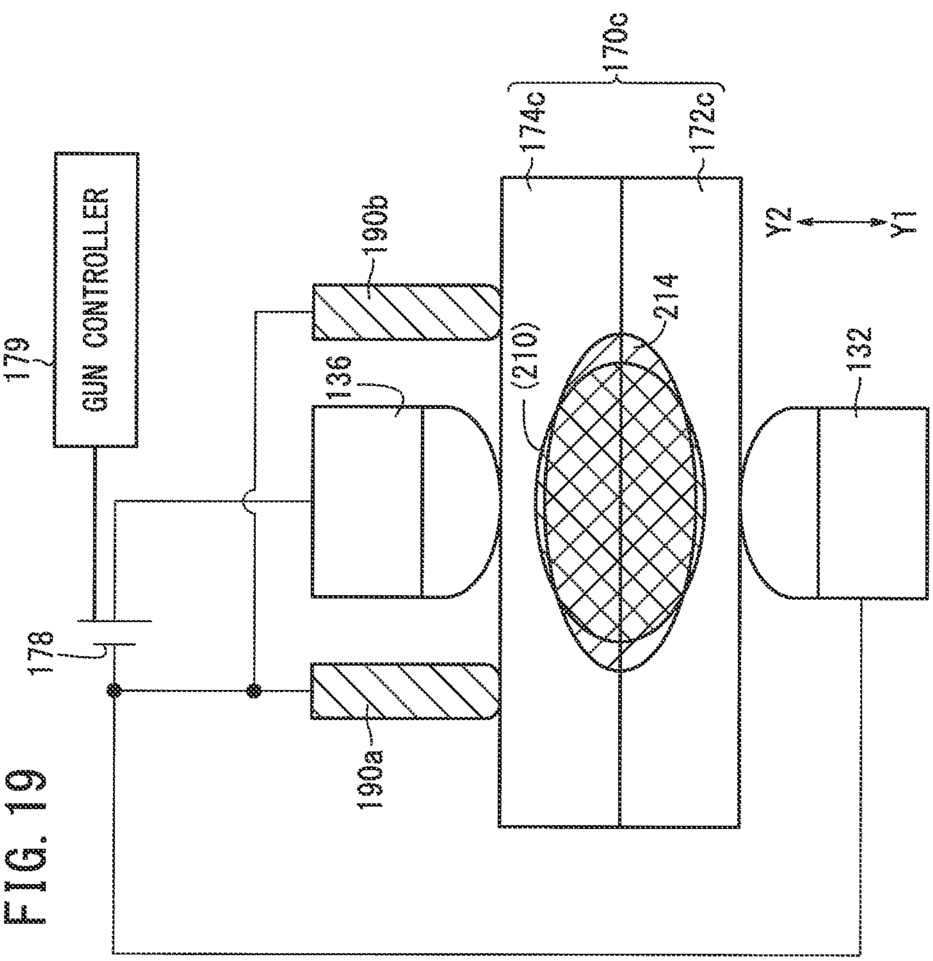
FIG. 19 is a schematic vertical cross-sectional view of the stacked body after completion of the energization (spot welding)

Consequently, the contact surface between the metallic plates 172*c*, 174*c* is softened, thereby improving the sealing property. Thus, even when the current i1 is continuously applied to form a sufficiently large nugget 214 as shown in FIG. 19, the spatter generation is hardly caused.

Spot welding of a stacked body 170*d* shown in FIG. 20 will be described below. The stacked body 170*d* is obtained by stacking a low resistance metallic plate 172*d* composed of a mild steel, high resistance metallic plates 174*d*, 176*d* composed of a high tensile strength steel, and a low resistance metallic plate 215*d* composed of a mild steel in this order from below. The metallic plates 172*d*, 215*d* has thicknesses smaller than those of the metallic plates 174*d*, 176*d*.

The auxiliary electrodes 190*a*, 190*b* are disposed in the vicinity of the upper tip 136, and furthermore auxiliary electrodes 190*c*, 190*d* are disposed in the vicinity of the lower tip 132. The auxiliary electrodes 190*c*, 190*d* are electrically connected to the positive terminal of the power source 178, and thereby have a polarity opposite to that of the lower tip 132. The auxiliary electrodes 190*c*, 190*d* can be located in this manner by disposing the holder 140 and the air cylinders 146*a*, 146*b* in the vicinity of the lower tip 132 as in the vicinity of the upper tip 136.

Figure 20:
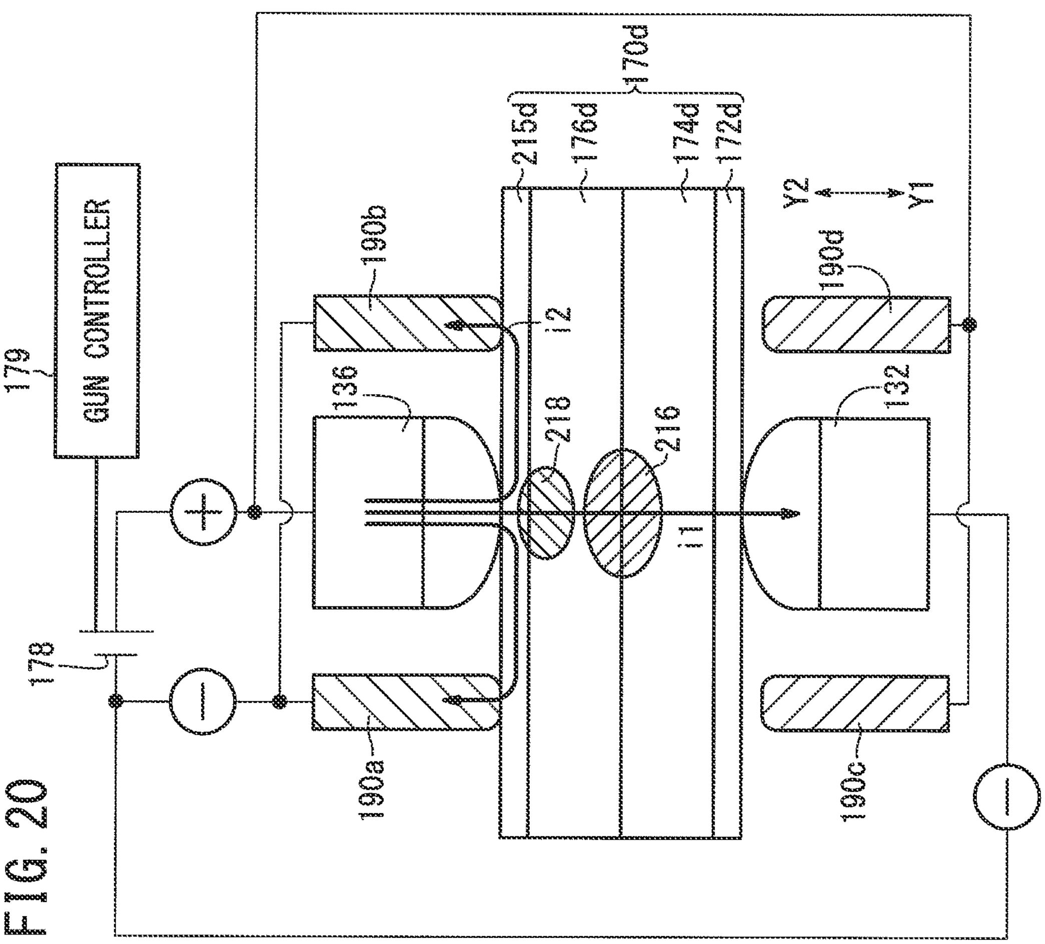
FIG. 20 is a schematic front view of essential features showing a stacked body different from those of FIGS. 10 and 15, gripped by the lower tip, the upper tip, and the auxiliary electrodes, at the start of the energization.

As shown in FIG. 20, the stacked body 170*d* is gripped between the upper tip 136 and the lower tip 132. Before, at the same time as, or after the gripping, only the auxiliary electrodes 190*a*, 190*b* are brought into contact with the metallic plate 215*d*. When the energization is started, the current i1 flows from the upper tip 136 to the lower tip 132, and the branching current i2 flows from the upper tip 136 to the auxiliary electrodes 190*a*, 190*b*. Then, nuggets 216, 218 are formed at the contact surfaces between the metallic plates 174*d*, 176*d* and between the metallic plates 176*d*, 215*d* respectively.

Figure 21:
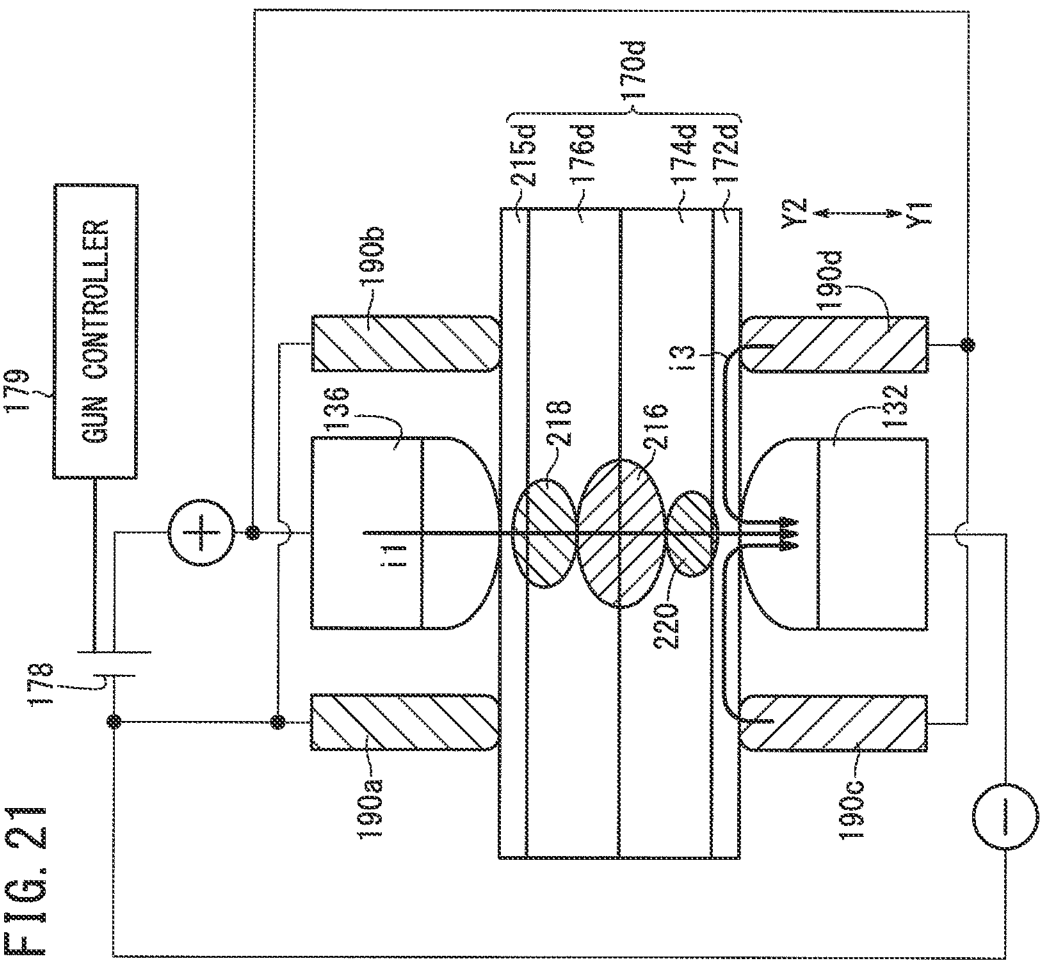
FIG. 21 is a schematic vertical cross-sectional view of the stacked body in the process of further performing the energization from the upper tip to the lower tip continuously after the auxiliary electrodes in the vicinity of the upper tip are electrically disconnected from the negative terminal of the power source, and the auxiliary electrodes in the vicinity of the lower tip are brought into contact with a workpiece.

Then, as shown in FIG. 21, the auxiliary electrodes 190*a*, 190*b* are electrically disconnected from the negative terminal of the power source 178 to eliminate the branching current i2. Before, at the same time as, or after the disconnection, the auxiliary electrodes 190*c*, 190*d* are brought into contact with the metallic plate 172*d*. As a result, a branching current i3 flows through the undermost metallic plate 172*d* from the auxiliary electrodes 190*c*, 190*d* to the lower tip 132.

When the branching current i2 vanishes, the growth of the nugget 218 is stopped. Meanwhile, the current i1 continuously flows from the upper tip 136 to the lower tip 132, and therefore the nugget 216 is grown larger at the contact surface between the metallic plates 174*d*, 176*d*. Furthermore, another nugget 220 is formed at the contact surface between the metallic plates 172*d*, 174*d* by the branching current i3.

Figure 22:
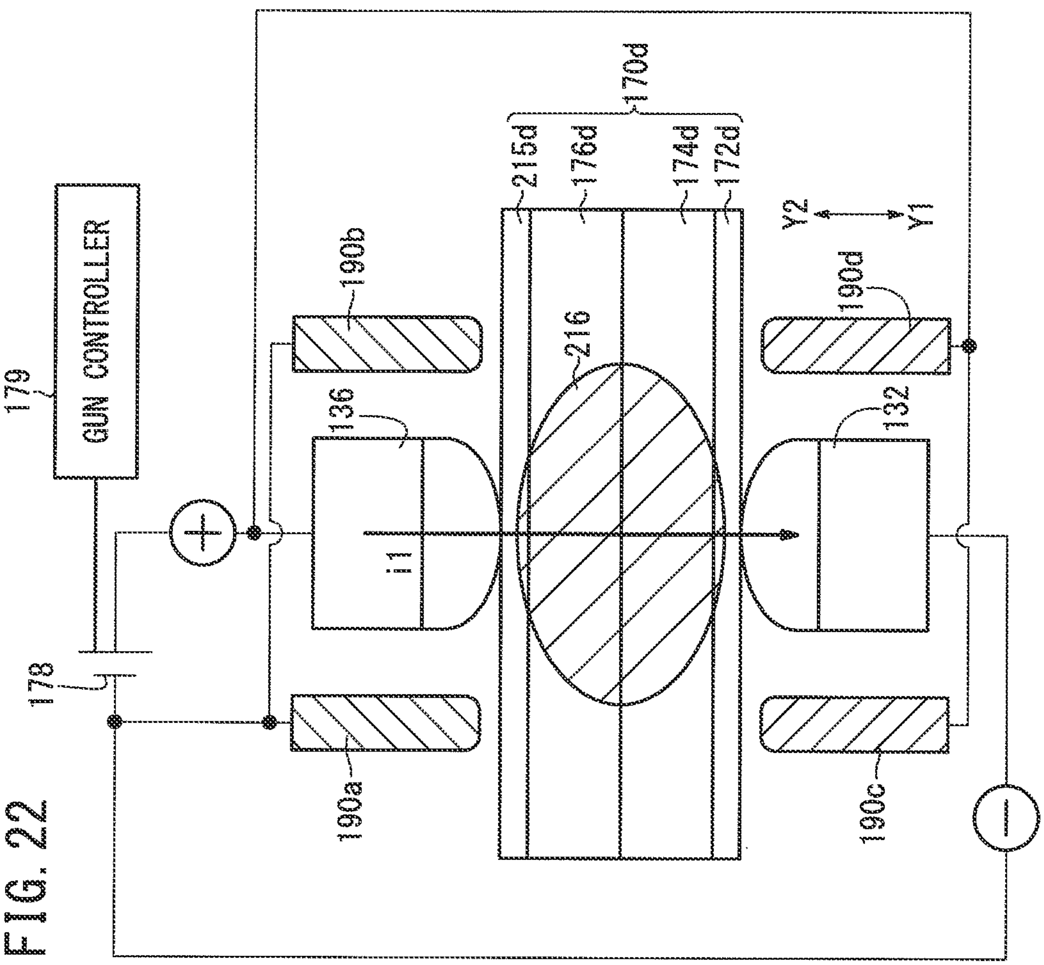
FIG. 22 is a schematic vertical cross-sectional view of the stacked body in the process of further performing the energization from the upper tip to the lower tip continuously after the auxiliary electrodes in the vicinity of the lower tip are electrically disconnected from a positive terminal of the power source.

Then, as shown in FIG. 22, the auxiliary electrodes 190*c*, 190*d* are separated from the metallic plate 172*d* to eliminate the branching current i3, whereby the growth of the nugget 220 is stopped. Thereafter, by continuously applying the current i1, only the nugget 216 at the contact surface between the metallic plates 174*d*, 176*d* may be further grown larger and may be integrated with the nuggets 218, 220.

The object to be welded may have a complicated shape. As described above, even in this case, the object to be welded can be located in a desired welding position without interference from the upper tip 136 and the auxiliary electrodes 190*a*, 190*b*.

Though the auxiliary electrodes 190*a*, 190*b* are separated from the metallic plate 176*a* prior to the upper tip 136 in the second embodiment, the auxiliary electrodes 190*a*, 190*b* and the upper tip 136 may be separated from the metallic plate 176*a* at the same time.

Figure 23:
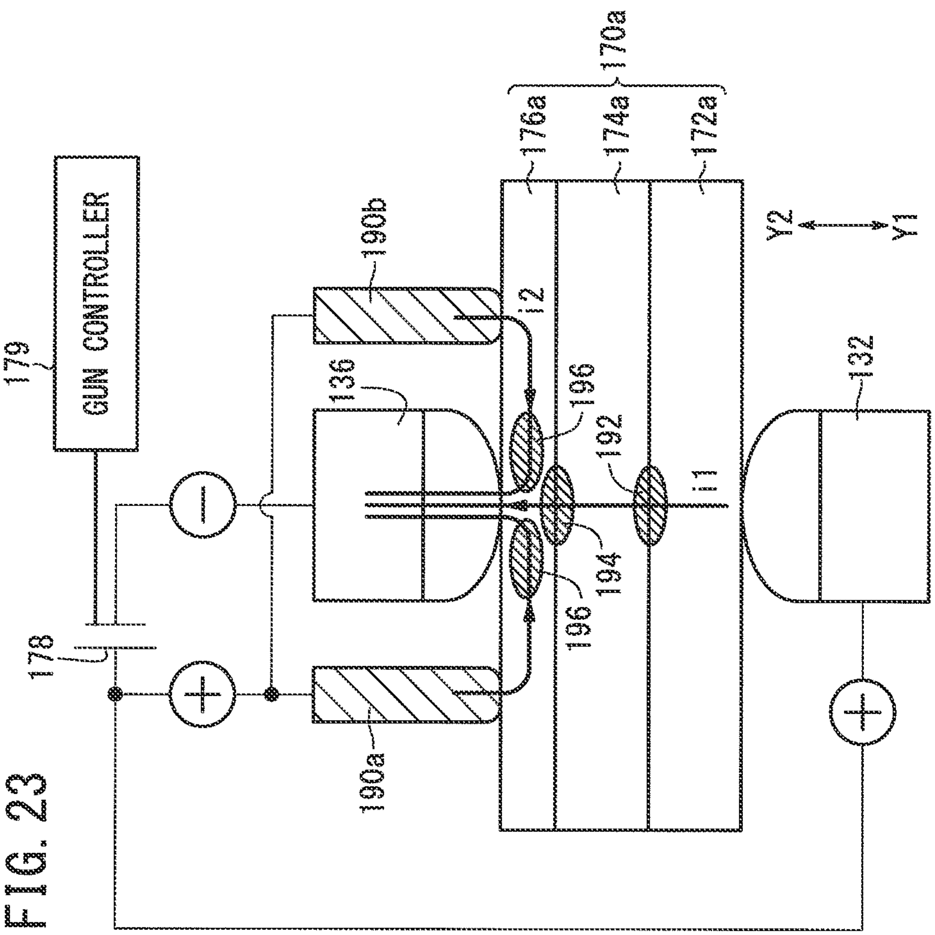
FIG. 23 is a schematic vertical cross-sectional view of the stacked body in which a current flows from the lower tip and the auxiliary electrodes to the upper tip in the direction opposite to that of FIG. 11.

As shown in FIG. 23, a current may flow from the lower tip 132 on the metallic plate 172*a* to the upper tip 136 on the metallic plate 176*a*. Also in this case, the auxiliary electrodes 190*a*, 190*b* on the metallic plate 176*a* have polarities opposite to that of the upper tip 136. Thus, the lower tip 132 and the auxiliary electrodes 190*a*, 190*b* are electrically connected to the positive terminal of the power source 178, and the upper tip 136 is electrically connected to the negative terminal of the power source 178. Consequently, the current i1 flows from the lower tip 132 to the upper tip 136, and the branching current i2 flows from the auxiliary electrodes 190*a*, 190*b* to the upper tip 136.

Figure 24:
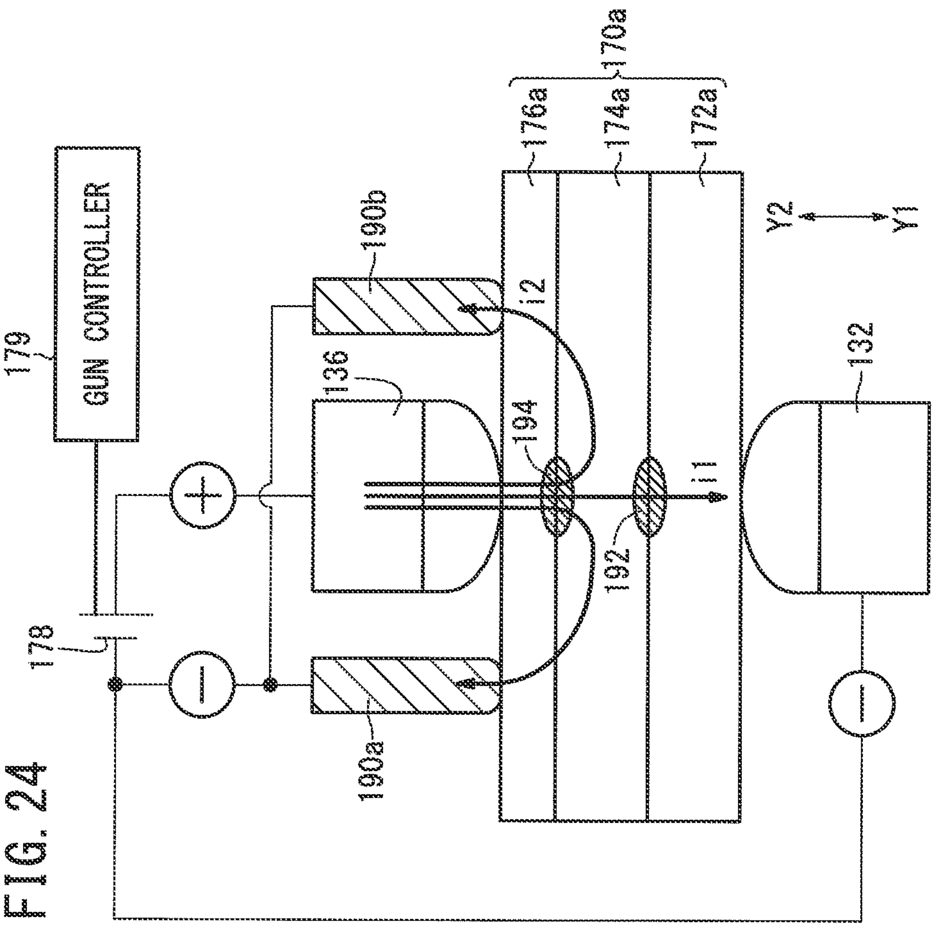
FIG. 24 is a schematic vertical cross-sectional view of a current flow from the upper tip to the auxiliary electrodes through the uppermost workpiece and the workpiece located immediately beneath the uppermost workpiece in the stacked body.

As shown in FIG. 24, the branching current i2 may flow not only in the metallic plate 176*a* on the upper tip 136 but also in the metallic plate 174*a* located immediately beneath the metallic plate 176*a*.

The auxiliary electrodes 190*a*, 190*b* are separated from the metallic plate 176*a* in the above manner. Alternatively, a switch may be disposed between the auxiliary electrodes 190*a*, 190*b* and the power source 178, and only the branching current, which flows in the direction from the upper tip 136 to the auxiliary electrodes 190*a*, 190*b* or the opposite direction, may be stopped by turning the switch to the disconnected (off) state. In this case, of course, the switch is turned to the connected (on) state to form the heated region 196.

In any case, the auxiliary electrode is not particularly limited to the above-described two auxiliary electrodes 190*a*, 190*b* having the long rod shape. For example, one, three, or more long rods may be used as the auxiliary electrodes. In the case of using three or more auxiliary electrodes, a plurality of the auxiliary electrodes 190*a*, 190*b* may be contacted with and separated from the outermost metallic plate at the same time in the same manner as the two auxiliary electrodes 190*a*, 190*b*. Each auxiliary electrode may have a ring shape surrounding the lower tip 132 or the upper tip 136.

The auxiliary electrodes 190*a*, 190*b* in the spot welding apparatus of the second embodiment may be electrically isolated from the power source 178 to perform the spot welding method of the first embodiment. Thus, in the spot welding apparatus of the second embodiment, the auxiliary electrodes 190*a*, 190*b* can be energized or not energized, and thereby can be used only as the pressing members or used also as the electrodes for generating the branching current i2.

Furthermore, though the C-type welding gun is used in the first and second embodiments, the welding gun may be a so-called X-type gun. In this case, the lower tip 132 and the upper tip 136 may be mounted on a pair of openable and closable chucks respectively. When the chucks are opened or closed, the lower tip 132 and the upper tip 136 are moved away from or close to each other.

It is to be understood that the stacked body may contain five or more metallic plates.

A welding apparatus (spot welding apparatus) according to a third embodiment will be described below.

Figure 25:
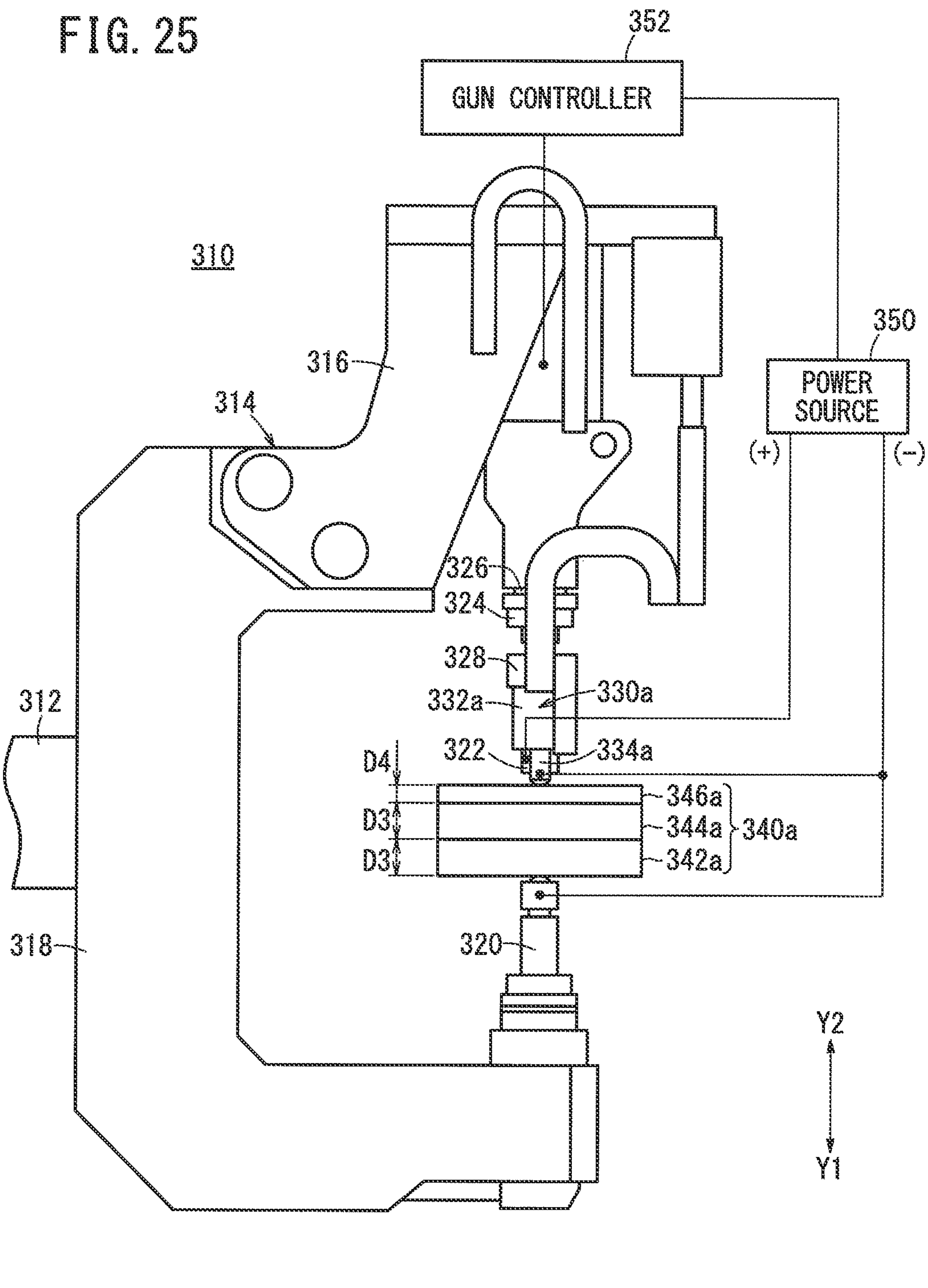
FIG. 25 is a schematic side view of essential features showing a welding apparatus (spot welding apparatus) according to a third embodiment of the present invention.
Figure 26:
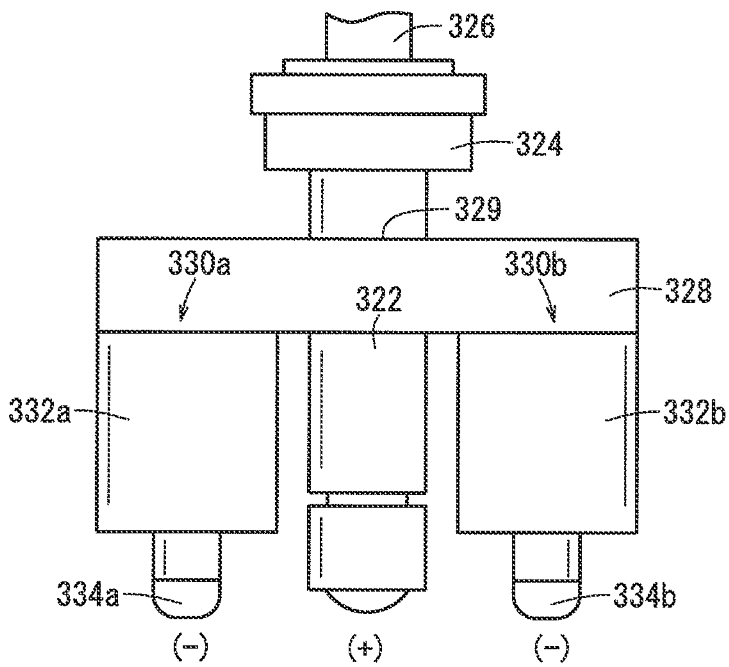
FIG. 26 is an enlarged schematic front view of essential features showing the spot welding apparatus of FIG. 25.

FIG. 25 is a schematic side view of a spot welding apparatus 310 according to a third embodiment, and FIG. 26 is an enlarged front view of a main part thereof. The spot welding apparatus 310 contains a robot having an arm (not shown) and a welding gun 314 supported on a wrist 312 of the arm.

The welding gun 314 is a so-called C-type gun having an approximately C-shaped fixed arm 318 under a gun body 316. A lower tip 320 is disposed as a second welding tip on the lower end of the fixed arm 318, and extends toward the gun body 316.

The gun body 316 contains a ball screw mechanism (not shown) for displacing, in the vertical direction (the arrow Y2 or Y1 direction) of FIGS. 25 and 26, a holder 324 having an upper tip 322 as a first welding tip. Specifically, the holder 324 is disposed on the end of a displacement shaft 326, which projects from the gun body 316 and extends toward the lower tip 320. The displacement shaft 326 is displaced by a ball screw in the ball screw mechanism in the vertical direction of FIG. 25, and thus the upper tip 322 is displaced by the holder 324.

Thus, the ball screw mechanism is a first displacement mechanism for displacing the upper tip 322. The ball screw is rotated by a servomotor (not shown) in the ball screw mechanism.

A substantially plate-shaped bracket 328 (support member) is attached to the body of the upper tip 322. The bracket 328 has a through-hole 329, which has a diameter approximately equal to the body diameter of the upper tip 322. The body of the upper tip 322 is inserted and fitted into the through-hole 329.

As shown in detail in FIG. 26, two actuators 330*a*, 330*b* are disposed in the bracket 328. Auxiliary electrodes 334*a*, 334*b*, which act as pressing members, project from tubes 332*a*, 332*b* in the actuators 330*a*, 330*b* and extend parallel to the upper tip 322. The auxiliary electrodes 334*a*, 334*b* are displaced by the actuators 330*a*, 330*b* close to and away from the lower tip 320 (in the arrow Y1 and Y2 directions). Thus, the actuators 330*a*, 330*b* act as second displacement mechanisms for displacing the auxiliary electrodes 334*a*, 334*b* and as pressing force generation/control mechanisms for generating and controlling pressing forces of the auxiliary electrodes 334*a*, 334*b*.

A stacked body 340*a* to be welded contains three metallic plates 342*a*, 344*a*, 346*a* arranged upwardly in this order. Each of the metallic plates 342*a*, 344*a* has a thickness D3 (e.g. about 1 to 2 mm), and the metallic plate 346*a* has a thickness D4 smaller than the thickness D3 (e.g. about 0.5 to 0.7 mm). Thus, the metallic plates 342*a*, 344*a* have the same thickness, and the metallic plate 346*a* is thinner than the metallic plates 342*a*, 344*a*. In other words, the metallic plate 346*a* has the smallest thickness among the three metallic plates 342*a*, 344*a*, 346*a* in the stacked body 340*a*.

For example, each of the metallic plates 342*a*, 344*a* is a high resistance workpiece made of a so-called high tensile strength steel, such as a high-performance high tensile strength steel sheet JAC590, JAC780, or JAC980 (defined according to the Japan Iron and Steel Federation Standard). For example, the metallic plate 346*a* is a low resistance workpiece made of a so-called mild steel, such as a high-performance steel sheet JAC270 for press-forming (defined according to the Japan Iron and Steel Federation Standard). The metallic plates 342*a*, 344*a* may be made of the same or different metal materials.

The stacked body 340*a* to be welded is interposed between the lower tip 320 and the upper tip 322, and is energized by the lower tip 132 and the upper tip 136. The lower tip 320 and the auxiliary electrodes 334*a*, 334*b* are electrically connected to a negative terminal of a power source 350, and the upper tip 322 is electrically connected to a positive terminal of the power source 350. Therefore, in the third embodiment, a current flows from the upper tip 322 to the lower tip 320 and the auxiliary electrodes 334*a*, 334*b*. Thus, the auxiliary electrodes 334*a*, 334*b* have polarities opposite to that of the upper tip 322 though all the components are brought into contact with the uppermost metallic plate 346*a* in the stacked body 340*a*.

As described in detail hereinafter, the distances Z3, Z4 (see FIG. 27) between the upper tip 322 and the auxiliary electrodes 334*a*, 334*b* are controlled to achieve an appropriate pressure distribution in the metallic plate 346*a* and the metallic plate 344*a* located immediately beneath the metallic plate 346*a*.

In this structure, the servomotor in the ball screw mechanism and the power source 350 are electrically connected to a gun controller 352 serving as a control means. Thus, the operation, actuation, and deactuation of the servomotor and the power source 350 are controlled by the gun controller 352.

The spot welding apparatus 310 of the third embodiment is basically constructed as described above. Operations and advantages of the spot welding apparatus 310 will be described below in relation to a spot welding method according to the third embodiment.

In the spot welding method for welding the stacked body 340*a*, i.e. for joining the metallic plates 342*a*, 344*a* to each other as well as joining the metallic plates 344*a*, 346*a* to each other, first the robot moves the wrist 312 and thus the welding gun 314 to locate the stacked body 340*a* between the lower tip 320 and the upper tip 322.

After the gun body 316 is lowered to a predetermined position, the servomotor in the ball screw mechanism is actuated to start the rotation of the ball screw under the control of the gun controller 352. Then, the displacement shaft 326 is lowered in the arrow Y1 direction, whereby the upper tip 322 and the auxiliary electrodes 334*a*, 334*b* are moved downward closer to the stacked body 340*a*. Consequently, the stacked body 340*a* is gripped between the lower tip 320 and the upper tip 322.

Meanwhile, the gun controller 352 sends a control signal to the actuators 330*a*, 330*b*, so that the actuators 330*a*, 330*b* acts to perform the downward movement. Consequently, the auxiliary electrodes 334*a*, 334*b* are lowered toward the stacked body 340*a* in the arrow Y1 direction.

Figure 27:
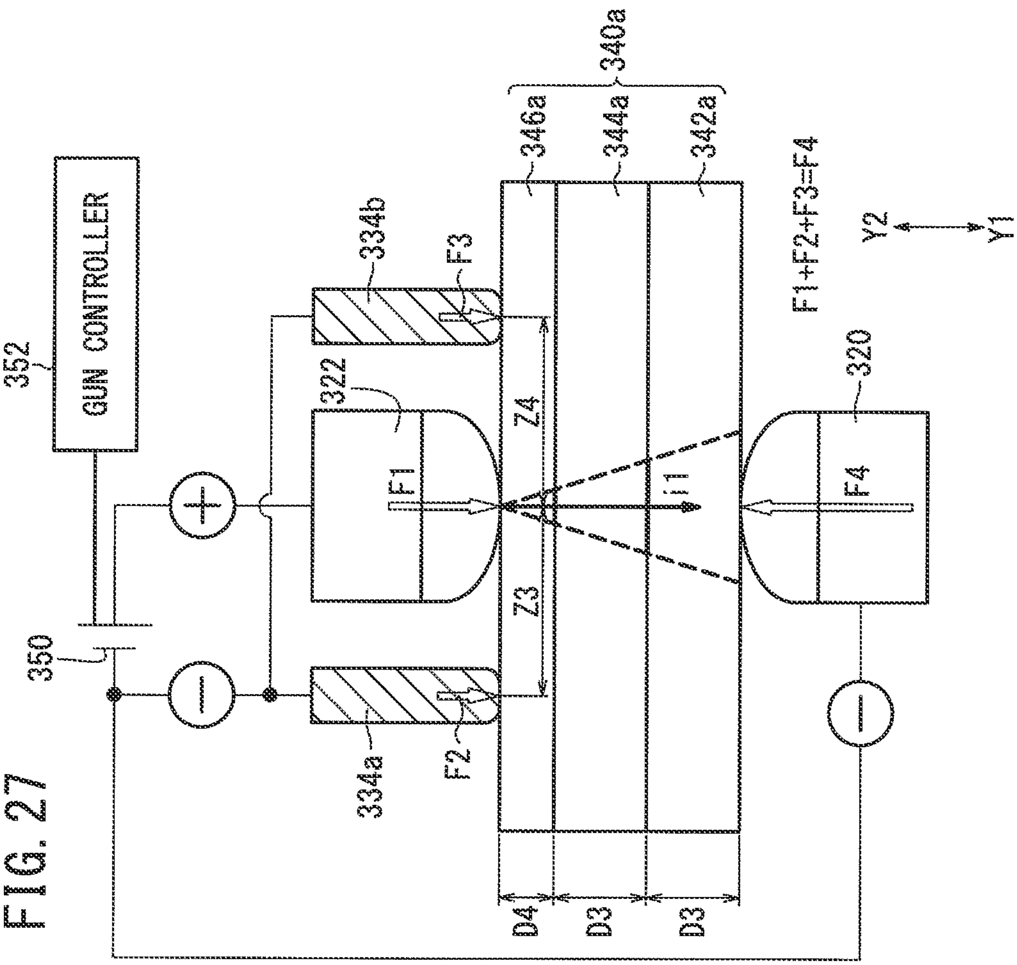
FIG. 27 is a schematic front view of essential features showing a stacked body to be welded, gripped by a lower tip, an upper tip, and auxiliary electrodes.

Thus, before, at the same time as, or after the gripping of the stacked body 340*a* between the lower tip 320 and the upper tip 322, the auxiliary electrodes 334*a*, 334*b* are brought into contact with the metallic plate 346*a*. FIG. 27 is a schematic vertical cross-sectional view of the stacked body 340*a* in this step.

Figure 28:
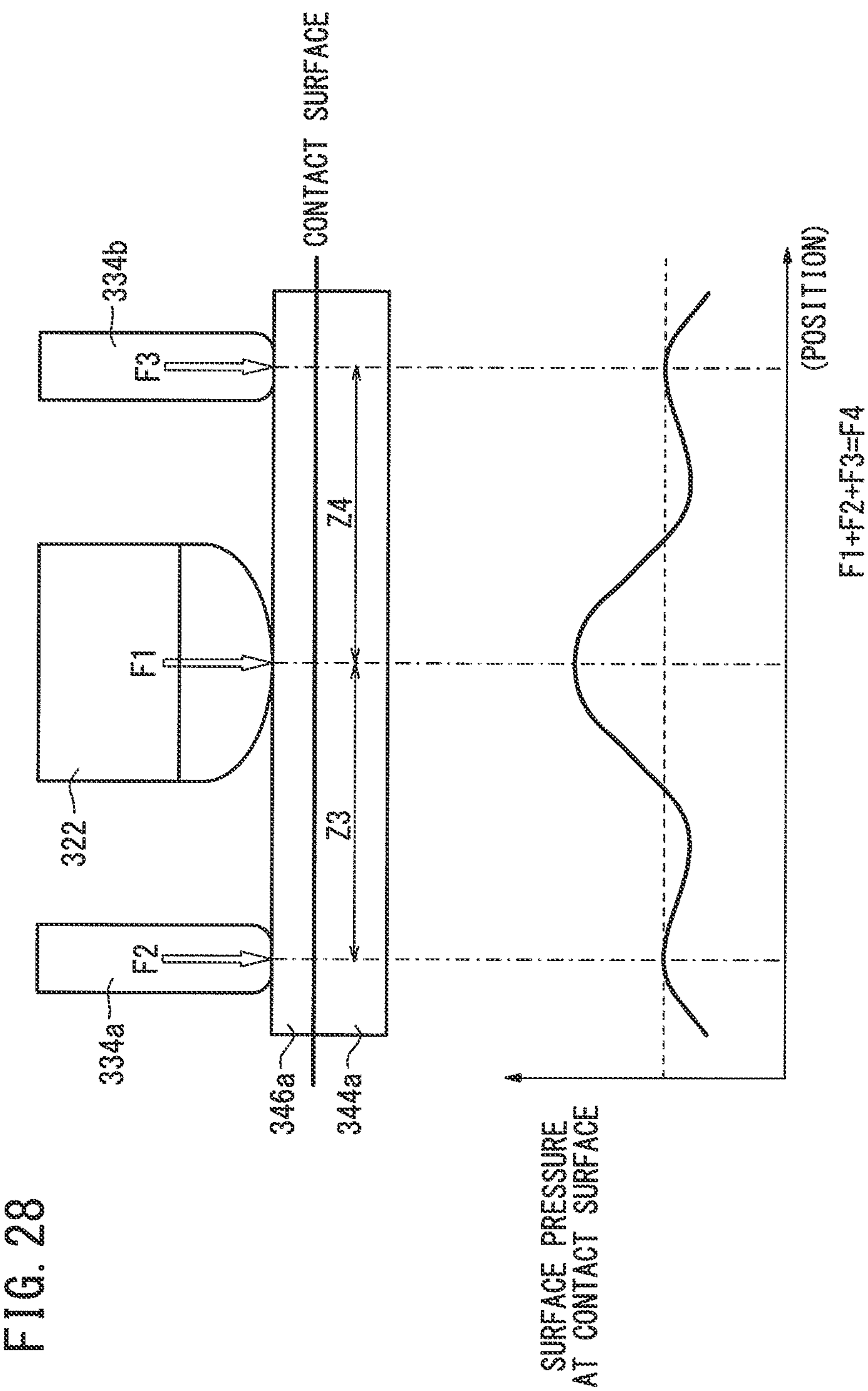
FIG. 28 is a schematic front view (with a graph) for illustrating an appropriate surface pressure distribution between an uppermost workpiece and a workpiece located immediately beneath the uppermost workpiece in the stacked body.

The distances Z3, Z4 between the upper tip 322 and the auxiliary electrodes 334*a*, 334*b* are controlled such that as shown in FIG. 28, a portion pressed by the upper tip 322 exhibits the highest surface pressure, and portions pressed by the auxiliary electrodes 334*a*, 334*b* exhibit the second highest surface pressure, at the contact surface between the metallic plates 346*a*, 344*a*. The distance Z3 is preferably equal to the distance Z4.

In other words, at the contact surface, some portions exhibit surface pressures lower than the above high pressures obtained due to the upper tip 322 and the auxiliary electrodes 334*a*, 334*b*. Consequently, a pressing force distribution shown in FIG. 28 is achieved. The distribution will be described in detail below.

The gun controller 352 controls the rotating force of the servomotor for rotating the ball screw in the ball screw mechanism and the moving forces of the actuators 330*a*, 330*b* such that the total pressing force (F1+F2+F3) of the upper tip 322 and the auxiliary electrodes 334*a*, 334*b* against the metallic plate 346*a* is well balanced with the pressing force (F4) of the lower tip 320 against the metallic plate 342*a*. By this control, the total pressing force (F1+F2+F3) applied to the stacked body 340*a* in the arrow Y1 direction is made approximately equal to the pressing force (F4) applied to the stacked body 340*a* in the arrow Y2 direction. The pressing force F2 is preferably equal to the pressing force F3.

In this case, the relation of F1<F4 is satisfied. Therefore, as schematically shown in FIG. 27, in the stacked body 340*a*, the total pressing force of the lower tip 320 and the upper tip 322 acts on a wider (larger) area in a position closer to the lower tip 320 than the upper tip 322. Thus, the force acting on the contact surface between the metallic plates 344*a*, 346*a* is smaller than the force acting on the contact surface between the metallic plates 342*a*, 344*a*. In a case where the distances Z3, Z4 are excessively small, the stacked body 340*a* does not have the above described portions, which exhibit surface pressures lower than the high pressures obtained due to the upper tip 322 and the auxiliary electrodes 334*a*, 334*b*. In this case, the appropriate distribution is hardly achieved.

Figure 29:
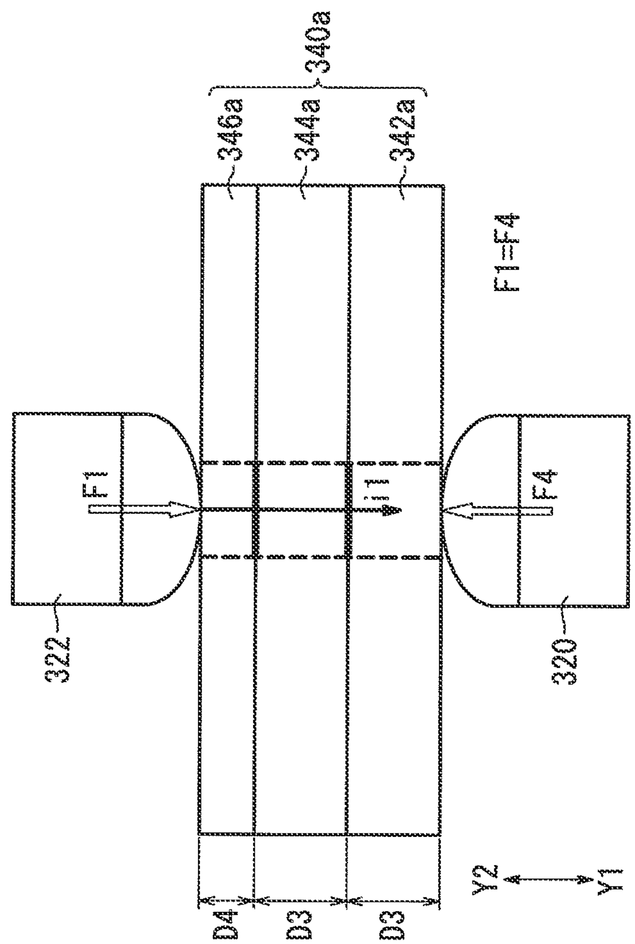
FIG. 29 is a schematic front view of the stacked body, gripped only by the lower and upper tips.

In a case where the relation of F1=F4 is satisfied without using the auxiliary electrodes 334*a*, 334*b*, a force distribution shown in FIG. 29 is achieved in the stacked body 340*a* by the lower tip 320 and the upper tip 322. As shown in FIG. 29, in this case, the total force acts uniformly over the stacked body 340*a* from the upper tip 322 to the lower tip 320. In other words, the force acting on the contact surface between the metallic plates 344*a*, 346*a* is equal to the force acting on the contact surface between the metallic plates 342*a*, 344*a*.

In FIGS. 27 and 29, at the contact surface between the metallic plates 344*a*, 346*a*, an area, on which the force acts, is represented by a thick solid line. As is clear from the comparison between FIGS. 27 and 29, the area, on which the force acts, is smaller under the condition of F1<F4 than under the condition of F1=F4. Thus, the metallic plate 346*a* has an area pressed against the metallic plate 344*a*, and the area is smaller under the condition of F1<F4 than under the condition of F1=F4. In other words, the contact area between the metallic plates 344*a*, 346*a* is smaller under the condition of F1<F4.

When the total pressing force is distributed from the upper tip 322 to the lower tip 320 in the above manner to achieve the smaller contact area between the metallic plates 344*a*, 346*a*, a reaction force is generated in the direction from the stacked body 340*a* toward the upper tip 322. In the third embodiment, the auxiliary electrodes 334*a*, 334*b* are subjected to the reaction force.

As described above, the bracket 328 having the auxiliary electrodes 334*a*, 334*b* is supported by the displacement shaft 326 connected to the ball screw mechanism in the gun body 316. Therefore, the reaction force acting on the auxiliary electrodes 334*a*, 334*b* is absorbed by the gun body 316 (the welding gun 314).

Thus, the reaction force derived from the stacked body 340*a* can be prevented from acting on the robot. For this reason, the robot is not required to have a high rigidity. In other words, the robot can be reduced in size, resulting in low equipment investment.

Figure 30:
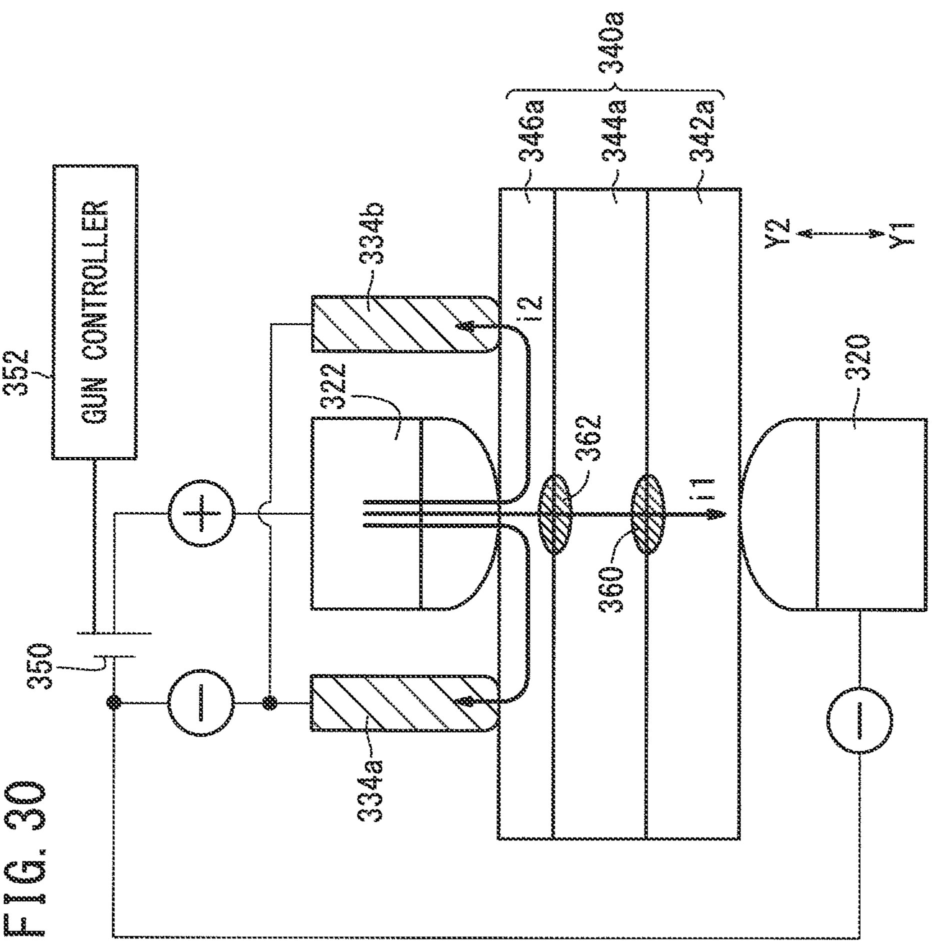
FIG. 30 is a schematic vertical cross-sectional view of the stacked body at the start of energization for generating a current flow from the upper tip to the lower tip and the auxiliary electrodes after the state of FIG. 27.

Next, the gun controller 352 sends, to the power source 350, a control signal for starting energization. Then, as shown in FIG. 30, a current i1 flows in the direction from the upper tip 322 toward the lower tip 320. This current i1 flow is achieved because the upper tip 322 and the lower tip 320 are connected to the positive and negative terminals of the power source 350 respectively as described above. The contact surface between the metallic plates 342*a*, 344*a* and the contact surface between the metallic plates 344*a*, 346*a* are heated by Joule heating generated due to the current i1, whereby heated regions 360, 362 are formed respectively.

As described above, the contact area between the metallic plates 346*a*, 344*a* is smaller in FIG. 27 than in FIG. 29. Therefore, the contact resistance and the current density at the contact surface between the metallic plates 344*a*, 346*a* are higher in FIG. 27 than in FIG. 29 (i.e. under the condition of F1<F4 than under the condition of F1=F4). Thus, the generated amount of Joule heating (i.e. the amount of generated heat) is larger under the condition of F1<F4 than under the condition of F1=F4. Consequently, under the condition of F1<F4, as shown in FIG. 30, the heated region 360 in the vicinity of the contact surface between the metallic plates 342*a*, 344*a* and the heated region 362 in the vicinity of the contact surface between the metallic plates 344*a*, 346*a* are grown to approximately the same size.

The auxiliary electrodes 334*a*, 334*b* having the negative polarities are in contact with the metallic plate 346*a*. Therefore, in addition to the current i1, a branching current i2 flows from the upper tip 322 toward the auxiliary electrodes 334*a*, 334*b*.

Thus, in the third embodiment, the branching current i2 is generated not in the metallic plates 342*a*, 344*a* but in the metallic plate 346*a*. As a result, the metallic plate 346*a* exhibits a larger current value in this method as compared to conventional spot welding methods using only the upper tip 322 and the lower tip 320.

Figure 31:
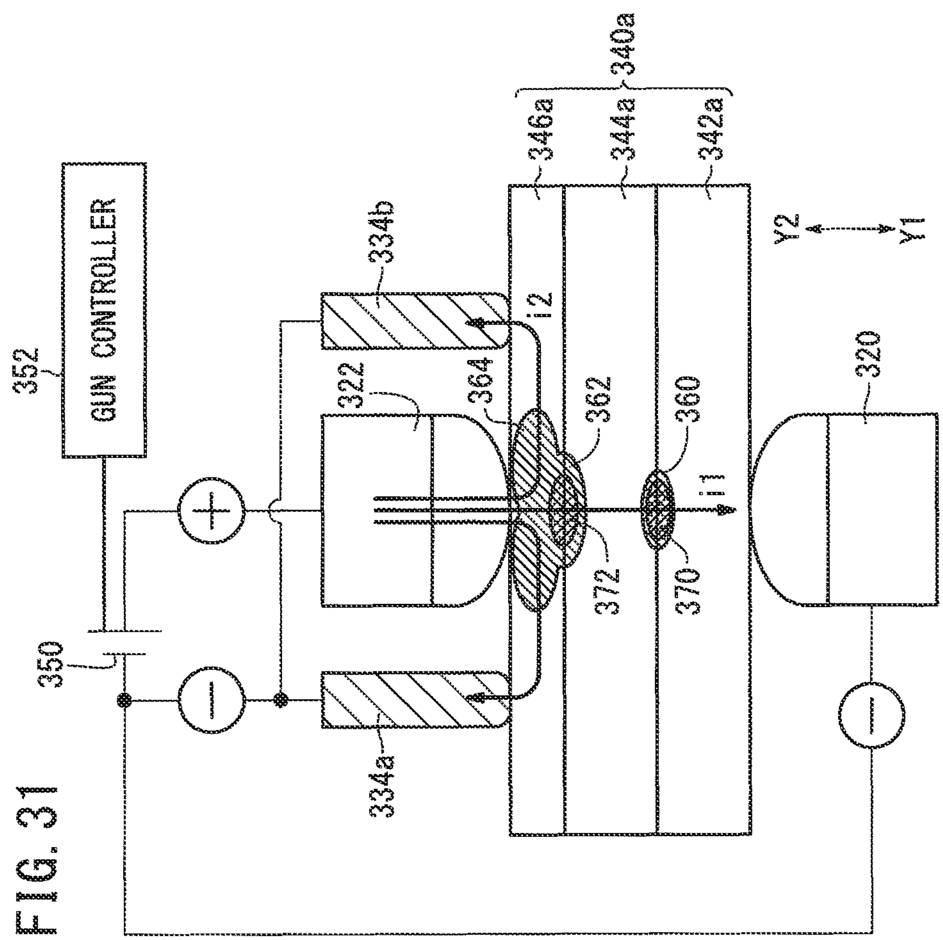
FIG. 31 is a schematic vertical cross-sectional view of the stacked body in the process of further performing the energization continuously after the state of FIG. 30.

In this method, as shown in FIG. 31, another heated region 364 different from the heated region 362 is formed in the metallic plate 346*a*. As shown in FIG. 31, the heated region 364 is grown with time and then integrated with the heated region 362. The contact surface between the metallic plates 344*a*, 346*a* is subjected to heat from both of the integrated heated regions 362, 364. In the following drawings, when the upper tip 322 is electrically connected with the auxiliary electrodes 334*a*, 334*b* and the branching current i2 is generated, the polarities of the auxiliary electrodes 334*a*, 334*b* are shown. On the other hand, when the upper tip 322 is electrically isolated from the auxiliary electrodes 334*a*, 334*b* and the branching current 12 is not generated, the polarities of the auxiliary electrodes 334*a*, 334*b* are not shown.

The contact surface between the metallic plates 342*a*, 344*a* and the contact surface between the metallic plates 344*a*, 346*a* are heated to a sufficient temperature and melted by the heated regions 360, 362, 364. Thus obtained melted portions are cooled and solidified, whereby nuggets 370, 372 are formed between the metallic plates 342*a*, 344*a* and between the metallic plates 344*a*, 346*a* respectively. Though the nuggets 370, 372 are shown in FIG. 31 to facilitate understanding, the nuggets 370, 372 are in the liquid-phase states of the melted portions during the energization. Such melted portions are shown in this manner also in the following drawings.

The nugget 372 between the metallic plates 344*a*, 346*a* can be grown further larger by increasing the pressing forces F2, F3 of the auxiliary electrodes 334*a*, 334*b*. However, the size of the nugget 372 tends to become saturated at certain levels of the pressing forces F2, F3. In other words, the nugget 372 is hardly grown larger than a certain size by excessively increasing the pressing forces F2, F3. Furthermore, in the case of excessively increasing the pressing forces F2, F3, the pressing force F1 has to be excessively lowered in order for balancing the total force of the pressing forces F1, F2, F3 with the pressing force F4. As a result, the size of the nugget 370 between the metallic plates 342*a*, 344*a* is reduced.

Consequently, it is preferred that the difference between the pressing force F1 of the upper tip 322 and the pressing forces F2, F3 of the auxiliary electrodes 334*a*, 334*b* is determined in view of maximizing the sizes of the nuggets 370, 372.

As the ratio of the branching current i2 is increased, the heated region 364 can be made larger. However, when the ratio of the branching current i2 is excessively high, the current value of the current i1 is reduced, whereby the sizes of the heated regions 360, 362 are reduced. Thus, the size of the nugget 370 is liable to be reduced, while the size of the nugget 372 becomes saturated. The ratio of the branching current i2 is preferably selected in view of growing the nugget 370 to a sufficient size under the current i1.

For example, the ratio between the current i1 and the branching current i2 can be controlled by changing the distances Z3, Z4 between the upper tip 322 and the auxiliary electrodes 334*a*, 334*b* (see FIG. 27) as described above. The ratio between the current i1 and the branching current i2 is preferably e.g. 70:30.

In the process of forming the melted portion, the metallic plate 346*a* is pressed against the metallic plate 344*a* by the auxiliary electrodes 334*a*, 334*b*. The metallic plate 346*a* having a low rigidity can be prevented by such pressing from warping and thus from separating from the metallic plate 344*a* during the energization (heating). Thus, spatter scattering of the softened melted portion from a gap between the metallic plates 346*a*, 344*a* can be prevented.

The melted portion and hence the nugget 372 are grown with the passage of time as long as the energization is continued. Therefore, the nugget 372 can be sufficiently grown by performing the energization over an appropriate time.

The current value of the current i1 in the metallic plates 342*a*, 344*a* is smaller than that in a conventional spot welding method. Therefore, the amount of generated heats of the metallic plates 342*a*, 344*a* can be prevented from excessively increasing in the process of growing the melted portion (the nugget 372) between the metallic plates 344*a*, 346*a*. Consequently, the apparatus is capable of eliminating the possibility of the spatter generation.

In this process, a melted portion to be solidified into the nugget 370 is formed by the current i1 between the metallic plates 342*a*, 344*a*. When the branching current i2 is continuously applied, the total amount of the current i1 is reduced, and the heated region 360 and hence the nugget 370 are liable to be reduced in size, as compared to the case without the branching current i2.

Figure 32:
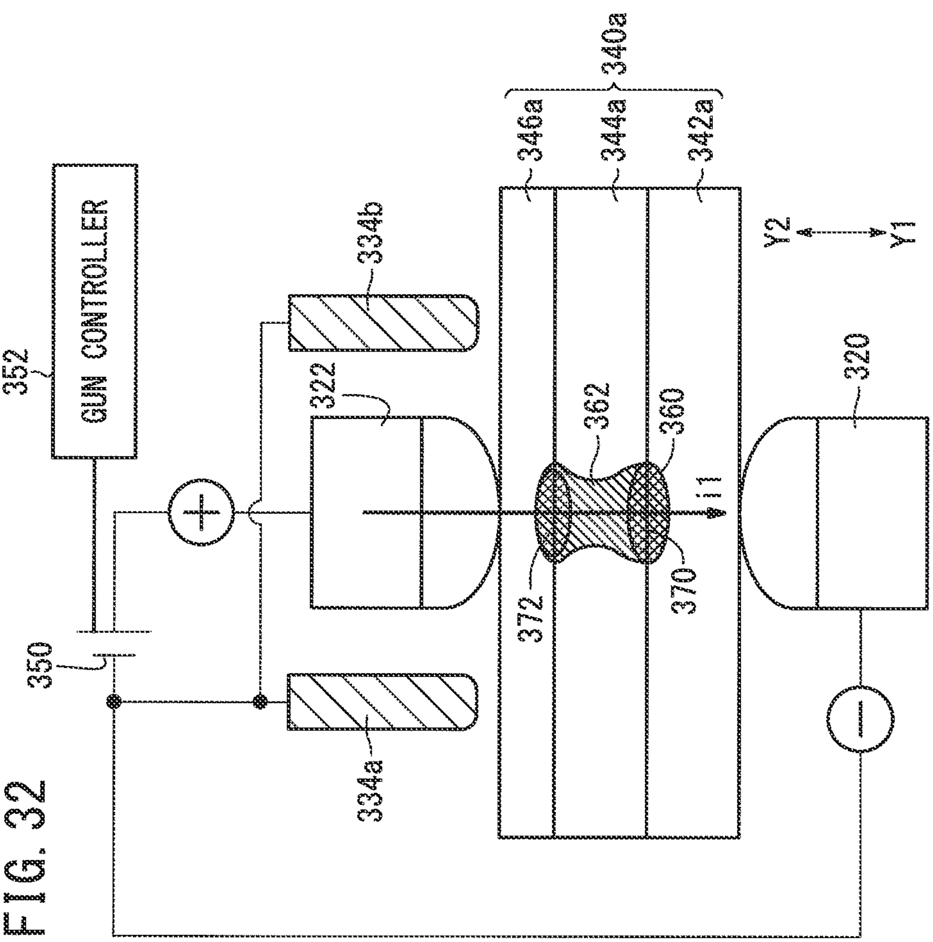
FIG. 32 is a schematic vertical cross-sectional view of the stacked body in the process of further performing the energization from the upper tip to the lower tip continuously after only the auxiliary electrodes are separated from the stacked body.

Therefore, in the case of further increasing the size of the nugget 370, it is preferred that only the auxiliary electrodes 334*a*, 334*b* are separated from the metallic plate 346*a* as shown in FIG. 32, while the energization of the upper tip 322 and the lower tip 320 is continued. When the auxiliary electrodes 334*a*, 334*b* are separated from the metallic plate 346*a*, the current value of the current i1 is increased, and the total amount of the current i1 is increased until stopping conduction of the electric current.

Only the auxiliary electrodes 334*a*, 334*b* may be separated from the metallic plate 346*a* by using the actuators 330*a*, 330*b* for moving the auxiliary electrodes 334*a*, 334*b* upward in the direction from the lower tip 320 (in the direction of the arrow Y2).

As a result, the branching current i2 vanishes, so that only the current i1 flows in the metallic plate 346*a* from the upper tip 322 to the lower tip 320, and the heated region 364 (see FIG. 31) disappears.

Thereafter, the metallic plates 342*a*, 344*a* are under a common spot welding condition. Thus, the Joule heating value is increased in the thick metallic plates 342*a*, 344*a*, whereby the heated region 360 is expanded and further heated to a higher temperature. The contact surface between the metallic plates 342*a*, 344*a* is heated to a sufficient temperature and melted by the heated region 360 having the higher temperature, and the melted portion (the nugget 370) is grown larger.

Figure 33:
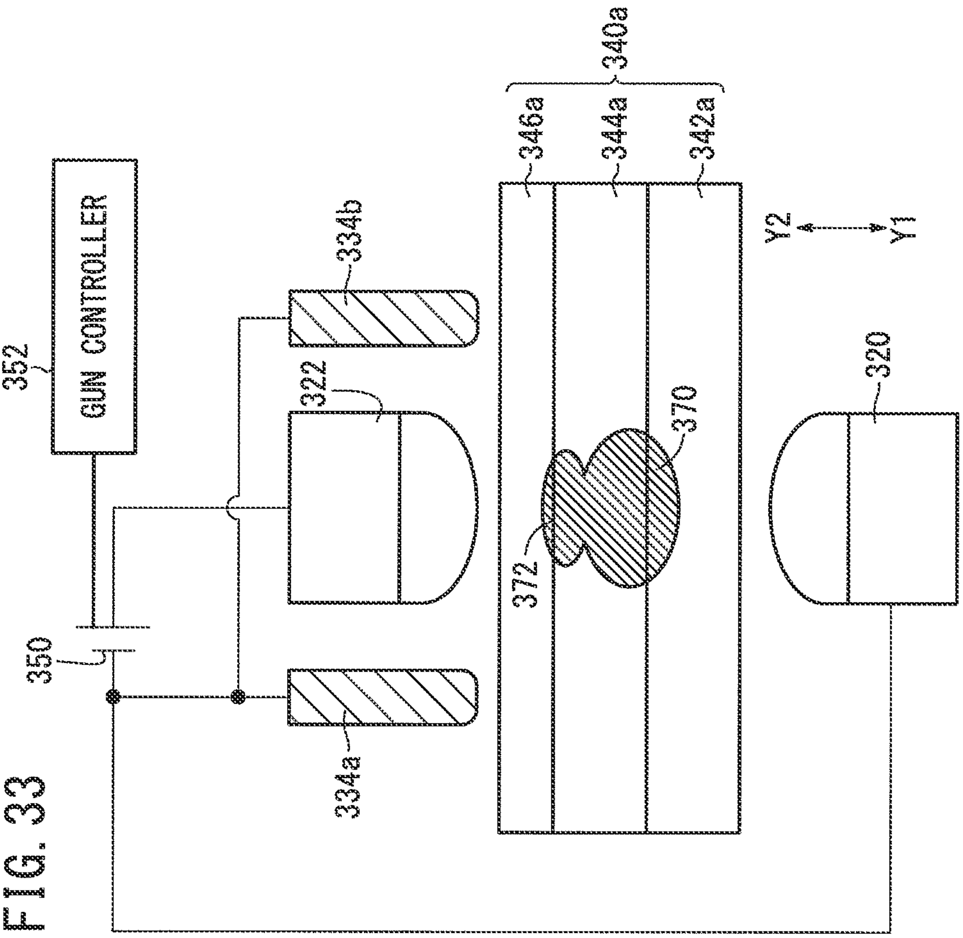
FIG. 33 is a schematic vertical cross-sectional view of the stacked body after completion of the energization (spot welding) by separating the upper tip from the stacked body after the state of FIG. 32.

Thereafter, the energization may be continued until the melted portion (the nugget 370) grows sufficiently, e.g. until the melted portion for forming the nugget 370 is integrated with the melted portion for forming the nugget 372 as shown in FIG. 33. The relation between the energization time and the growth of the nugget 370 may be confirmed in advance by a spot welding test using test pieces.

The contact surface between the metallic plates 342*a*, 344*a* is preheated by the heated region 360 formed by the current i1 flow while the nugget 372 is grown between the metallic plates 344*a*, 346*a*. Therefore, the affinity of the metallic plates 342*a*, 344*a* with each other is improved before the melted portion to be converted to the nugget 370 is grown larger. Consequently, the spatter generation is hardly caused.

As described above, in the third embodiment, the spatter generation can be prevented in both of the process of growing the nugget 372 between the metallic plates 344*a*, 346*a* and the process of growing the nugget 370 between the metallic plates 342*a*, 344*a*.

After the melted portion is sufficiently grown in a predetermined time, the energization is stopped, and the displacement shaft 326 is moved upward to separate the upper tip 322 from the metallic plate 346*a* as shown in FIG. 33. Alternatively, the upper tip 322 and the lower tip 320 are electrically isolated by moving the displacement shaft 326 upward to separate the upper tip 322 from the metallic plate 346*a*.

The operations from the start to the end of the spot welding method are performed under the control of the gun controller 352.

When the energization is stopped in the above manner, the heating of the metallic plates 342*a*, 344*a* is stopped. The obtained melted portion is cooled and solidified with the passage of time, whereby the metallic plates 342*a*, 344*a* are joined to each other by the nugget 370.

Consequently, in the stacked body 340*a*, the metallic plates 342*a*, 344*a* are joined to each other, and the metallic plates 344*a*, 346*a* are joined to each other, to obtain a bonded article as a final product.

The bonded product is excellent in the bonding strengths between the metallic plates 342*a*, 344*a* and between the metallic plates 344*a*, 346*a*. This is because the nugget 370 between the metallic plates 344*a*, 346*a* is sufficiently grown under the branching current i2 flowing in the metallic plate 346*a* as described above.

As described above, in the third embodiment, the nugget 372 between the metallic plates 344*a*, 346*a* can be grown to a size approximately equal to that of the nugget 370 between the metallic plates 342*a*, 344*a* while preventing the spatter generation, whereby the bonded product can be produced with the excellent bonding strength between the metallic plates 344*a*, 346*a*.

The spot welding apparatus 310 can be prepared only by attaching the bracket 328 having the actuators 330*a*, 330*b* to the displacement shaft 326 in a known spot welding apparatus. Thus, the spot welding apparatus can be prevented from having a complicated or large structure due to the auxiliary electrodes 334*a*, 334*b*. Therefore, even in a case where an object to be welding has an intricate shape, the stacked body can be located in a desired welding position without interference from the auxiliary electrodes 334*a*, 334*b* and the upper tip 322.

The object to be welded is not limited to the stacked body 340*a*. The number, the materials, and the thicknesses of the metallic plates may be variously changed in the stacked body. Several specific examples will be described below.

Figure 34:
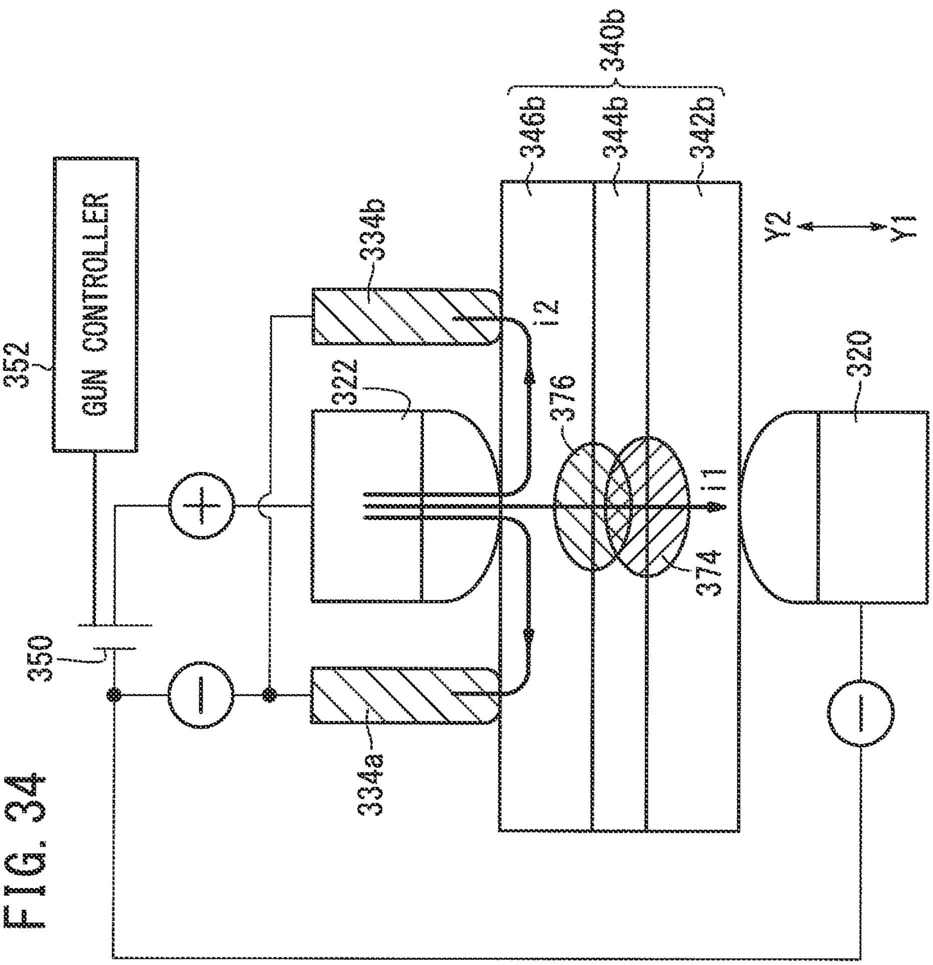
FIG. 34 is a schematic vertical cross-sectional view of a stacked body different from that of FIG. 27, gripped by the lower tip, the upper tip, and the auxiliary electrodes, at the start of the energization.

In a stacked body 340*b* shown in FIG. 34, a metallic plate 344*b* having the smallest thickness is interposed between metallic plates 342*b*, 346*b*. For example, the metallic plate 342*b* is a high resistance workpiece composed of a high tensile strength steel, and the metallic plates 344*b*, 346*b* are low resistance workpieces composed of a mild steel.

In a case where the stacked body 340*b* is spot-welded only by the upper tip 322 and the lower tip 320, the contact surface between the metallic plates 342*b*, 344*b* is melted first. This is because the metallic plate 342*b* is the high resistance workpiece, whereby the contact resistance between the metallic plates 342*b*, 344*b* is higher than that between the metallic plates 344*b*, 346*b*. Therefore, when the energization of the upper tip 322 and the lower tip 320 is continued to sufficiently grow the nugget at the contact surface between the metallic plates 344*b*, 346*b*, the spatter generation may be caused at the contact surface between the metallic plates 342*b*, 344*b*.

In contrast, as shown in FIG. 34, since the auxiliary electrodes 334*a*, 334*b* are used in the third embodiment, heated regions 374, 376 are formed at the contact surface between the metallic plates 342*b*, 344*b* and the contact surface between the metallic plates 344*b*, 346*b* respectively. This is because the contact surface between the metallic plates 344*b*, 346*b* is sufficiently heated by the branching current i2 in the metallic plate 346*b* in the same manner as the above stacked body 340*a*.

Figure 35:
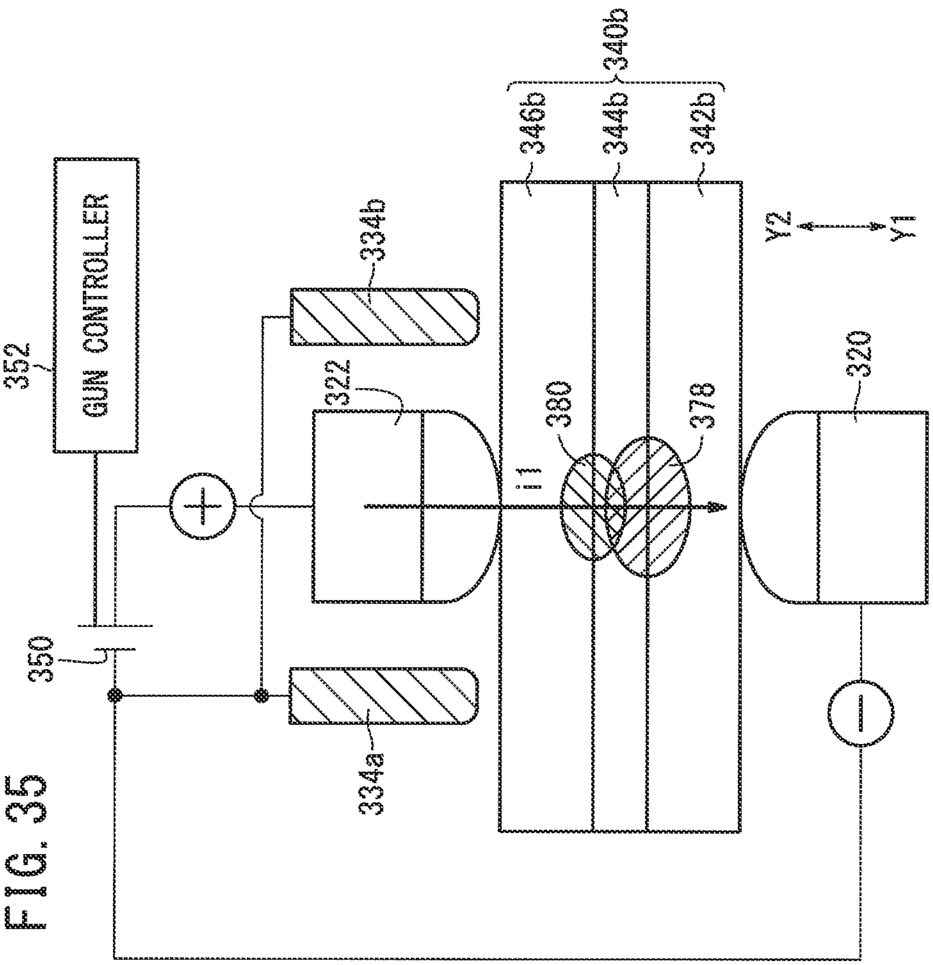
FIG. 35 is a schematic vertical cross-sectional view of the stacked body in the process of generating a current flow from the upper tip to the lower tip after only the auxiliary electrodes are separated from the stacked body after the state of FIG. 34.
Figure 36:
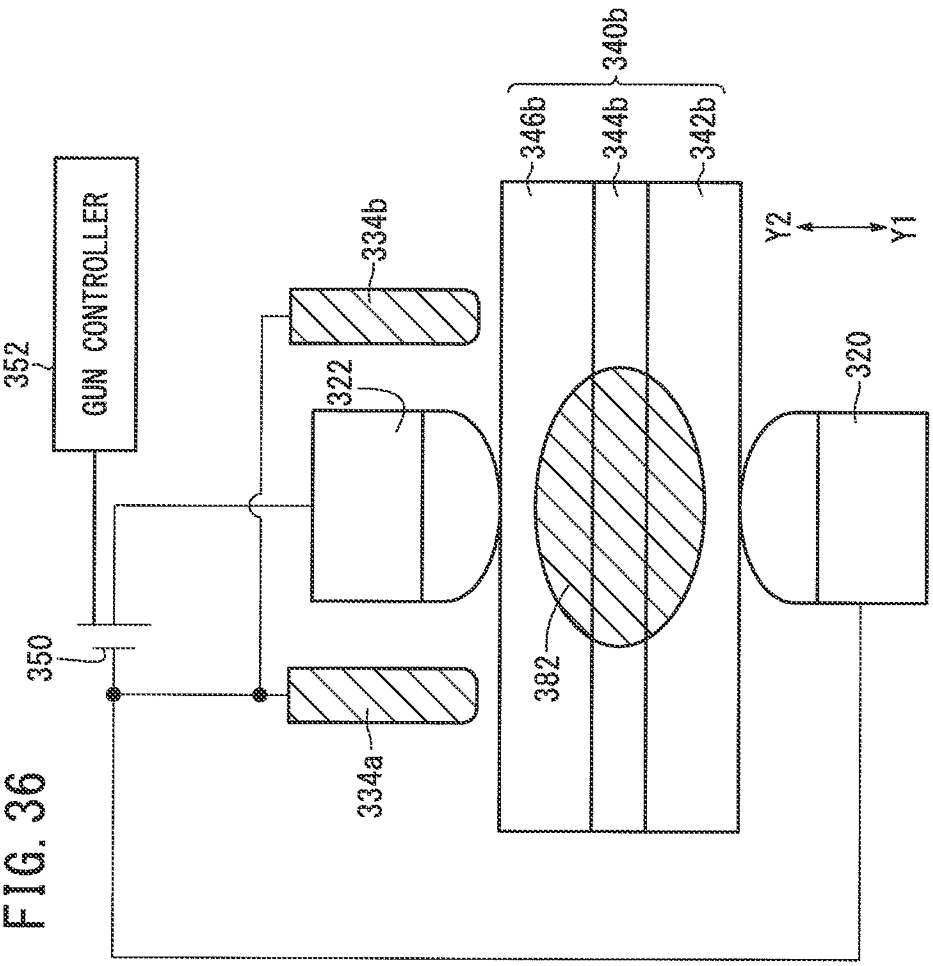
FIG. 36 is a schematic vertical cross-sectional view of the stacked body after completion of the energization (spot welding)

Consequently, nuggets 378, 380 are formed as shown in FIG. 35. After the branching current i2 has vanished, the current i1 may be continuously applied. In this case, for example, as shown in FIG. 36, a sufficiently larger nugget 382 can be developed over the contact surface between the metallic plates 342*b*, 344*b* and the contact surface between the metallic plates 344*b*, 346*b*.

As is clear from the above explanations of the spot welding of the stacked assemblies 340*a*, 340*b*, by using the auxiliary electrodes 334*a*, 334*b*, the heated regions and hence the nuggets can be shifted closer to the auxiliary electrodes 334*a*, 334*b*.

Though the metallic plate 342*b* is composed of the high tensile strength steel and the metallic plates 344*b*, 346*b* are composed of the mild steel in the above example, of course, the combination of the materials are not particularly limited thereto.

Figure 37:
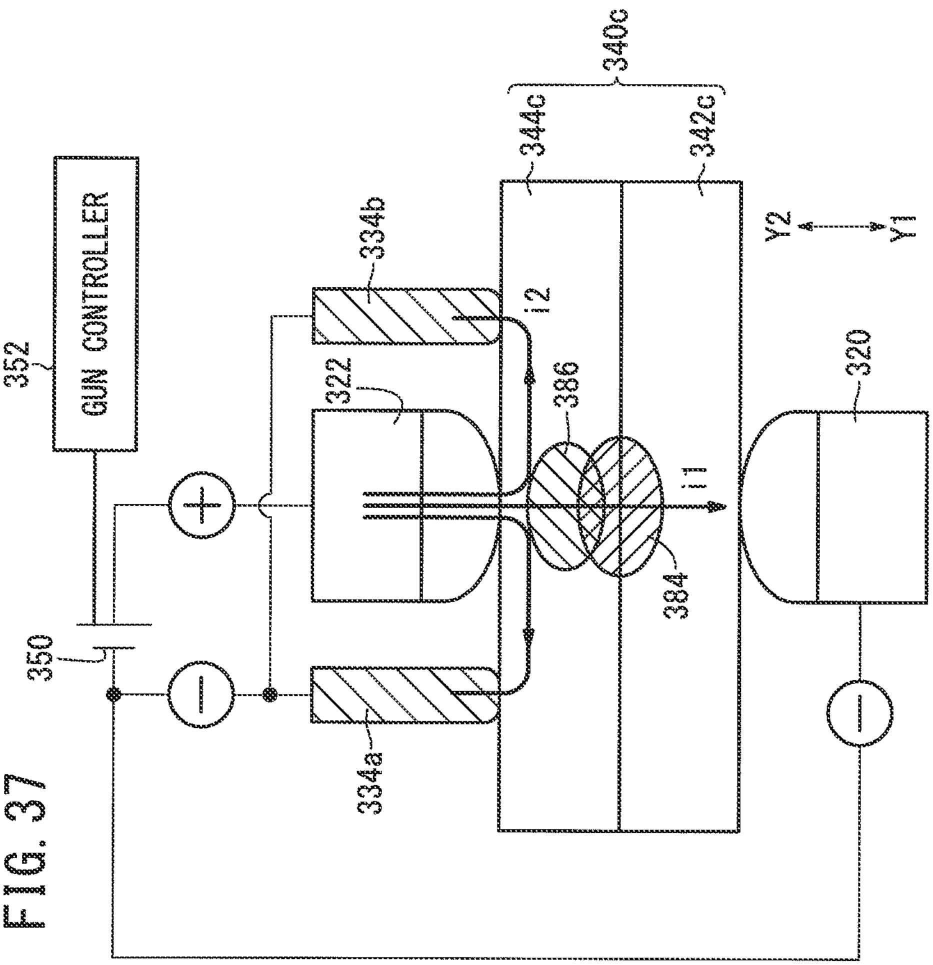
FIG. 37 is a schematic vertical cross-sectional view of a stacked body different from those of FIGS. 27 and 34, gripped by the lower tip, the upper tip, and the auxiliary electrodes, at the start of the energization.

In FIG. 37, a stacked body 340*c*, which is provided by stacking a metallic plate 344*c* on a metallic plate 342*c*, is spot-welded by using the auxiliary electrodes 334*a*, 334*b*. The metallic plates 344*c*, 342*c* are composed of a high tensile strength steel. As shown in FIGS. 75 and 77 in the case of not using the auxiliary electrodes 334*a*, 334*b*, the melted portions 6 grows larger at the contact surface between the metallic plates 342*c*, 344*c* (the high resistance workpieces 1, 2) in a relatively short time. Therefore, the spatter generation is liable to be caused.

In contrast, as shown in FIG. 37, since the auxiliary electrodes 334*a*, 334*b* are used in the third embodiment, a heated region 384 is formed at the contact surface between the metallic plates 342*c*, 344*c*, and a heated region 386 is formed above the contact surface (i.e. in the vicinity of the auxiliary electrodes 334*a*, 334*b* in the metallic plate 344*c*). This is because the metallic plate 344*c* is sufficiently heated by the branching current i2 flow in the metallic plate 344*c*. Thus, also in this case, the heated region and hence a nugget 388 (see FIG. 38) can be shifted closer to the auxiliary electrodes 334*a*, 334*b*.

Figure 38:
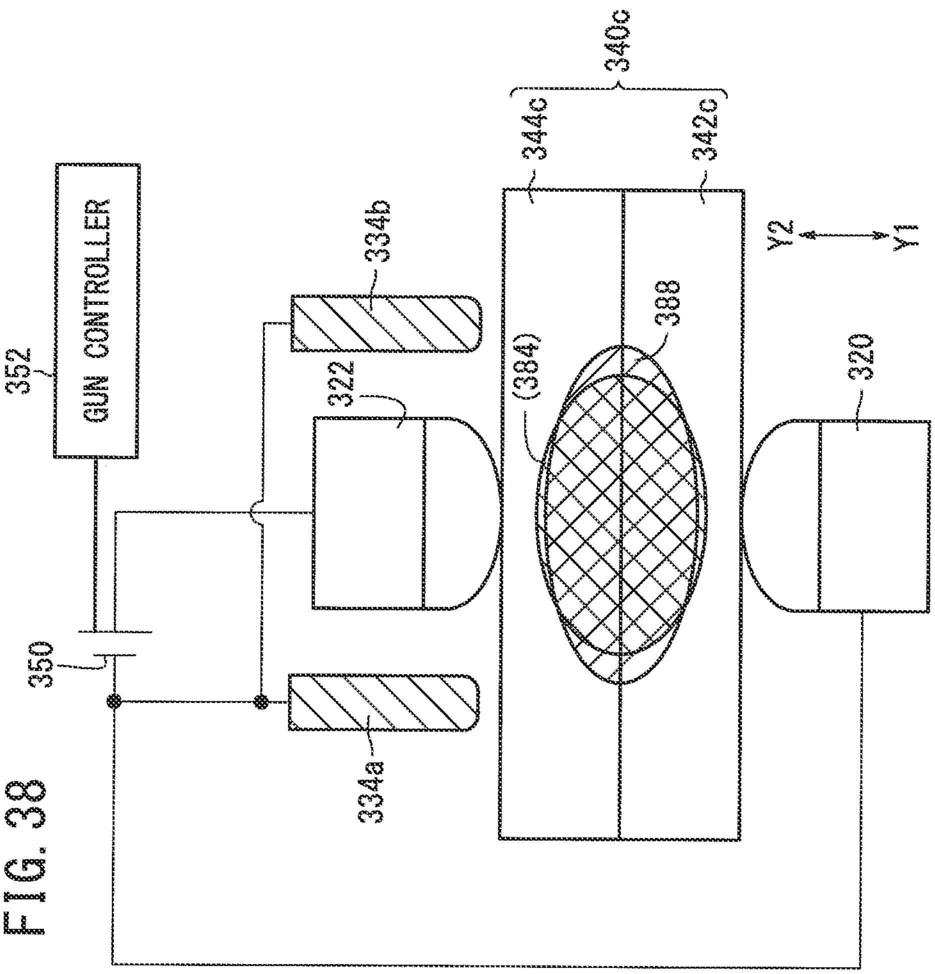
FIG. 38 is a schematic vertical cross-sectional view of the stacked body at the end of the energization (spot welding)

Consequently, the contact surface between the metallic plates 342*c*, 344*c* is softened, thereby improving the sealing property. Thus, even when the current i1 is continuously applied to form the sufficiently large nugget 388 as shown in FIG. 38, the spatter generation is hardly caused.

Spot welding of a stacked body 340*d* shown in FIG. 39 will be described below. The stacked body 340*d* is obtained by stacking a low resistance metallic plate 342*d* composed of a mild steel, high resistance metallic plates 344*d*, 346*d* composed of a high tensile strength steel, and a low resistance metallic plate 390*d* composed of a mild steel in this order from below. The metallic plates 342*d*, 390*d* has thicknesses smaller than those of the metallic plates 344*d*, 346*d*.

Figure 40:
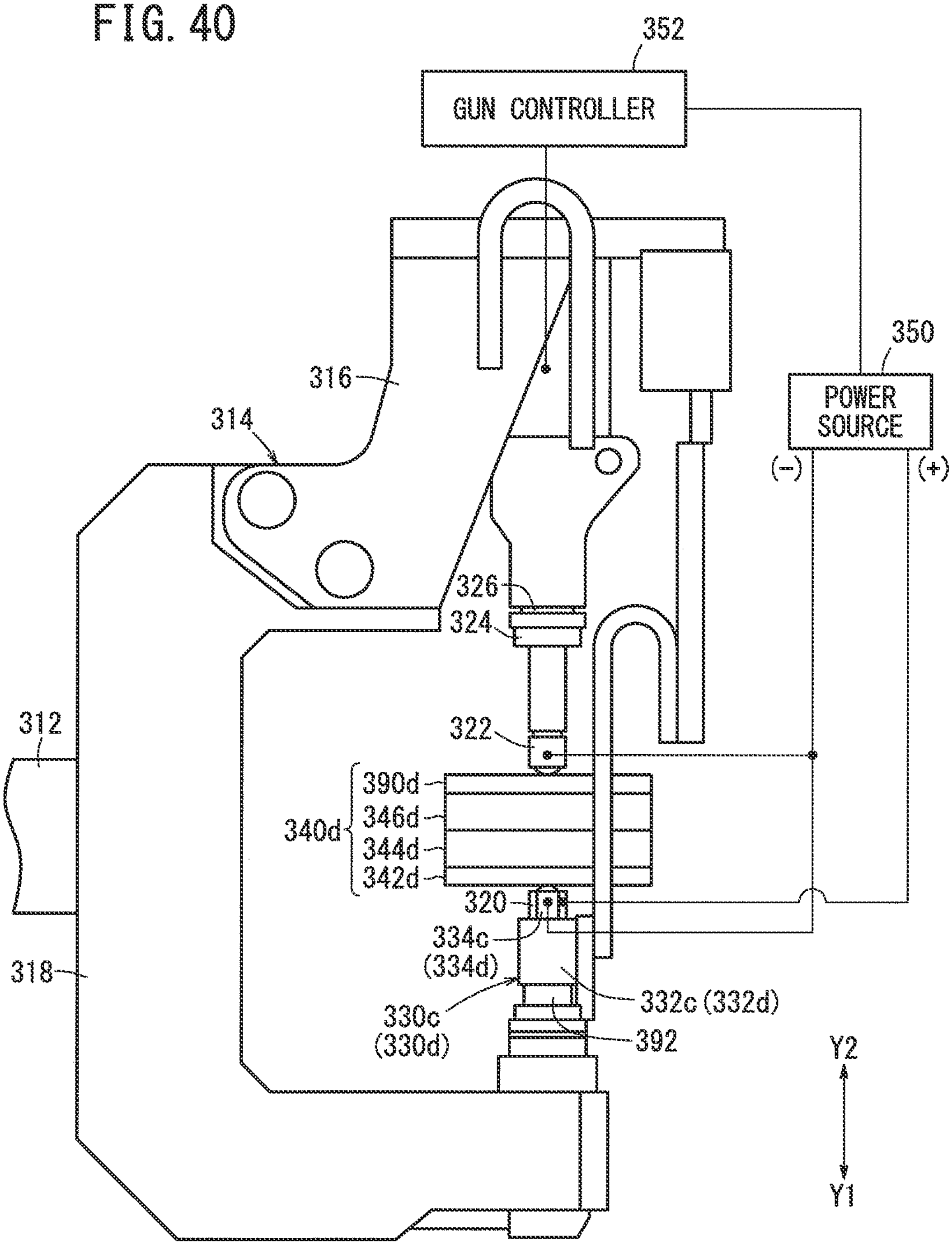
FIG. 40 is a side view of essential features showing a welding gun having auxiliary electrodes in the vicinity of the lower tip (second welding tip)

The auxiliary electrodes 334*a*, 334*b* are disposed in the vicinity of the upper tip 322, and furthermore auxiliary electrodes 334*c*, 334*d* are disposed in the vicinity of the lower tip 320. The auxiliary electrodes 334*c*, 334*d* are electrically connected to the positive terminal of the power source 350, and thereby have a polarity opposite to that of the lower tip 320. As shown in FIG. 40, to use the auxiliary electrodes 334*c*, 334*d*, a bracket 392 and actuators 330*c*, 330*d* may be disposed in the vicinity of the lower tip 320 in the same manner as the bracket 328 and the actuators 330*a*, 330*b* in the vicinity of the upper tip 322. The bracket 328 may be attached to the lower tip 320.

Figure 39:
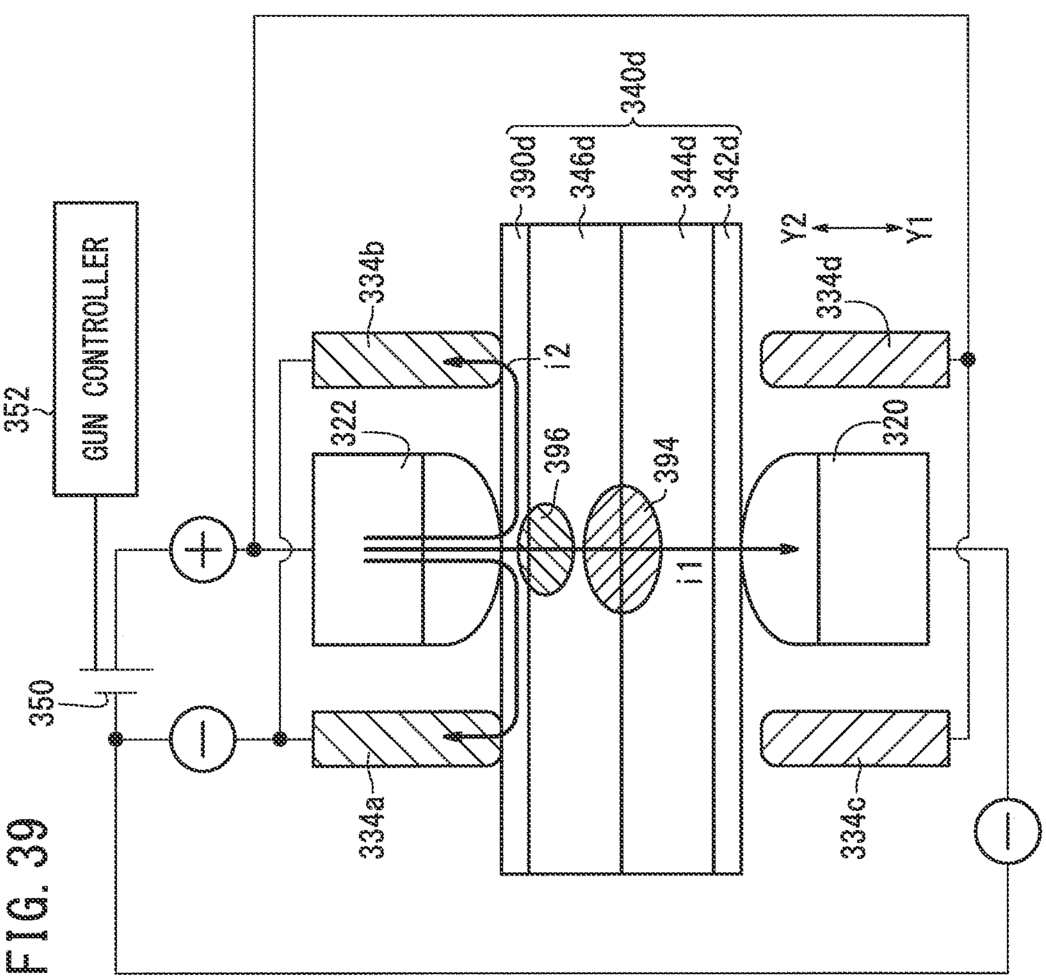
FIG. 39 is a schematic vertical cross-sectional view of a stacked body different from those of FIGS. 27, 34, and 37, gripped by the lower tip, the upper tip, and the auxiliary electrodes, at the start of the energization.

As shown in FIG. 39, the stacked body 340*d* is gripped between the upper tip 322 and the lower tip 320. Before, at the same time as, or after the gripping, only the auxiliary electrodes 334*a*, 334*b* are brought into contact with the metallic plate 390*d*. When the energization is started, the current i1 flows from the upper tip 322 to the lower tip 320, and the branching current i2 flows from the upper tip 322 to the auxiliary electrodes 334*a*, 334*b*. Then, nuggets 394, 396 are formed at the contact surfaces between the metallic plates 344*d*, 346*d* and between the metallic plates 346*d*, 390*d* respectively.

Figure 41:
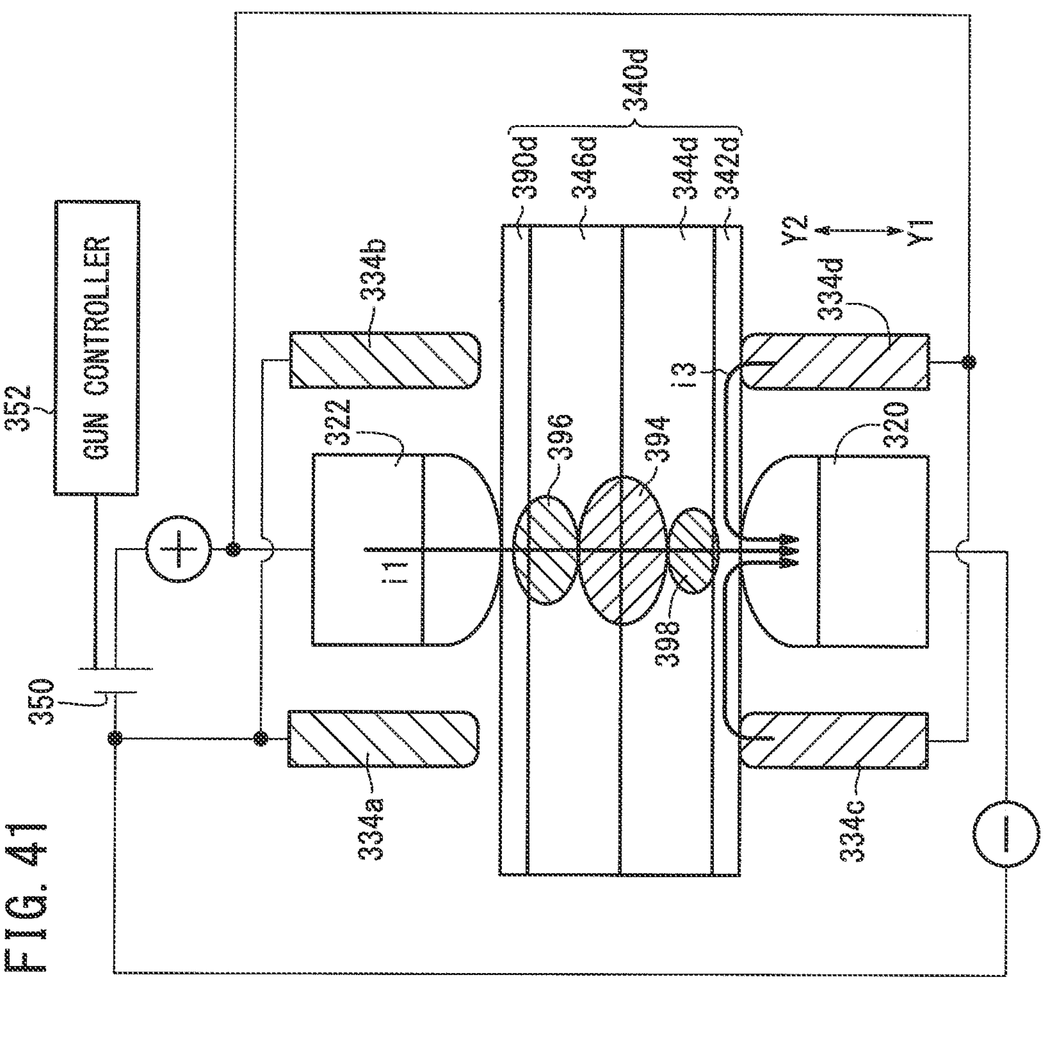
FIG. 41 is a schematic vertical cross-sectional view of the stacked body in the process of further performing the energization from the upper tip to the lower tip continuously after the auxiliary electrodes in the vicinity of the upper tip are separated from the stacked body, and the auxiliary electrodes in the vicinity of the lower tip are brought into contact with the stacked body.

Then, as shown in FIG. 41, the auxiliary electrodes 334*a*, 334*b* are moved upward by the actuators 330*a*, 330*b* and electrically disconnected from the upper tip 322 to eliminate the branching current i2. Before, at the same time as, or after the disconnection, the auxiliary electrodes 334*c*, 334*d* are brought into contact with the metallic plate 342*d*. As a result, a branching current i3 flows through the undermost metallic plate 342*d* from the auxiliary electrodes 334*c*, 334*d* to the lower tip 320.

When the branching current i2 vanishes, the growth of the nugget 396 is stopped. Meanwhile, the current i1 continuously flows from the upper tip 322 to the lower tip 320, and therefore the nugget 394 is grown larger at the contact surface between the metallic plates 344*d*, 346*d*. Furthermore, another nugget 398 is formed at the contact surface between the metallic plates 342*d*, 344*d* by the branching current i3.

Figure 42:
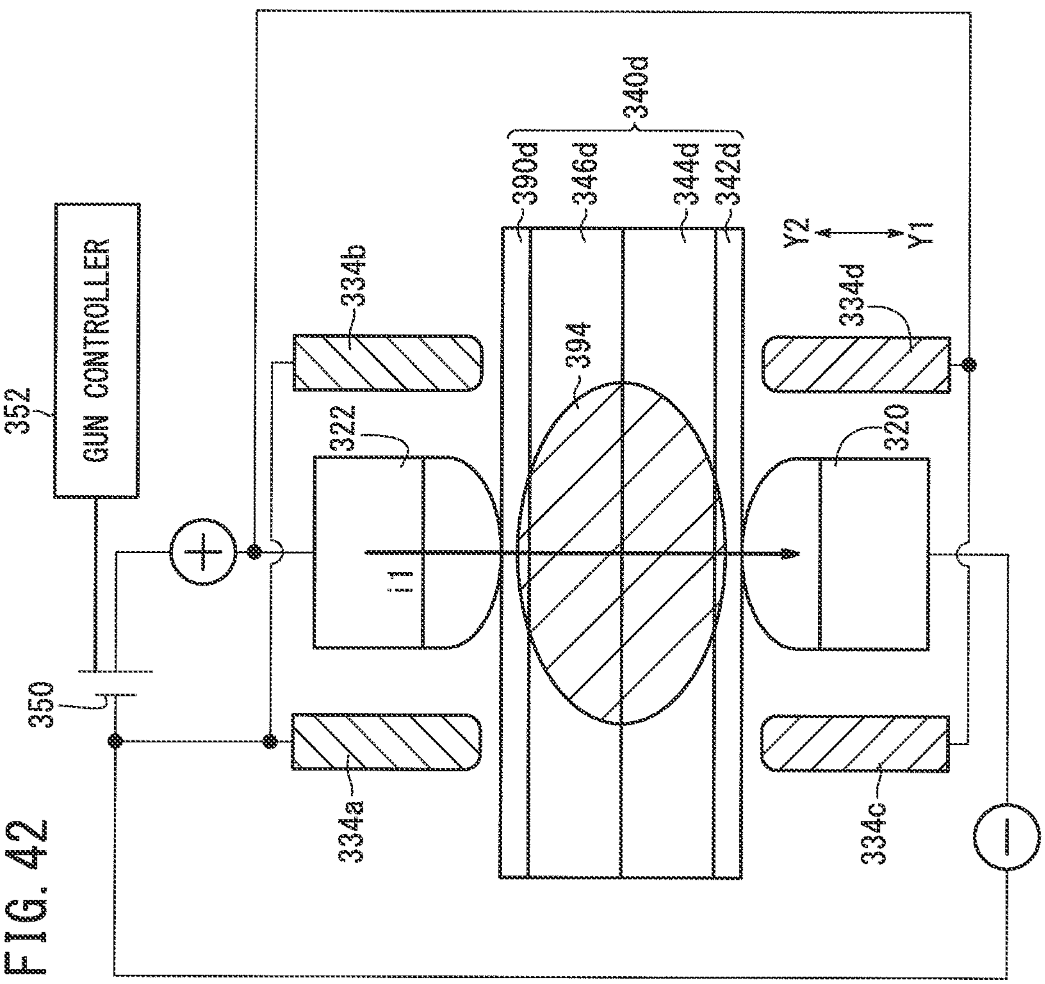
FIG. 42 is a schematic vertical cross-sectional view of the stacked body in the process of further performing the energization from the upper tip to the lower tip continuously after the auxiliary electrodes in the vicinity of the lower tip are separated from the stacked body.

Then, as shown in FIG. 42, the auxiliary electrodes 334*c*, 334*d* are separated from the metallic plate 342*d* to eliminate the branching current i3, whereby the growth of the nugget 398 is stopped. Thereafter, by continuously applying the current i1, only the nugget 394 at the contact surface between the metallic plates 344*d*, 346*d* may be further grown larger and may be integrated with the nuggets 396, 398.

It is to be understood that the stacked body may contain five or more metallic plates.

Figure 43:
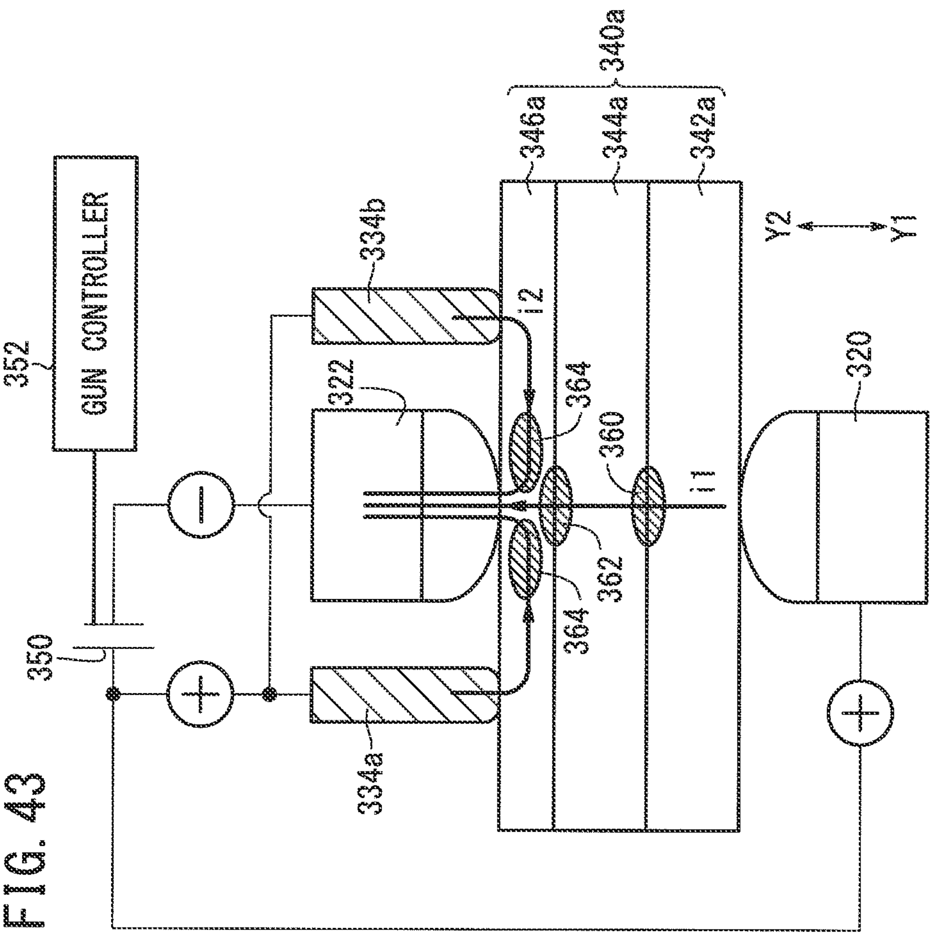
FIG. 43 is a schematic vertical cross-sectional view of the stacked body in the process of flowing a current from the lower tip and the auxiliary electrodes to the upper tip in the direction opposite to that of FIG. 27.

As shown in FIG. 43, a current may flow from the lower tip 320 on the metallic plate 342*a* to the upper tip 322 on the metallic plate 346*a*. Also in this case, the auxiliary electrodes 334*a*, 334*b* on the metallic plate 346*a* have polarities opposite to that of the upper tip 322. Thus, the lower tip 320 and the auxiliary electrodes 334*a*, 334*b* are electrically connected to the positive terminal of the power source 350, and the upper tip 322 is electrically connected to the negative terminal of the power source 350. Consequently, the current i1 flows from the lower tip 320 to the upper tip 322, and the branching current i2 flows from the auxiliary electrodes 334*a*, 334*b* to the upper tip 322.

As shown in FIG. 40, the positively polarized lower tip 320 may be used as the first welding tip, the negatively polarized upper tip 322 may be used as the second welding tip, and the negatively polarized auxiliary electrodes 334*c*, 334*d* may be disposed in the vicinity of the lower tip 320.

Figure 44:
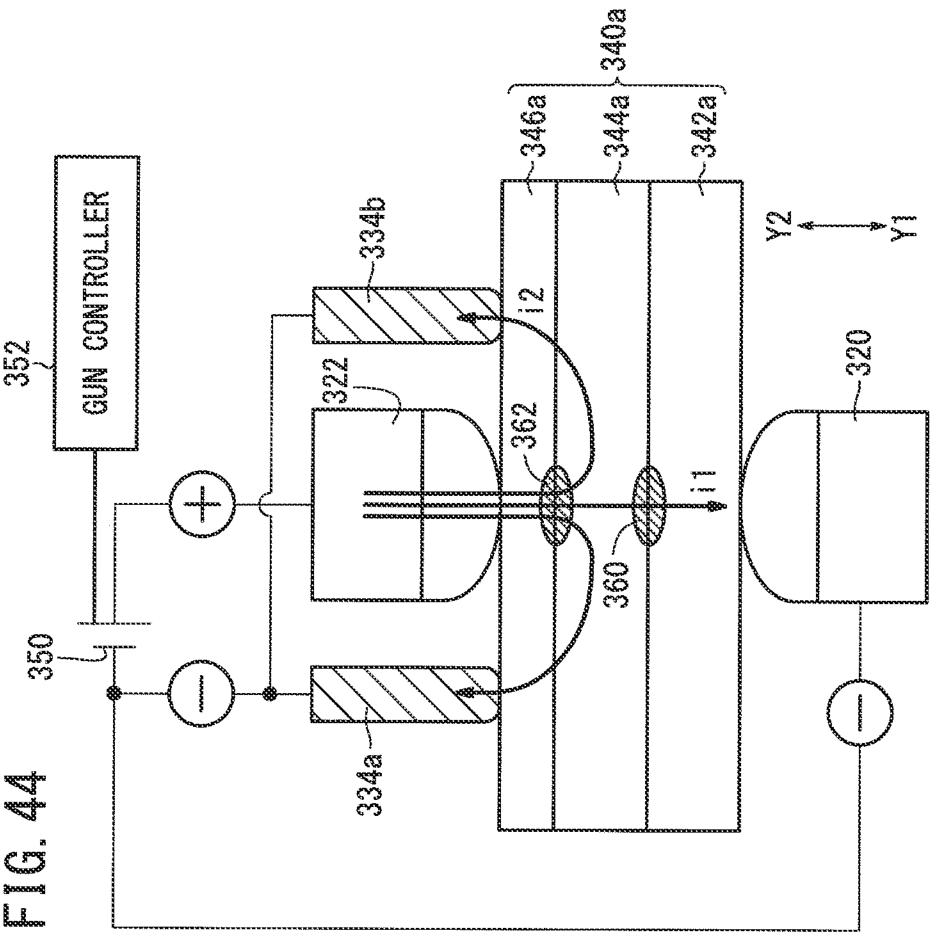
FIG. 44 is a schematic vertical cross-sectional view of a current flow from the upper tip to the auxiliary electrodes through the uppermost workpiece and the workpiece located immediately beneath the uppermost workpiece in the stacked body.

As shown in FIG. 44, the branching current i2 may flow not only in the metallic plate 346*a* on the upper tip 322 but also in the metallic plate 344*a* located immediately beneath the metallic plate 346*a*.

Figure 45:
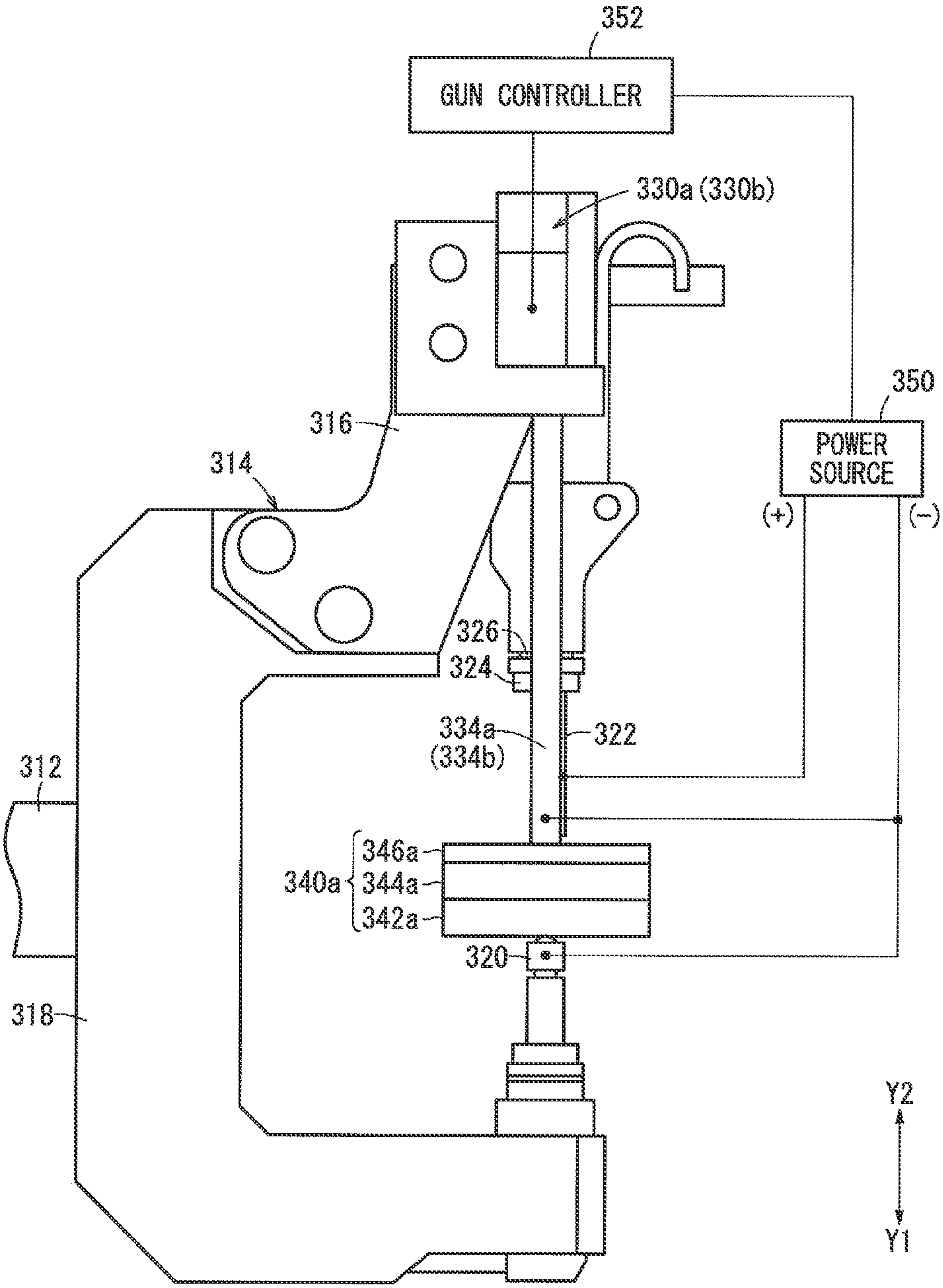
FIG. 45 is a side view of essential features showing a welding gun having in a gun body a displacement mechanism for displacing auxiliary electrodes.

As shown in FIG. 45, the actuators 330*a*, 330*b* may be disposed not on the bracket 328 but on the gun body 316.

In any case, the auxiliary electrode is not particularly limited to the above-described two auxiliary electrodes 334*a*, 334*b* having the long rod shape. For example, one, three, or more long rods may be used as the auxiliary electrodes. In the case of using three or more auxiliary electrodes, a plurality of the auxiliary electrodes may be contacted with and separated from the outermost metallic plate at the same time in the same manner as the two auxiliary electrodes 334*a*, 334*b*. Each auxiliary electrode may have a ring shape surrounding the lower tip 320 or the upper tip 322.

Though the branching current i2 flows from the upper tip 322 (or the lower tip 320) to the auxiliary electrodes 334*a*, 334*b* in the third embodiment, the auxiliary electrodes 334*a*, 334*b* may be electrically isolated from the power source 350, and the spot welding may be carried out without the branching current i2. In this case, the auxiliary electrodes 334*a*, 334*b* act only as the pressing members.

Also in this case, the total pressing force is distributed from the upper tip 322 to the lower tip 320 as shown in FIG. 27. The contact area between the metallic plates 342*a*, 344*a* is larger than without the pressing by the auxiliary electrodes 334*a*, 334*b* (see FIG. 29). Therefore, the contact resistance and the current density at the contact surface between the metallic plates 342*a*, 344*a* are increased, and the generated amount of Joule heating (i.e. the amount of generated heat) is increased. Consequently, the heated region and hence the nugget are grown to a sufficient size in the vicinity of the contact surface between the metallic plates 342*a*, 344*a*.

Furthermore, though the C-type welding gun is used in the third embodiment, the welding gun may be a so-called X-type gun. In this case, the lower tip 320 and the upper tip 322 may be mounted on a pair of openable and closable chucks respectively. When the chucks are opened or closed, the lower tip 320 and the upper tip 322 are moved away from or close to each other.

A welding apparatus (indirect feeding type welding apparatus) according to a fourth embodiment will be described below.

Figure 46:
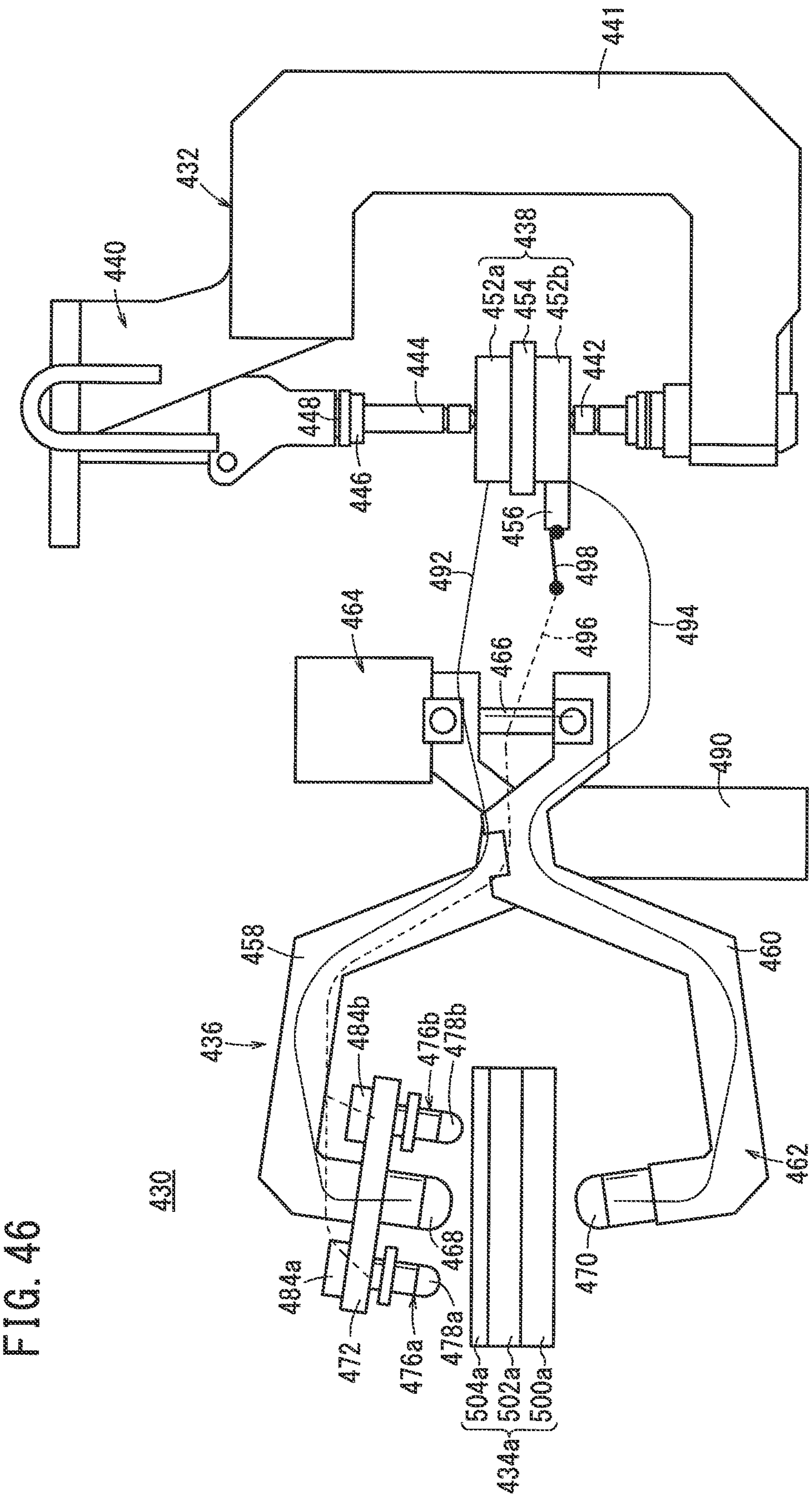
FIG. 46 is a schematic side view of essential features showing a welding apparatus (indirect feeding type welding apparatus) according to a fourth embodiment of the present invention.

FIG. 46 is a side view of essential features of an indirect feeding type welding apparatus 430 according to the fourth embodiment. The indirect feeding type welding apparatus 430 has a first welding gun 432, to which a welding current is supplied, a second welding gun 436 for welding a stacked body 434*a*, and an external feed terminal 438 for transferring the welding current from the first welding gun 432 to the second welding gun 436.

The first welding gun 432 is a so-called C-type gun having an approximately C-shaped fixed arm 441 under a gun body 440. A lower electrode 442 is disposed on the lower end of the fixed arm 441, and extends toward the gun body 440.

The gun body 440 contains a ball screw mechanism (not shown) for displacing a holder 446 having an upper electrode 444 in the vertical direction of FIG. 46. Specifically, the holder 446 is disposed on the end of a displacement shaft 448, which projects from the gun body 440 and extends toward the lower electrode 442. The displacement shaft 448 is displaced by a ball screw in the ball screw mechanism in the vertical direction of FIG. 46, and thus the upper electrode 444 is displaced by the holder 446.

In the fourth embodiment, the upper electrode 444 has a positive (+) polarity, the lower electrode 442 has a negative (−) polarity. Thus, the upper electrode 444 and the lower electrode 442 are electrically connected to positive and negative terminals of a power source 450 (see FIG. 48) respectively.

The external feed terminal 438 has conductive terminals 452*a*, 452*b* and an insulator 454 interposed therebetween. The upper electrode 444 is brought into contact with the conductive terminal 452*a*, while the lower electrode 442 is brought into contact with the conductive terminal 452*b*. The external feed terminal 438 further has an auxiliary terminal 456 electrically connected to the conductive terminal 452*a*.

The second welding gun 436 has a gun arm 462, which contains a first arm member 458 and a second arm member 460 combined to form an approximately X-shape. The first arm member 458 and the second arm member 460 are swung about the intersection thereof, and the gun arm 462 is opened and closed by the swing.

Specifically, as shown in FIG. 46, an open/close cylinder 464 is disposed on the right end of the first arm member 458 as an open/close mechanism for opening and closing the gun arm 462. The open/close cylinder 464 has an open/close rod 466, which extends in the downward direction of FIG. 46 and is connected to the right end of the second arm member 460. Therefore, when the open/close rod 466 is moved forward or backward in the vertical direction of FIG. 46, the first arm member 458 and the second arm member 460 are moved close to or away from each other, whereby the gun arm 462 is closed or opened.

The left ends of the first arm member 458 and the second arm member 460 are articulated downward and upward in the vertical direction respectively, and thereby extend facing each other. An upper tip 468 used as a first welding tip and a lower tip 470 used as a second welding tip are disposed on the facing ends respectively.

Figure 47:
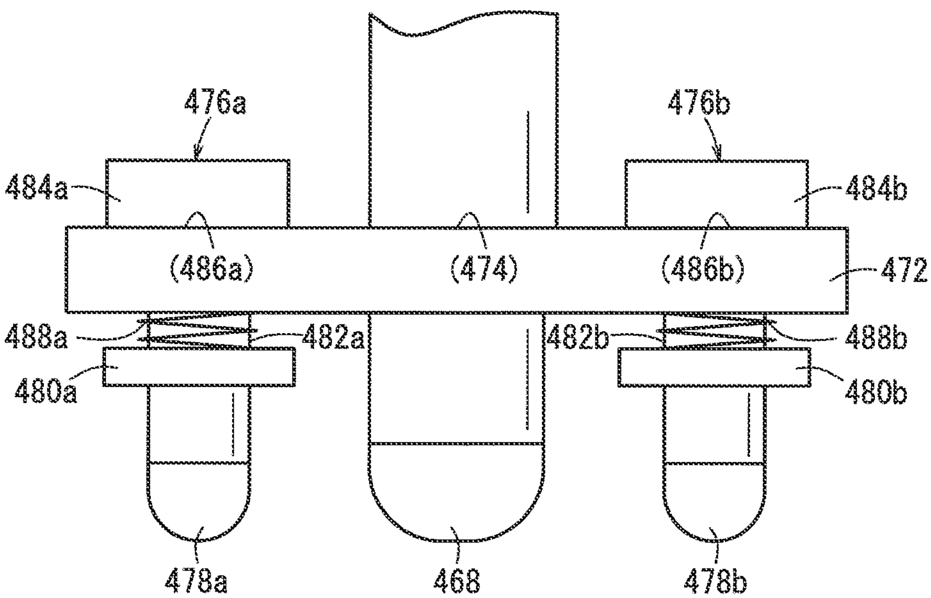
FIG. 47 is an enlarged front view of essential features showing the indirect feeding type welding apparatus of FIG. 46.

A main part of the first arm member 458 is shown in an enlarged view of FIG. 47. A substantially plate-shaped bracket 472 composed of an insulator is attached to the body of the upper tip 468. The bracket 472 has a through-hole 474, which has a diameter approximately equal to the body diameter of the upper tip 468. The body of the upper tip 468 is inserted and fitted into the through-hole 474.

Auxiliary electrodes 476*a*, 476*b*, which act as pressing members, are disposed on the bracket 472 and extend parallel to the upper tip 468. The auxiliary electrodes 476*a*, 476*b* contains electrode bodies 478*a*, 478*b*, flanges 480*a*, 480*b* extending diametrically outward, relatively small-diameter shafts 482*a*, 482*b*, and terminals 484*a*, 484*b*, and the components are arranged in this order in the upward direction of FIG. 46.

The bracket 472 further has other through-holes 486*a*, 486*b* in the vicinity of the through-hole 474. The small-diameter shafts 482*a*, 482*b* are inserted into the through-holes 486*a*, 486*b* respectively.

Coil springs 488*a*, 488*b* are attached to the small-diameter shafts 482*a*, 482*b*. The lower and upper ends of the coil springs 488*a*, 488*b* are in contact with the tops of the flanges 480*a*, 480*b* and the bottom of the bracket 472 respectively. When the electrode bodies 478*a*, 478*b* are brought into contact with the stacked body 434*a*, the coil springs 488*a*, 488*b* are compressed. On the other hand, when the electrode bodies 478*a*, 478*b* are separated from the stacked body 434*a*, the coil springs 488*a*, 488*b* are returned and act to apply elastic forces for displacing the auxiliary electrodes 476*a*, 476*b* away from the bracket 472.

As described in detail hereinafter, the distances Z5, Z6 (see FIG. 48) between the upper tip 468 and the auxiliary electrodes 476*a*, 476*b* are controlled to achieve an appropriate pressure distribution in a metallic plate 504*a* and a metallic plate 502*a* located immediately beneath the metallic plate 504*a*.

The intersection of the first arm member 458 and the second arm member 460 is fixed by a jig 490 to support the gun arm 462. The upper electrode 444 and the upper tip 468 are electrically connected by the conductive terminal 452*a* and a lead 492, and the lower electrode 442 and the lower tip 470 are electrically connected by the conductive terminal 452*b* and a lead 494. The auxiliary electrodes 476*a*, 476*b* are electrically connected with the lower electrode 442 by a lead 496, an ON/OFF switch 498, the auxiliary terminal 456, and the conductive terminal 452*a*. Consequently, the upper tip 468 has a positive (+) polarity as well as the upper electrode 444, and the lower tip 470 and the auxiliary electrodes 476*a*, 476*b* have a negative (−) polarity as well as the lower electrode 442.

The stacked body 434*a* to be welded contains three metallic plates 500*a*, 502*a*, 504*a* arranged upwardly in this order. Each of the metallic plates 500*a*, 502*a* has a thickness D5 (e.g. about 1 to 2 mm), and the metallic plate 504*a* has a thickness D6 smaller than the thickness D5 (e.g. about 0.5 to 0.7 mm). Thus, the metallic plates 500*a*, 502*a* have the same thickness, and the metallic plate 504*a* is thinner than the metallic plates 500*a*, 502*a*. In other words, the metallic plate 504*a* has the smallest thickness among the three metallic plates 500*a*, 502*a*, 504*a* in the stacked body 434*a*.

For example, each of the metallic plates 500*a*, 502*a* is a high resistance workpiece made of a so-called high tensile strength steel, such as a high-performance high tensile strength steel sheet JAC590, JAC780, or JAC980 (defined according to the Japan Iron and Steel Federation Standard). For example, the metallic plate 504*a* is a low resistance workpiece made of a so-called mild steel, such as a high-performance steel sheet JAC270 for press-forming (defined according to the Japan Iron and Steel Federation Standard). The metallic plates 500*a*, 502*a* may be made of the same or different metal materials.

The stacked body 434*a* to be welded is interposed between the lower tip 470 and the upper tip 468, and is energized by the lower tip 470 and the upper tip 468. In the energization, the lower tip 470 is brought into contact with the undermost metallic plate 500*a*, and the upper tip 468 and the auxiliary electrodes 476*a*, 476*b* are brought into contact with the uppermost metallic plate 504*a*. As described above, the auxiliary electrodes 476*a*, 476*b* have polarities opposite to that of the upper tip 468 though all the components are brought into contact with the uppermost metallic plate 504*a* in the stacked body 434*a*.

Figure 48:
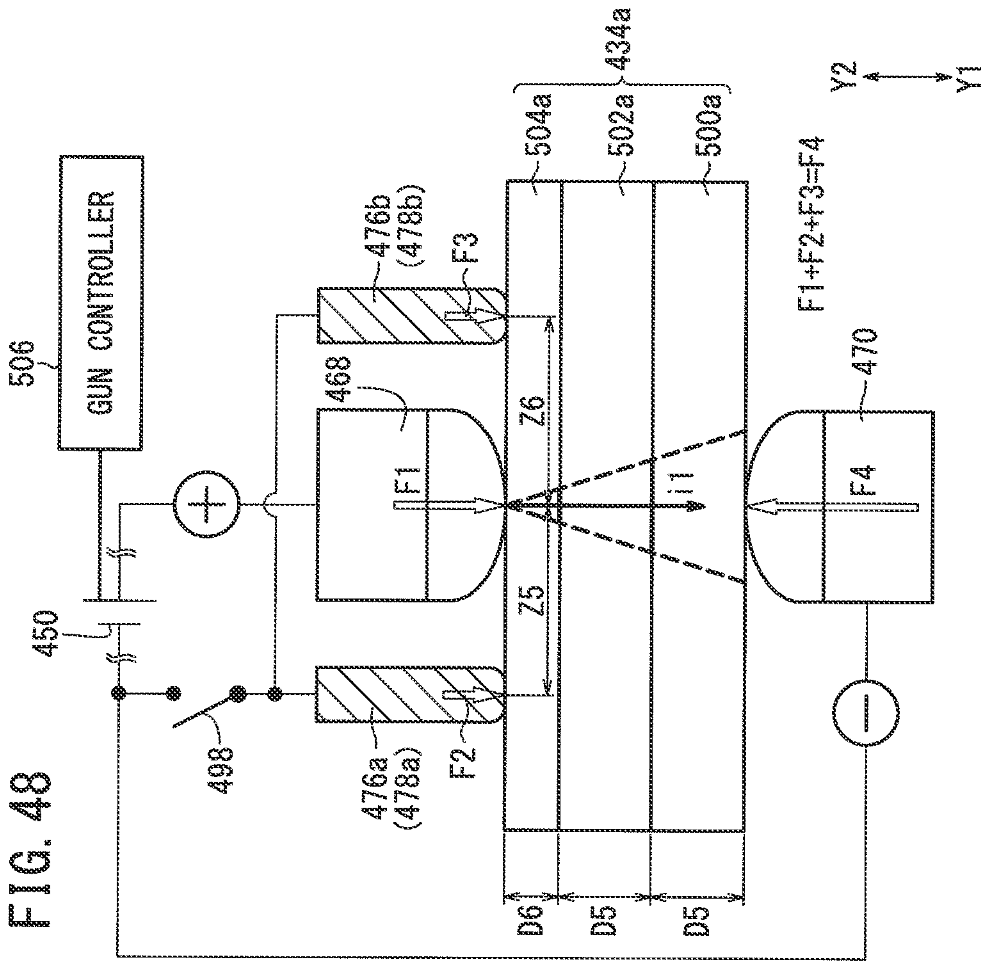
FIG. 48 is a schematic front view of essential features showing a stacked body to be welded, gripped by a lower tip, an upper tip, and auxiliary electrodes.

In this structure, the open/close cylinder 464, the power source 450, and the ON/OFF switch 498 are electrically connected to a gun controller 506 serving as a control means (see FIG. 48). Thus, the operation, actuation, and deactuation of the open/close cylinder 464, the power source 450, and the ON/OFF switch 498 are controlled by the gun controller 506.

The indirect feeding type welding apparatus 430 of the fourth embodiment is basically constructed as described above. Operations and advantages of the indirect feeding type welding apparatus 430 will be described below in relation to a spot welding method.

In the spot welding method for welding the stacked body 434*a*, i.e. for joining the metallic plates 500*a*, 502*a* to each other as well as joining the metallic plates 502*a*, 504*a* to each other, first the stacked body 434*a* is located between the lower tip 470 and the upper tip 468. Of course, in this step, the open/close rod 466 of the open/close cylinder 464 is moved backward, so that the gun arm 462 is in the opened state (see FIG. 46).

Figure 49:
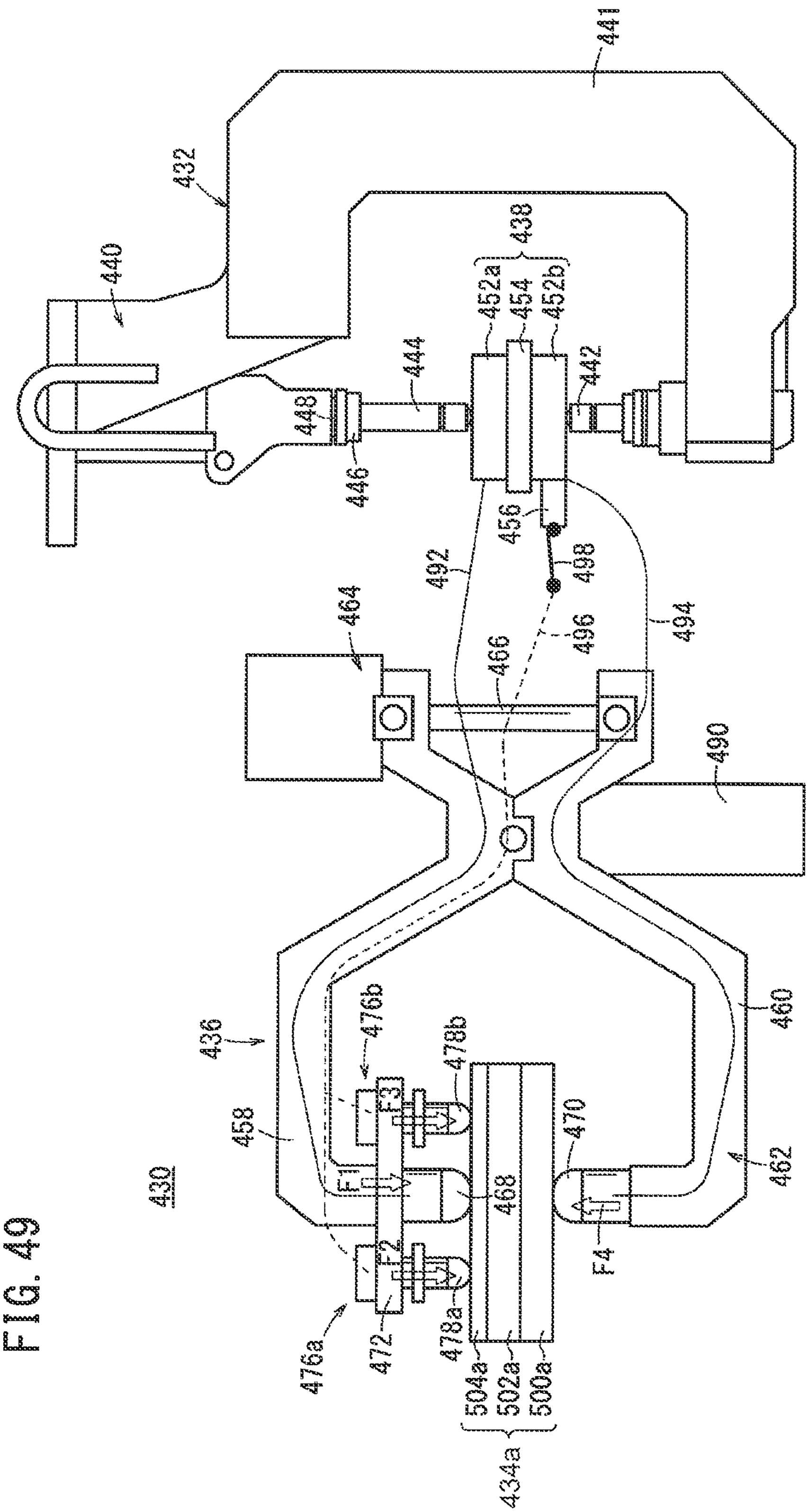
FIG. 49 is a schematic side view of essential features showing the stacked body to be welded, gripped by the lower tip, the upper tip, and the auxiliary electrodes.

Then, the open/close cylinder 464 is actuated by the gun controller, and the open/close rod 466 is moved forward, whereby the left ends of the first arm member 458 and the second arm member 460 are moved close to each other. Thus, the gun arm 462 is closed. Consequently, as shown in FIG. 49, the lower tip 470 is brought into contact with the metallic plate 500*a*, and the upper tip 468 is brought into contact with the metallic plate 504*a*, whereby the stacked body 434*a* is gripped between the lower tip 470 and the upper tip 468. At the same time, the auxiliary electrodes 476*a*, 476*b* are brought into contact with the metallic plate 504*a*. FIG. 48 is a schematic vertical cross-sectional view of the main part in the indirect feeding type welding apparatus 430 in this step.

Figure 50:
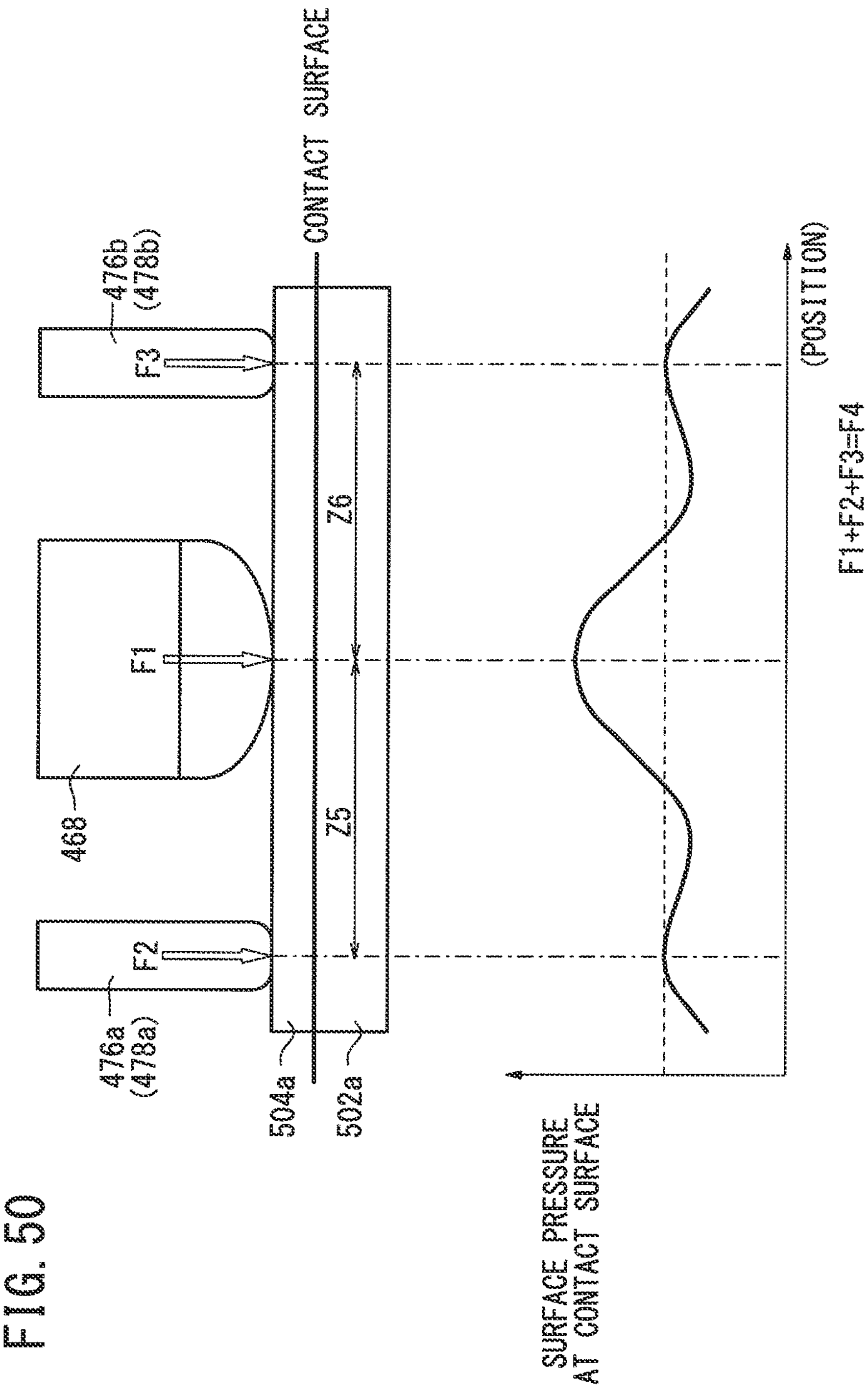
FIG. 50 is a schematic front view (with a graph) for illustrating an appropriate surface pressure distribution between an uppermost workpiece and a workpiece located immediately beneath the uppermost workpiece in the stacked body.

The distances Z5, Z6 between the upper tip 468 and the auxiliary electrodes 476*a*, 476*b* are controlled such that as shown in FIG. 50, a portion pressed by the upper tip 468 exhibits the highest surface pressure, and portions pressed by the auxiliary electrodes 476*a*, 476*b* exhibit the second highest surface pressure, at the contact surface between the metallic plates 504*a*, 502*a*. The distance Z5 is preferably equal to the distance Z6.

In other words, at the contact surface, some portions exhibit surface pressures lower than the above high pressures obtained due to the upper tip 468 and the auxiliary electrodes 476*a*, 476*b*. Consequently, a pressing force distribution shown in FIG. 50 is achieved. The distribution will be described in detail below.

The gun controller 506 controls the moving force of the open/close cylinder 464 such that the total pressing force (F1+F2+F3) of the upper tip 468 and the auxiliary electrodes 476*a*, 476*b* against the metallic plate 504*a* is well balanced with the pressing force (F4) of the lower tip 470 against the metallic plate 500*a*. By this control, the total pressing force (F1+F2+F3) applied to the stacked body 434*a* in the arrow Y1 direction is made approximately equal to the pressing force (F4) applied to the stacked body 434*a* in the arrow Y2 direction. The pressing force F2 is preferably equal to the pressing force F3.

In this case, the relation of F1<F4 is satisfied. Therefore, as schematically shown in FIG. 48, in the stacked body 434*a*, the total pressing force of the lower tip 470 and the upper tip 468 acts on a wider (larger) area in a position closer to the lower tip 470 than the upper tip 468. Thus, the force acting on the contact surface between the metallic plates 502*a*, 504*a* is smaller than the force acting on the contact surface between the metallic plates 500*a*, 502*a*. In a case where the distances Z5, Z6 are excessively small, the stacked body 434*a* does not have the above described portions, which exhibit surface pressures lower than the high pressures obtained due to the upper tip 468 and the auxiliary electrodes 476*a*, 476*b*. In this case, the appropriate distribution is hardly achieved.

Figure 51:
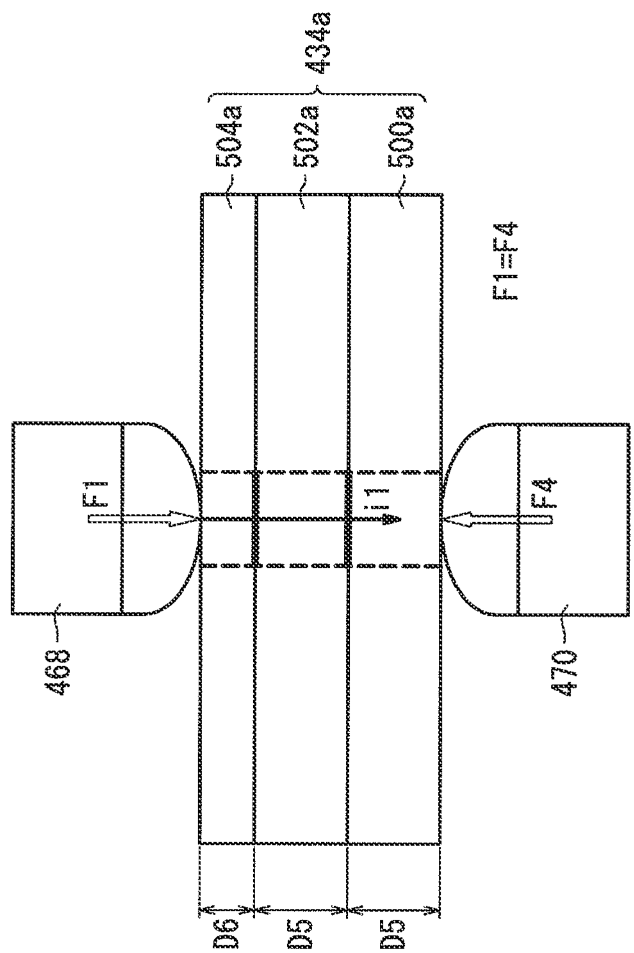
FIG. 51 is a schematic front view of the stacked body, gripped only by the lower and upper tips.

In a case where the relation of F1=F4 is satisfied without using the auxiliary electrodes 476*a*, 476*b*, a force distribution shown in FIG. 51 is achieved in the stacked body 434*a* by the lower tip 470 and the upper tip 468. As shown in FIG. 50, in this case, the total force acts uniformly over the stacked body 434*a* from the upper tip 468 to the lower tip 470. In other words, the force acting on the contact surface between the metallic plates 502*a*, 504*a* is equal to the force acting on the contact surface between the metallic plates 500*a*, 502*a*.

In FIGS. 48 and 51, at the contact surface between the metallic plates 502*a*, 504*a*, an area, on which the force acts, is represented by a thick solid line. As is clear from the comparison between FIGS. 48 and 51, the area, on which the force acts, is smaller under the condition of F1<F4 than under the condition of F1=F4. Thus, the metallic plate 504*a* has an area pressed against the metallic plate 502*a*, and the area is smaller under the condition of F1<F4 than under the condition of F1=F4. In other words, the contact area between the metallic plates 504*a*, 502*a* is smaller under the condition of F1<F4.

In the fourth embodiment, when the total pressing force is distributed from the upper tip 468 to the lower tip 470 as shown in FIG. 50 to achieve the smaller contact area between the metallic plates 502*a*, 504*a*, a reaction force is generated in the direction from the stacked body 434*a* toward the upper tip 468. The auxiliary electrodes 476*a*, 476*b* are subjected to the reaction force.

After the pressing force distribution is achieved, the gun controller 506 sends a control signal to the power source 450. When the power source 450 receives the control signal, the power source 450 acts to supply a welding current. The welding current flows from the upper electrode 444 connected to the positive terminal, through the lower electrode 442, to the negative terminal.

Figure 52:
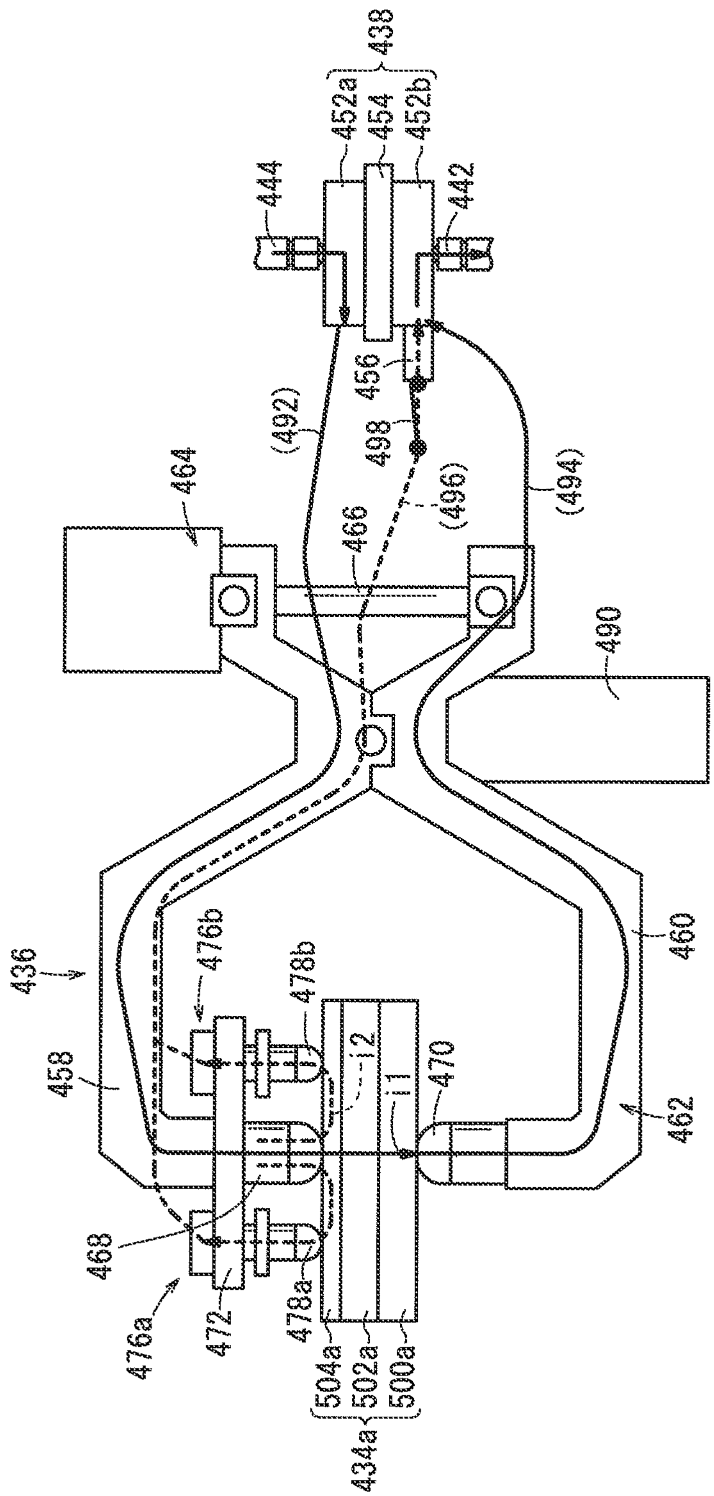
FIG. 52 is a side view of essential features showing the stacked body at the start of energization for generating a current flow from the upper tip to the lower tip and the auxiliary electrodes after the state of FIG. 48.
Figure 53:
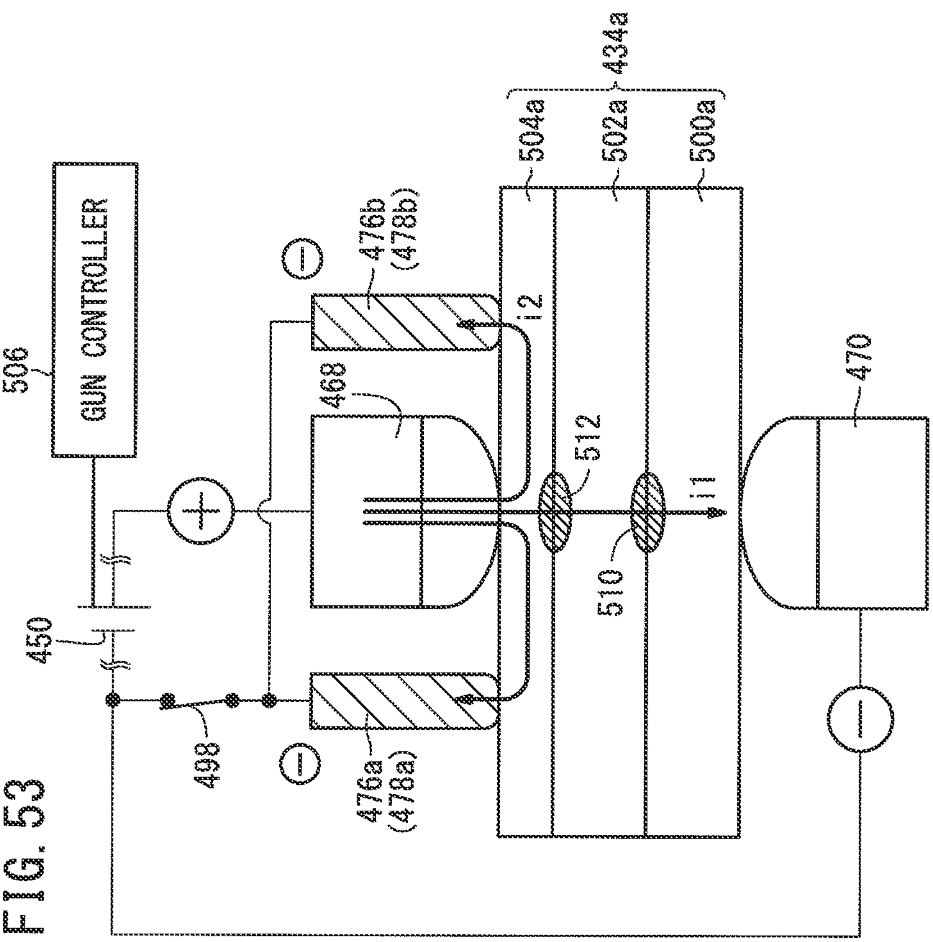
FIG. 53 is a schematic vertical cross-sectional view of the stacked body in the state of FIG. 52.

The welding current flows from the upper electrode 444, through the conductive terminal 452*a*, the lead 492, and the upper tip 468, to the metallic plate 504*a*. Therefore, as shown in FIGS. 52 and 53, a current i1 flows in the direction from the upper tip 468 to the lower tip 470. This is because the lower tip 470 is connected to the negative terminal of the power source 450 by the lead 494, the conductive terminal 452*b*, and the lower electrode 442 as described above.

The contact surface between the metallic plates 500*a*, 502*a* and the contact surface between the metallic plates 502*a*, 504*a* are heated by Joule heating generated due to the current i1, whereby heated regions 510, 512 are formed respectively.

As described above, the contact area between the metallic plates 504*a*, 502*a* is smaller in FIG. 48 than in FIG. 51. Therefore, the contact resistance and the current density at the contact surface between the metallic plates 502*a*, 504*a* are higher in FIG. 48 than in FIG. 51 (i.e. under the condition of F1<F4 than under the condition of F1=F4). Thus, the generated amount of Joule heating (i.e. the amount of generated heat) is larger under the condition of F1<F4 than under the condition of F1=F4. Consequently, under the condition of F1<F4, as shown in FIG. 52, the heated region 510 in the vicinity of the contact surface between the metallic plates 500*a*, 502*a* and the heated region 512 in the vicinity of the contact surface between the metallic plates 502*a*, 504*a* are grown to approximately the same size.

Also the auxiliary electrodes 476*a*, 476*b* having the negative polarities are in contact with the metallic plate 504*a*. Therefore, in addition to the current i1, a branching current i2 flows from the upper tip 468 toward the auxiliary electrodes 476*a*, 476*b* (see FIGS. 52 and 53).

Thus, in the fourth embodiment, the branching current i2 is generated not in the metallic plates 500*a*, 502*a* but in the metallic plate 504*a*. As a result, the metallic plate 504*a* exhibits a larger current value in this method as compared to conventional spot welding methods using only the upper tip 468 and the lower tip 470.

Figure 54:
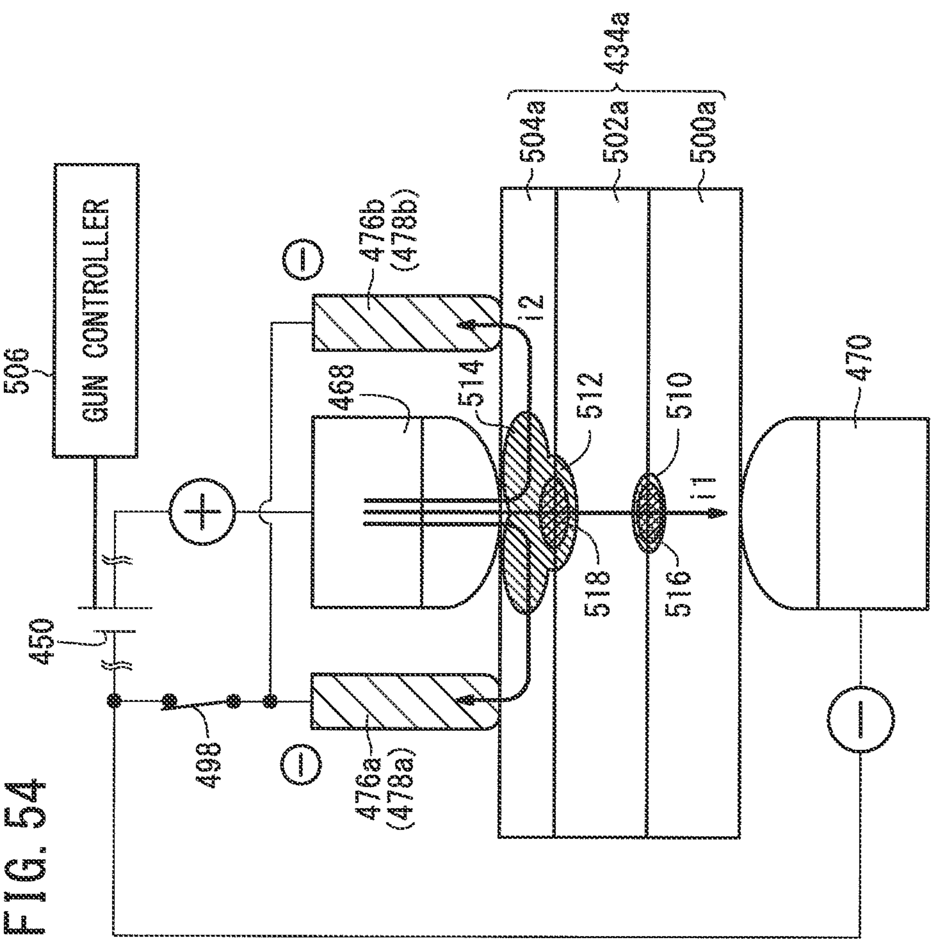
FIG. 54 is a schematic vertical cross-sectional view of the stacked body in the process of further performing the energization continuously after the state of FIG. 53.

In this method, as shown in FIG. 54, another heated region 514 different from the heated region 512 is formed in the metallic plate 504*a*. The heated region 514 is grown with time and then integrated with the heated region 512. The contact surface between the metallic plates 502*a*, 504*a* is subjected to heat from both of the integrated heated regions 512, 514.

The contact surface between the metallic plates 500*a*, 502*a* and the contact surface between the metallic plates 502*a*, 504*a* are heated to a sufficient temperature and melted by the heated regions 510, 512, 514. Thus obtained melted portions are cooled and solidified, whereby nuggets 516, 518 are formed between the metallic plates 500*a*, 502*a* and between the metallic plates 502*a*, 504*a* respectively. Though the nuggets 516, 518 are shown in FIG. 54 to facilitate understanding, the nuggets 516, 518 are in the liquid-phase states of the melted portions during the energization. Such melted portions are shown in this manner also in the following drawings.

The nugget 518 between the metallic plates 502*a*, 504*a* can be grown further larger by increasing the pressing forces F2, F3 of the auxiliary electrodes 476*a*, 476*b*. However, the size of the nugget 518 tends to become saturated at certain levels of the pressing forces F2, F3. In other words, the nugget 518 is hardly grown larger than a certain size by excessively increasing the pressing forces F2, F3. Furthermore, in the case of excessively increasing the pressing forces F2, F3, the pressing force F1 has to be excessively lowered in order to balancing the total force of the pressing forces F1, F2, F3 with the pressing force F4. As a result, the size of the nugget 516 between the metallic plates 500*a*, 502*a* is reduced.

Consequently, it is preferred that the difference between the pressing force F1 of the upper tip 468 and the pressing forces F2, F3 of the auxiliary electrodes 476*a*, 476*b* is determined in view of maximizing the sizes of the nuggets 516, 518.

As the ratio of the branching current i2 is increased, the heated region 514 can be made larger. However, when the ratio of the branching current i2 is excessively high, the current value of the current i1 is reduced, whereby the sizes of the heated regions 510, 512 are reduced. Thus, the size of the nugget 516 is liable to be reduced, while the size of the nugget 518 becomes saturated. The ratio of the branching current i2 is preferably selected in view of growing the nugget 516 to a sufficient size under the current i1.

For example, the ratio between the current i1 and the branching current i2 can be controlled by changing the distances Z5, Z6 between the upper tip 468 and the auxiliary electrodes 476*a*, 476*b* (see FIG. 48) as described above. The ratio between the current i1 and the branching current i2 is preferably e.g. 70:30.

In the process of forming the melted portion, the metallic plate 504*a* is pressed against the metallic plate 502*a* by the auxiliary electrodes 476*a*, 476*b*. The metallic plate 504*a* having a low rigidity can be prevented by such pressing from warping and thus from separating from the metallic plate 502*a* during the energization (heating). Thus, spatter scattering of the softened melted portion from a gap between the metallic plates 504*a*, 502*a* can be prevented.

The melted portion and hence the nugget 518 are grown with the passage of time as long as the energization is continued. Therefore, the nugget 518 can be sufficiently grown by performing the energization over an appropriate time.

The current value of the current i1 in the metallic plates 500*a*, 502*a* is smaller than that in a conventional spot welding method. Therefore, the amount of generated heats of the metallic plates 500*a*, 502*a* can be prevented from excessively increasing in the process of growing the melted portion (the nugget 518) between the metallic plates 502*a*, 504*a*. Consequently, the apparatus is capable of eliminating the possibility of the spatter generation.

In this process, a melted portion to be solidified into the nugget 516 is formed by the current i1 between the metallic plates 500*a*, 502*a*. When the branching current i2 is continuously applied, the total amount of the current i1 is reduced, and the heated region 510 and hence the nugget 516 are liable to be reduced in size, as compared to the case without the branching current i2.

Figure 55:
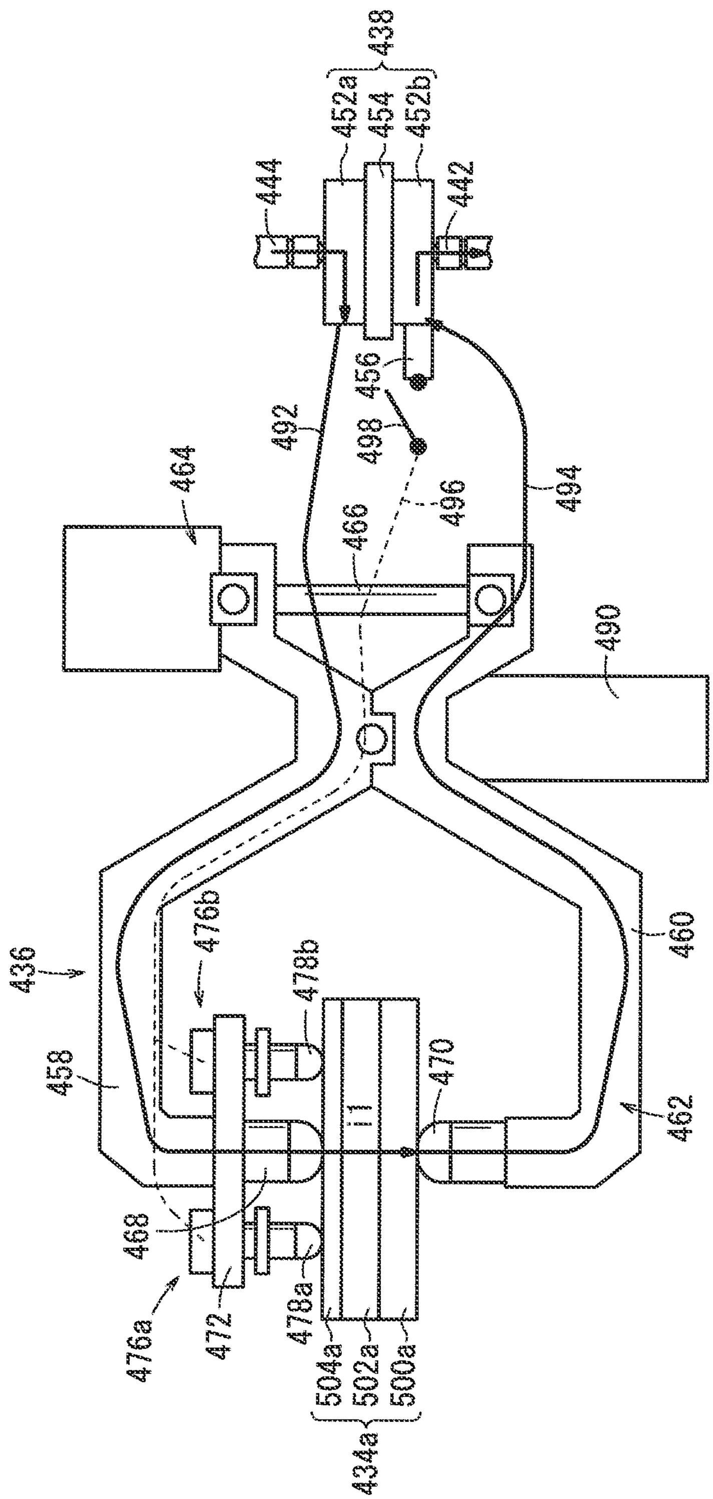
FIG. 55 is a side view of essential features showing the stacked body in the process of further performing the energization from the upper tip to the lower tip continuously after the current from the upper tip to the auxiliary electrodes is eliminated.
Figure 56:
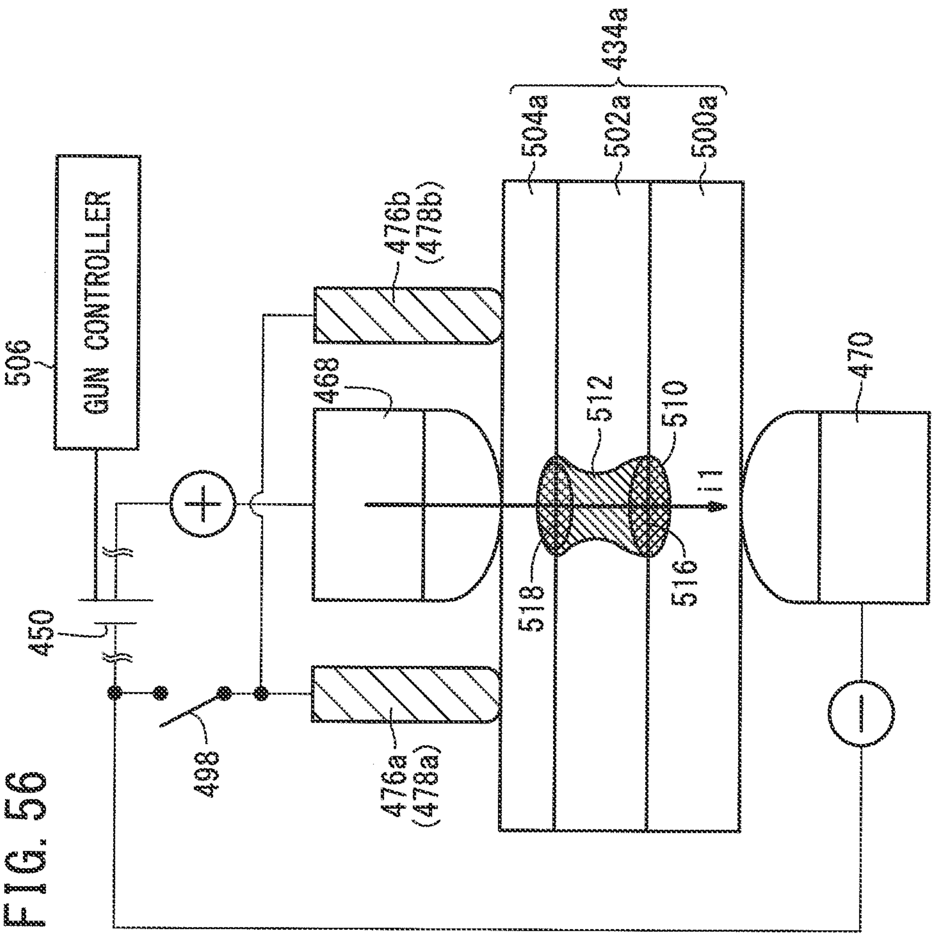
FIG. 56 is a schematic vertical cross-sectional view of the stacked body in the state of FIG. 55.

Therefore, in the case of further increasing the size of the nugget 516, the ON/OFF switch 498 is opened by the gun controller 506 as shown in FIGS. 55 and 56. As a result, the auxiliary electrodes 476*a*, 476*b* are electrically disconnected from the auxiliary terminal 456 to eliminate the branching current i2, so that the heated region 514 (see FIG. 54) disappears.

In this process, the energization of the upper tip 468 and the lower tip 470 is continued. Thus, the metallic plates 500*a*, 502*a* are under a common spot welding condition. Since the current value of the current i1 is increased after the dissipation of the branching current i2, the Joule heating value is increased in the high resistance metallic plates 500*a*, 502*a*, whereby the heated region 510 is expanded and further heated to a higher temperature. The contact surface between the metallic plates 500*a*, 502*a* is heated to a sufficient temperature and melted by the heated region 510 having the higher temperature, and the melted portion (the nugget 516) is grown larger.

Thereafter, the energization may be continued until the melted portion (the nugget 516) grows sufficiently, e.g. until the melted portion for forming the nugget 516 is integrated with the melted portion for forming the nugget 518 as shown in FIG. 56. The relation between the energization time and the growth of the nugget 516 may be confirmed in advance by a spot welding test using test pieces.

The contact surface between the metallic plates 500*a*, 502*a* is preheated by the heated region 510 formed by the conduction of the current i1 while the nugget 518 is grown between the metallic plates 502*a*, 504*a*. Therefore, the affinity of the metallic plates 500*a*, 502*a* with each other is improved before the melted portion to be converted to the nugget 516 is grown larger. Consequently, the spatter generation is hardly caused.

As described above, in the fourth embodiment, the spatter generation can be prevented in both of the process of growing the nugget 518 between the metallic plates 502*a*, 504*a* and the process of growing the nugget 516 between the metallic plates 500*a*, 502*a*.

Figure 57:
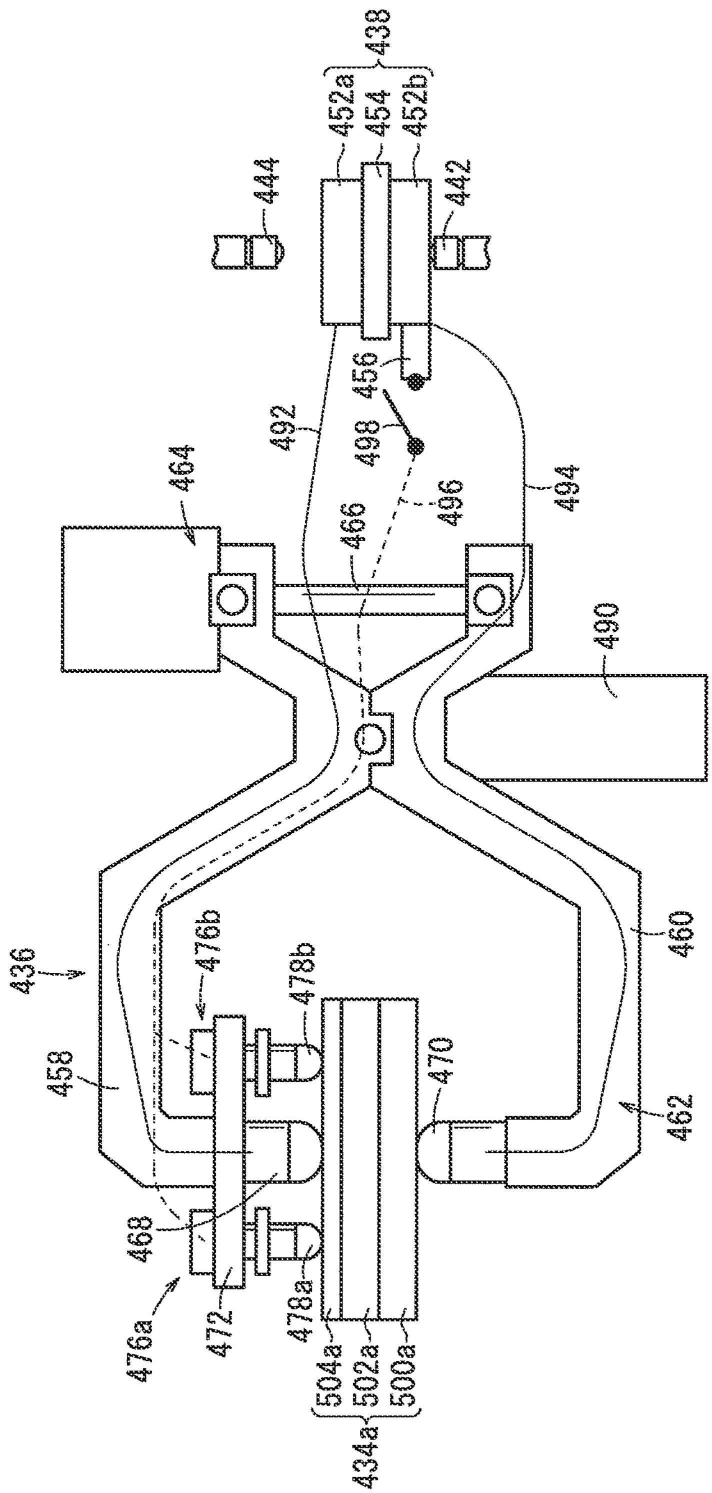
FIG. 57 is a side view of essential features showing the stacked body after completion of the energization (spot welding)

After the melted portion is sufficiently grown in a predetermined time, the energization is stopped as shown in FIG. 57. The energization may be stopped by separating the upper electrode 444 from the conductive terminal 452*a* or by stopping the welding current supply to the upper electrode 444.

Figure 58:
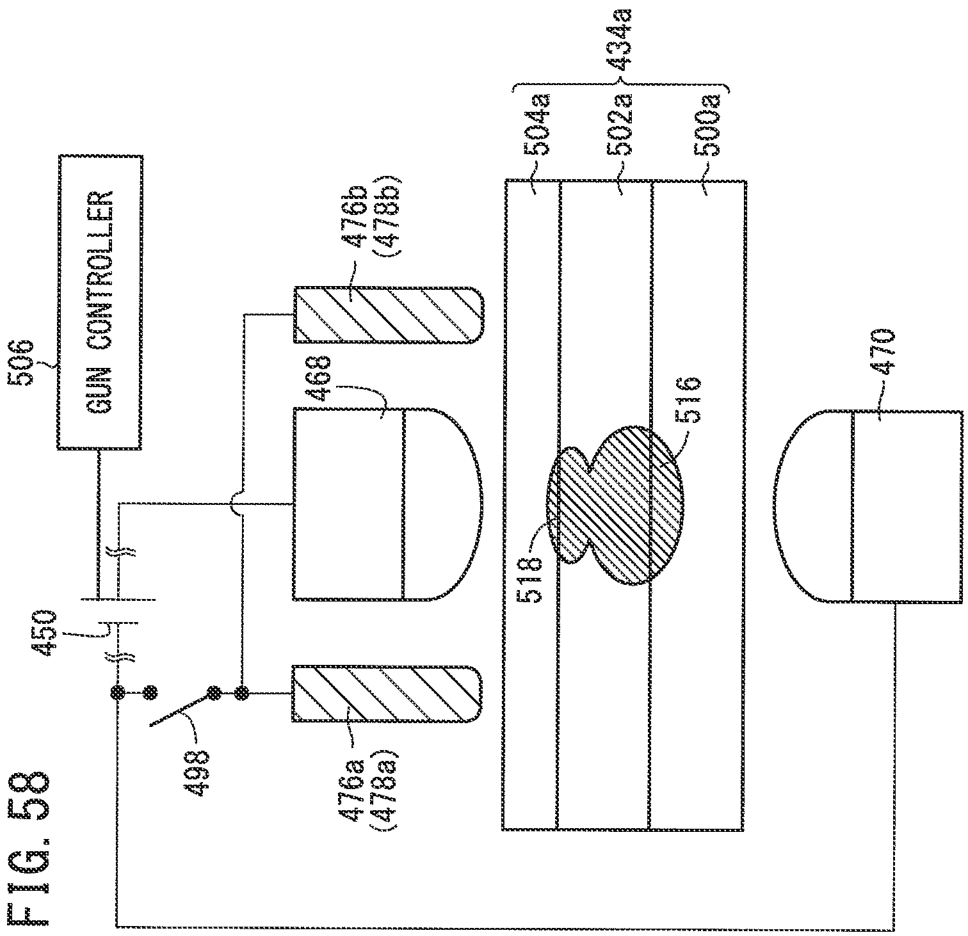
FIG. 58 is a schematic vertical cross-sectional view of the stacked body after the upper tip, the lower tip, and the auxiliary electrodes are separated from the stacked body after the state of FIG. 57.

The open/close cylinder 464 is actuated, and the open/close rod 466 is moved backward, whereby the gun arm 462 is opened. As a result, as shown in FIG. 58, the upper tip 468 and the lower tip 470 are moved away from each other, and are separated from the stacked body 434*a*. At the same time, the auxiliary electrodes 476*a*, 476*b* are separated from the metallic plate 504*a*. The auxiliary electrodes 476*a*, 476*b* are returned to the original positions under the elastic force of the coil springs 488*a*, 488*b* (see FIG. 47).

The operations from the start to the end of the spot welding method are performed under the control of the gun controller 506.

When the energization is stopped in the above manner, the heating of the metallic plates 500*a*, 502*a* is stopped. The obtained melted portion is cooled and solidified with the passage of time, whereby the metallic plates 500*a*, 502*a* are joined to each other by the nugget 516.

Consequently, in the stacked body 434*a*, the metallic plates 500*a*, 502*a* are joined to each other, and the metallic plates 502*a*, 504*a* are joined to each other, to obtain a bonded article as a final product.

The bonded product is excellent in the bonding strengths between the metallic plates 500*a*, 502*a* and between the metallic plates 502*a*, 504*a*. This is because the nugget 518 between the metallic plates 502*a*, 504*a* is sufficiently grown under the branching current i2 flowing in the metallic plate 504*a* as described above.

As described above, in the fourth embodiment, the nugget 518 between the metallic plates 502*a*, 504*a* can be grown to a size approximately equal to that of the nugget 516 between the metallic plates 500*a*, 502*a* while preventing the spatter generation, whereby the bonded product can be produced with the excellent bonding strength between the metallic plates 502*a*, 504*a*.

The indirect feeding type welding apparatus 430 can be prepared only by attaching the bracket 472 having the auxiliary electrodes 476*a*, 476*b* to the upper tip 468 in a known indirect feeding type welding apparatus. Thus, the indirect feeding type welding apparatus 430 can be prevented from having a complicated or large structure due to the auxiliary electrodes 476*a*, 476*b*. Therefore, even in a case where an intricately-shaped object is welded, the object can be located in a desired welding position without interference from the auxiliary electrodes 476*a*, 476*b* and the upper tip 468.

The object to be welded is not limited to the stacked body 434*a*. The number, the materials, and the thicknesses of the metallic plates may be variously changed in the stacked body. Several specific examples will be described below.

Figure 59:
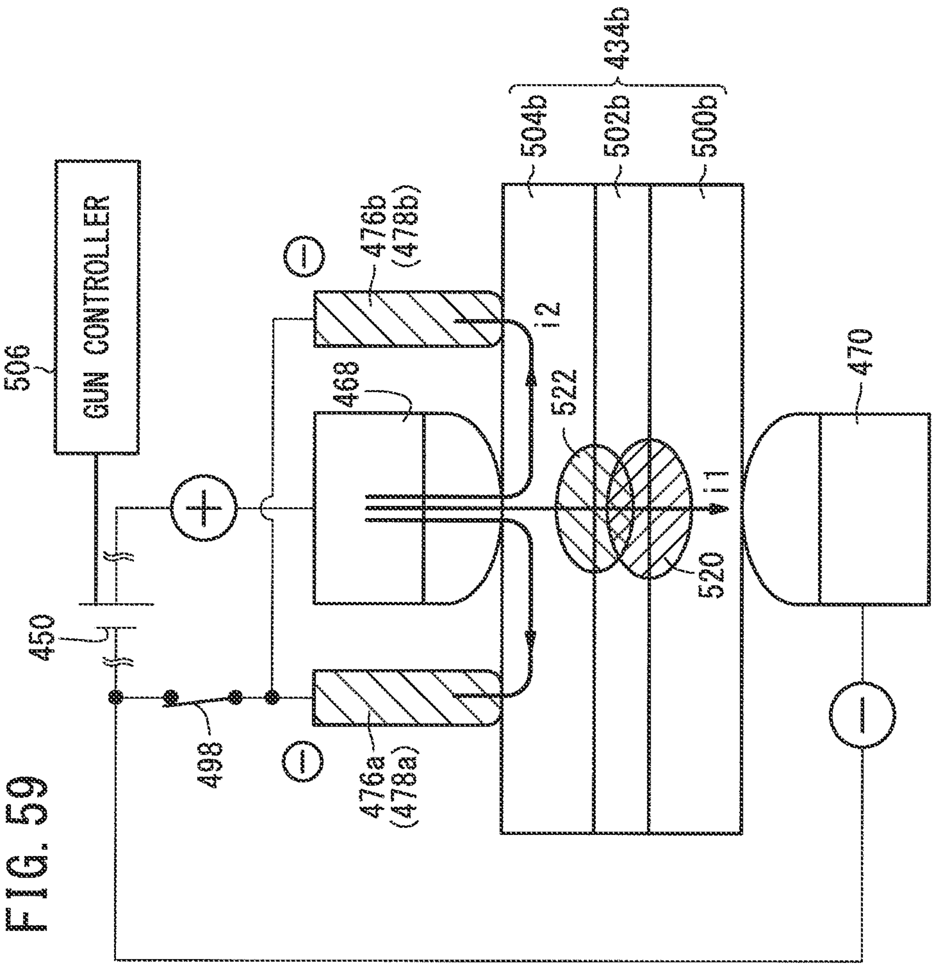
FIG. 59 is a schematic vertical cross-sectional view of a stacked body different from that of FIG. 48, gripped by the lower tip, the upper tip, and the auxiliary electrodes, at the start of the energization.

In a stacked body 434*b* shown in FIG. 59, a metallic plate 502*b* having the smallest thickness is interposed between metallic plates 500*b*, 504*b*. For example, the metallic plate 500*b* is a high resistance workpiece composed of a high tensile strength steel, and the metallic plates 502*b*, 504*b* are low resistance workpieces composed of a mild steel.

In a case where the stacked body 434*b* is spot-welded only by the upper tip 468 and the lower tip 470, the contact surface between the metallic plates 500*b*, 502*b* is melted first. This is because the metallic plate 500*b* is the high resistance workpiece, whereby the contact resistance between the metallic plates 500*b*, 502*b* is higher than that between the metallic plates 502*b*, 504*b*. Therefore, when the energization of the upper tip 468 and the lower tip 470 is continued to sufficiently grow a nugget at the contact surface between the metallic plates 502*b*, 504*b*, the spatter generation may be caused at the contact surface between the metallic plates 500*b*, 502*b*.

In contrast, as shown in FIG. 59, according to the fourth embodiment using the auxiliary electrodes 476*a*, 476*b*, heated regions 520, 522 are formed at the contact surface between the metallic plates 500*b*, 502*b* and the contact surface between the metallic plates 502*b*, 504*b* respectively. This is because the contact surface between the metallic plates 502*b*, 504*b* is sufficiently heated by the branching current i2 in the metallic plate 504*b* in the same manner as the above stacked body 434*a*.

Figure 60:
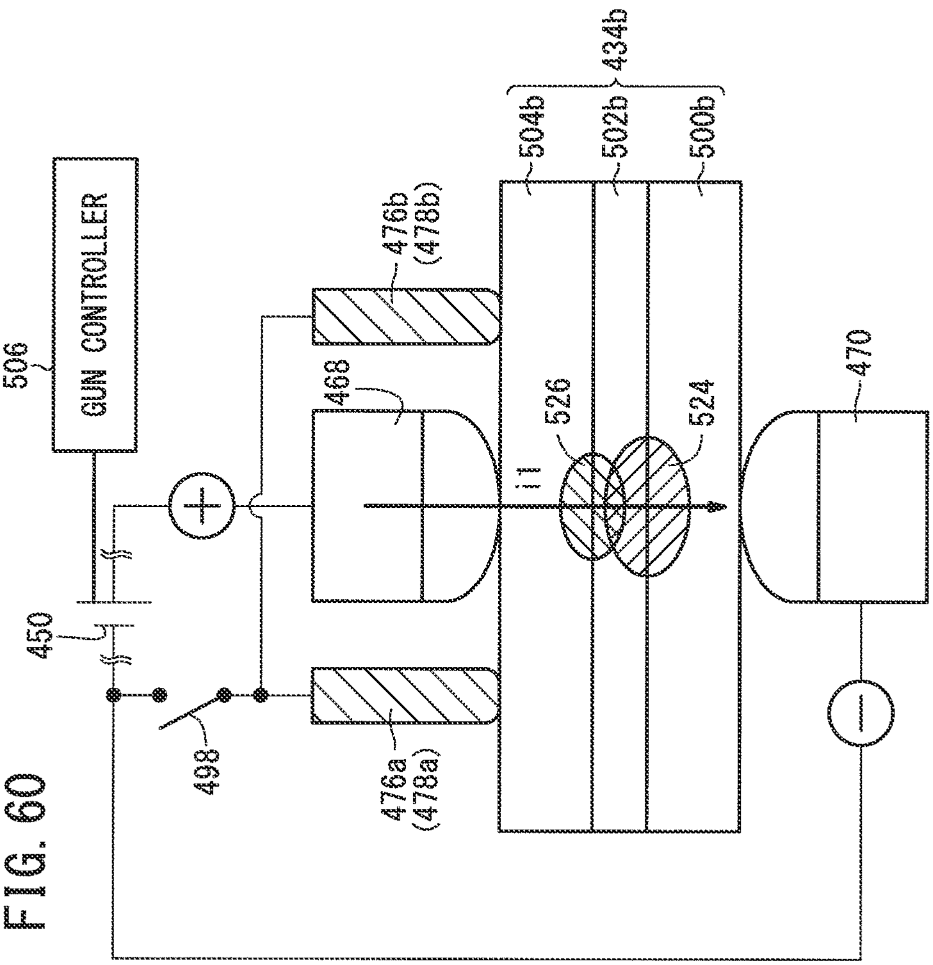
FIG. 60 is a schematic vertical cross-sectional view of the stacked body in the process of generating a current flow from the upper tip to the lower tip after the current flow from the upper tip to the auxiliary electrodes is eliminated after the state of FIG. 59.
Figure 61:
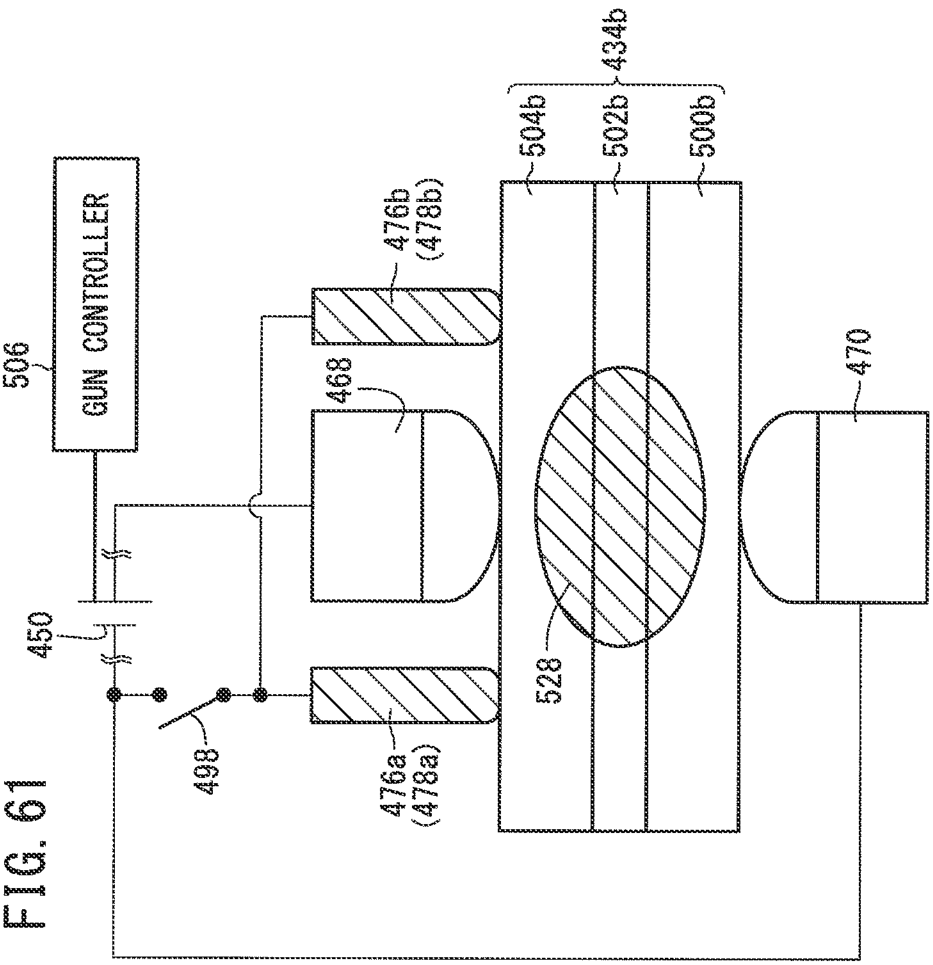
FIG. 61 is a schematic vertical cross-sectional view of the stacked body after completion of the energization (spot welding)

Consequently, nuggets 524, 526 are formed as shown in FIG. 60. After the branching current i2 has vanished, the current i1 may be continuously applied. In this case, for example, as shown in FIG. 61, a sufficiently larger nugget 528 can be developed over the contact surface between the metallic plates 500*b*, 502*b* and the contact surface between the metallic plates 502*b*, 504*b*.

As is clear from the above explanations of the spot welding of the stacked assemblies 434*a*, 434*b*, by using the auxiliary electrodes 476*a*, 476*b*, the heated regions and hence the nuggets can be shifted closer to the auxiliary electrodes 476*a*, 476*b*.

Though the metallic plate 500*b* is composed of the high tensile strength steel and the metallic plates 502*b*, 504*b* are composed of the mild steel in the above example, of course, the combination of the materials are not particularly limited thereto.

Figure 62:
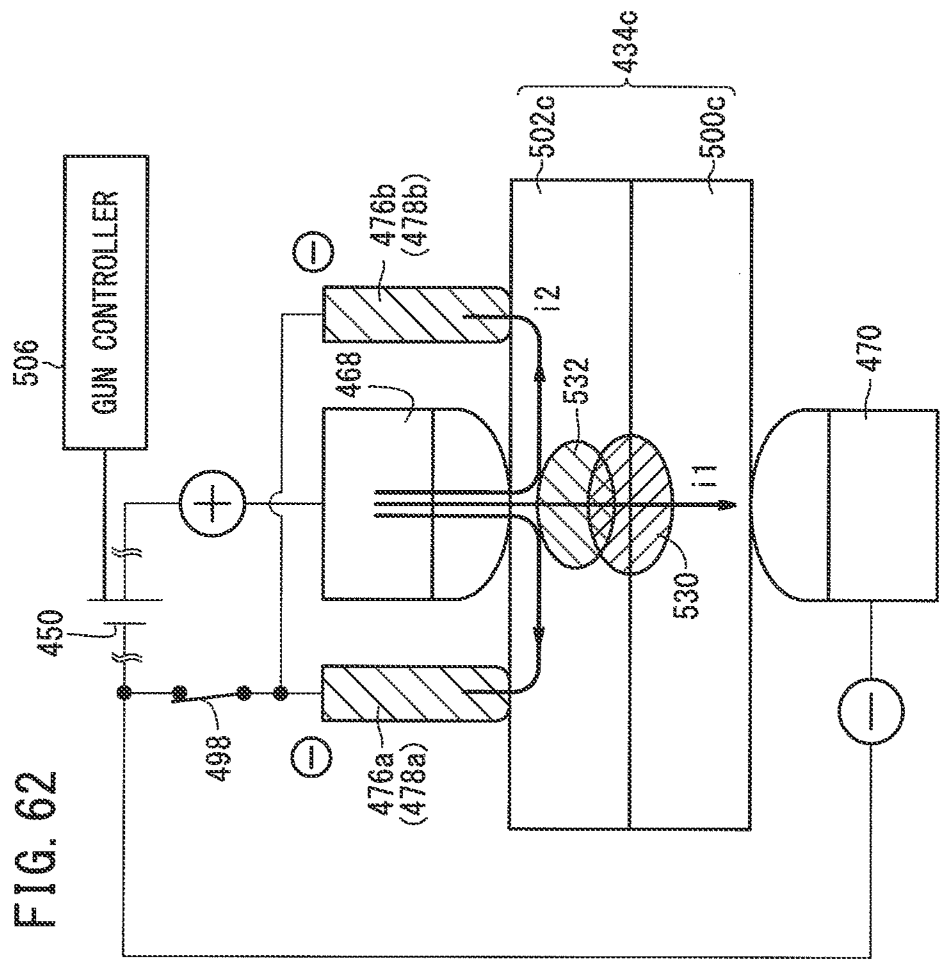
FIG. 62 is a schematic vertical cross-sectional view of a stacked body different from those of FIGS. 48 and 58, gripped by the lower tip, the upper tip, and the auxiliary electrodes, at the start of the energization.

In FIG. 62, a stacked body 434*c*, which is provided by stacking a metallic plate 502*c* on a metallic plate 500*c*, is spot-welded by using the auxiliary electrodes 476*a*, 476*b*. The metallic plates 502*c*, 500*c* are composed of a high tensile strength steel.

In the case of not using the auxiliary electrodes 476*a*, 476*b*, because the metallic plates 500*c*, 502*c* are high resistance workpieces, a large amount of Joule heating is generated in the vicinity of the contact surface therebetween during the energization. Therefore, a melted portion grows larger in a relatively short time in the vicinity of the contact surface, so that the melted portion is liable to be scattered (the spatter generation is liable to be caused).

In contrast, as shown in FIG. 62, since the auxiliary electrodes 476*a*, 476*b* are used in the fourth embodiment, a heated region 530 is formed at the contact surface between the metallic plates 500*c*, 502*c*, and a heated region 532 is formed above the contact surface (i.e. in the vicinity of the auxiliary electrodes 476*a*, 476*b* in the metallic plate 502*c*). This is because the metallic plate 502*c* is sufficiently heated by the branching current i2 flow in the metallic plate 502*c*. Thus, also in this case, the heated region and hence a nugget 534 (see FIG. 63) can be shifted closer to the auxiliary electrodes 476*a*, 476*b*.

Figure 63:
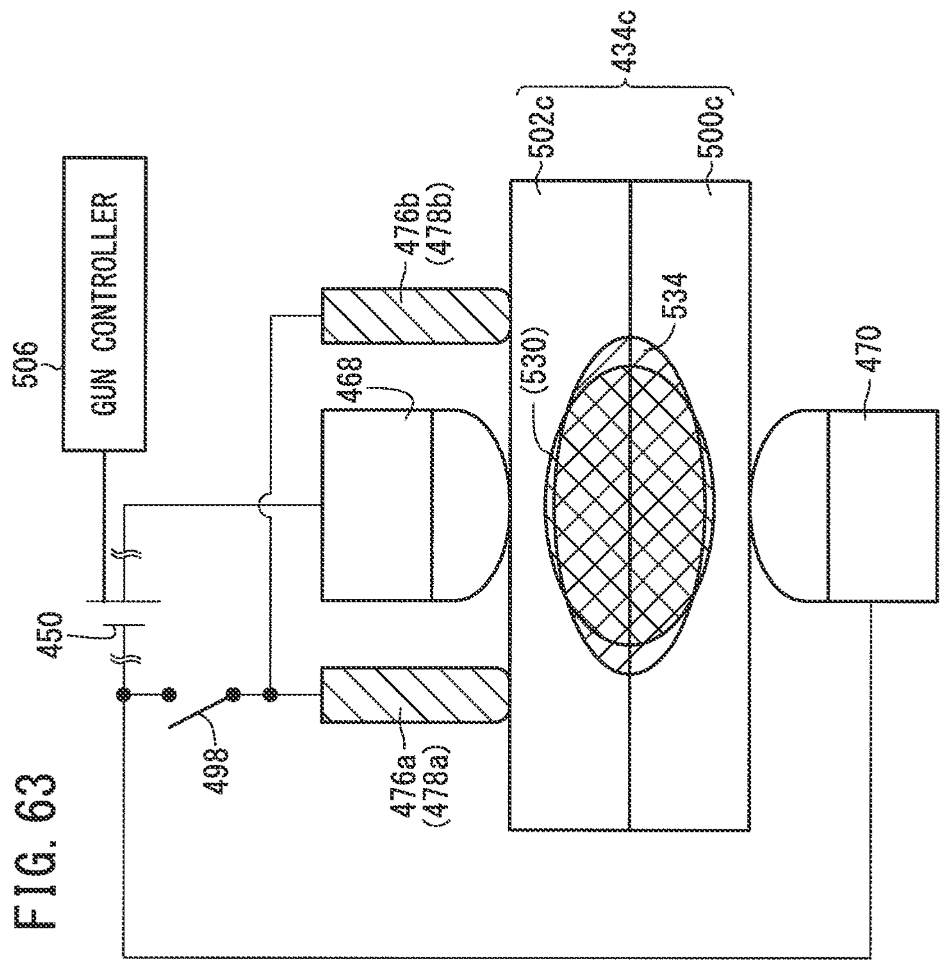
FIG. 63 is a schematic vertical cross-sectional view of the stacked body at the end of the energization (spot welding)

Consequently, the contact surface between the metallic plates 500*c*, 502*c* is softened, thereby improving the sealing property. Thus, even when the current i1 is continuously applied to form the sufficiently large nugget 534 as shown in FIG. 63, the spatter generation is hardly caused.

In addition, it is to be understood that the stacked body may contain four or more metallic plates.

Figure 64:
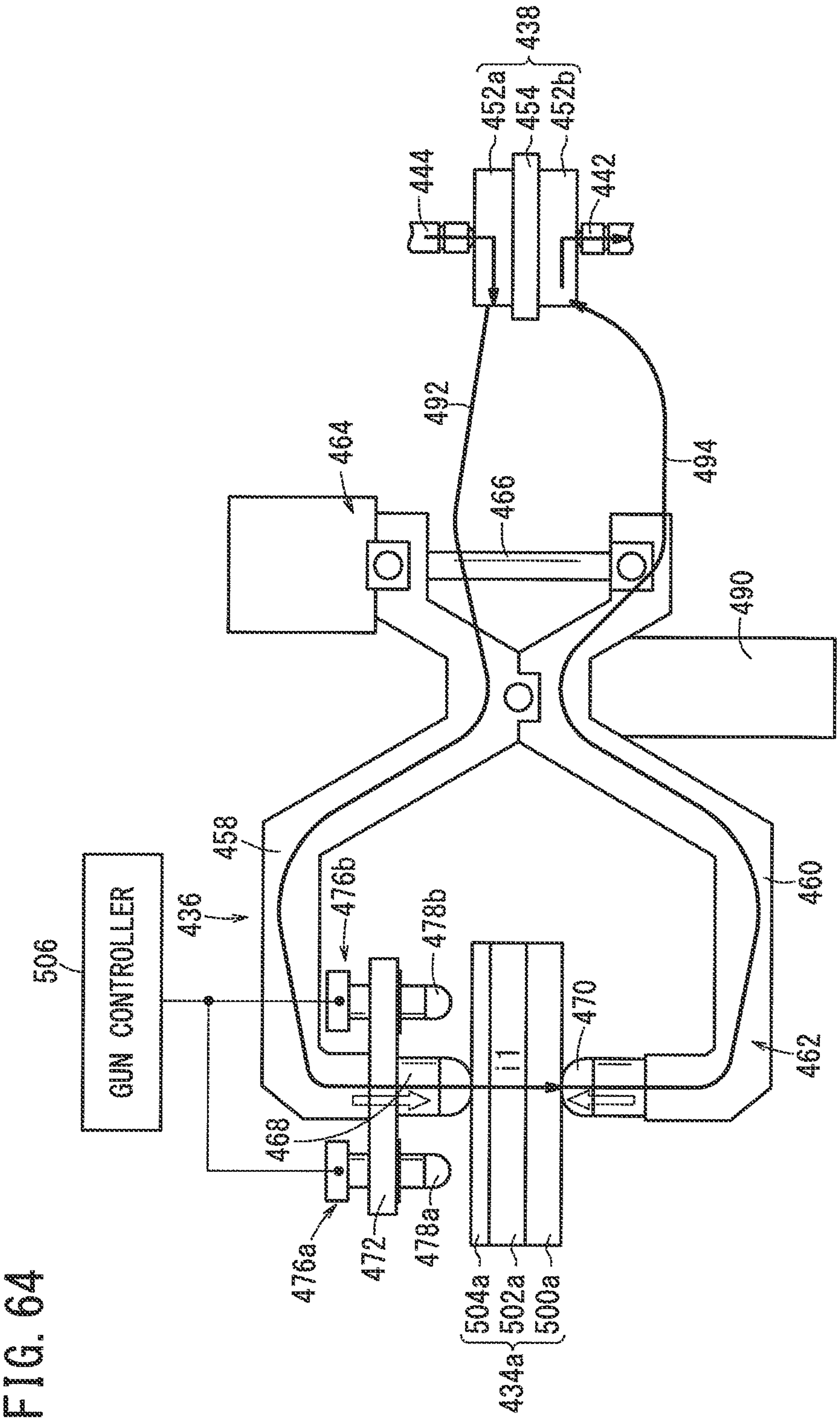
FIG. 64 is a side view of essential features showing an indirect feeding type welding apparatus having an actuator for displacing the auxiliary electrodes.

As shown in FIG. 64, the branching current i2 may be eliminated not by opening the ON/OFF switch 498 but by separating the auxiliary electrodes 476*a*, 476*b* from the metallic plate 504*a* (the outermost workpiece). In this case, a displacement mechanism for displacing the auxiliary electrodes 476*a*, 476*b* (such as an air cylinder) may be disposed on the bracket 472, and the auxiliary electrodes 476*a*, 476*b* may be moved upward away from the metallic plate 504*a* by the displacement mechanism. The displacement mechanism can be controlled by the gun controller 506.

Figure 65:
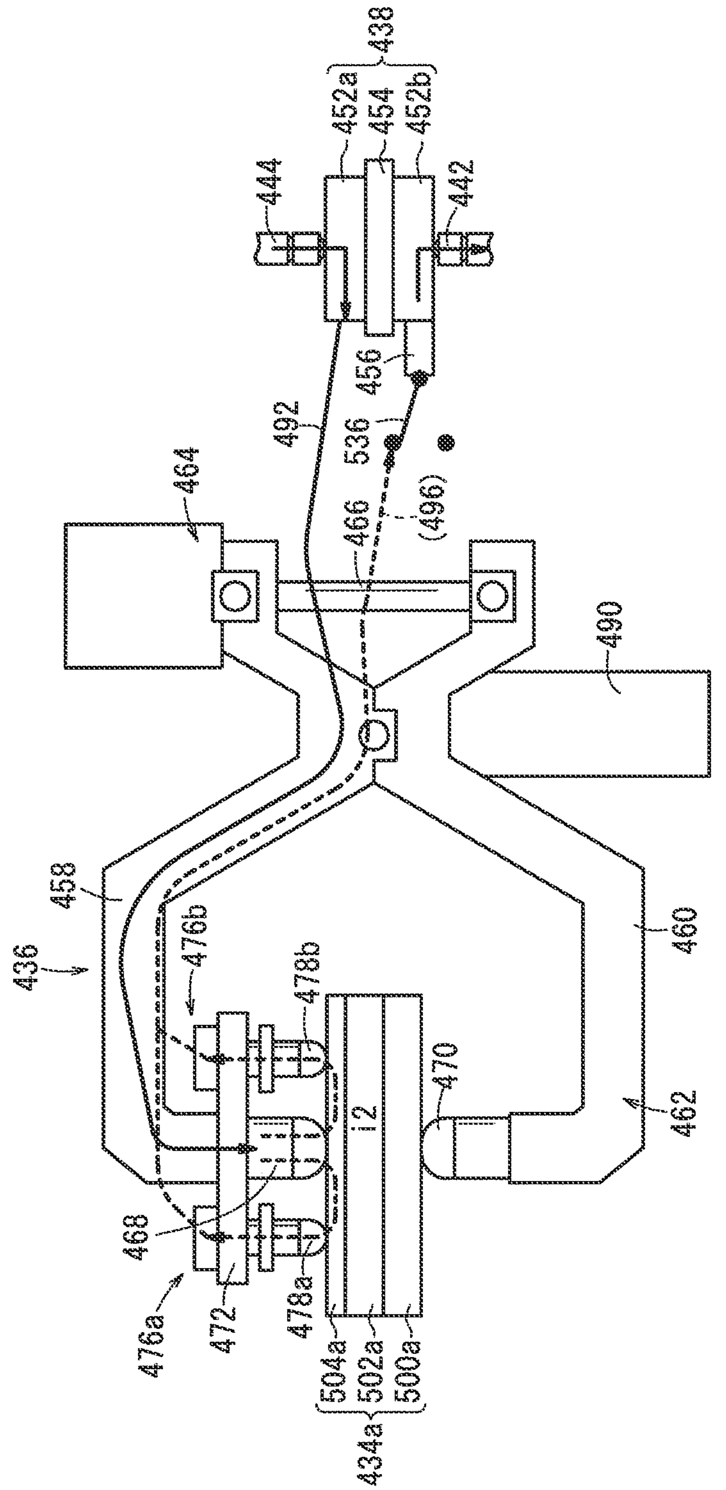
FIG. 65 is a side view of essential features showing an indirect feeding type welding apparatus using a changing-over switch instead of an ON/OFF switch.
Figure 66:
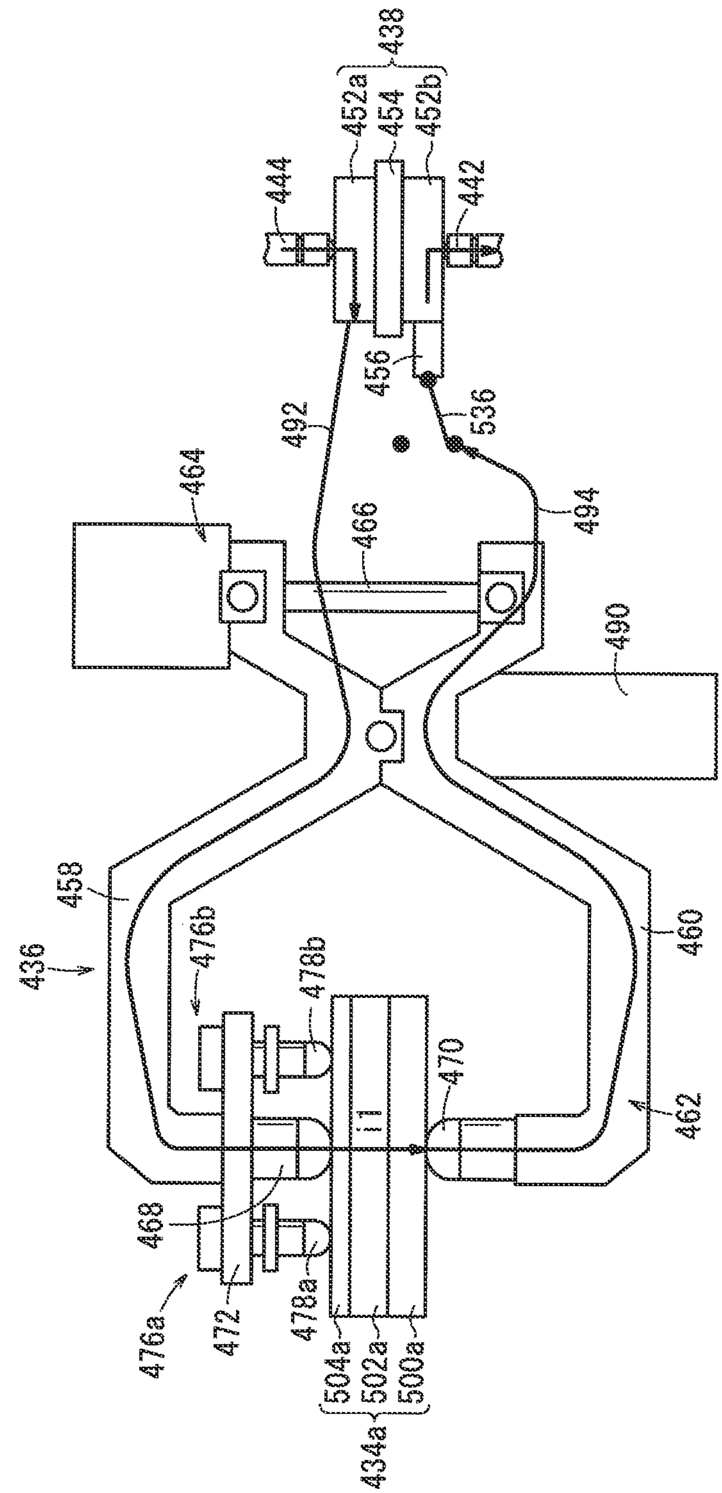
FIG. 66 is a side view of essential features showing the changing-over switch, turned from the state of FIG. 65 to change a current pathway.

Furthermore, as shown in FIGS. 65 and 66, a changing-over switch 536 may be used instead of the ON/OFF switch 498. In this case, the changing-over switch 536 acts to form a current pathway between the auxiliary electrodes 476*a*, 476*b* and the auxiliary terminal 456 (see FIG. 65) or a current pathway between the lower tip 470 and the auxiliary terminal 456 (see FIG. 66). In an initial stage of the welding, as shown in FIG. 65, the welding current is supplied to the upper electrode 444, conducted through the upper tip 468, the metallic plate 504*a*, the auxiliary electrodes 476*a*, 476*b*, the changing-over switch 536, the auxiliary terminal 456, and the conductive terminal 452*b*, and introduced to the lower electrode 442.

Thus, in the initial stage, the current does not flow in the thickness direction of the stacked body 434*a*, so that only an internal portion of the metallic plate 504*a* and hence a portion in the vicinity of the contact surface between the metallic plates 502*a*, 504*a* is heated.

After a predetermined time has elapsed, as shown in FIG. 66, the changing-over switch 536 is switched, whereby the current pathway is formed between the lower tip 470 and the auxiliary terminal 456. Consequently, the welding current is supplied to the upper electrode 444, conducted through the stacked body 434*a* in the thickness direction from the upper tip 468 to the lower tip 470, further transferred through the auxiliary terminal 456 and the conductive terminal 452*b*, and introduced to the lower electrode 442.

In this stage, the melted portions and hence the nuggets are grown in the vicinity of the contact surface between the metallic plates 500*a*, 502*a* and in the vicinity of the contact surface between the metallic plates 502*a*, 504*a*. Since the metallic plates 500*a*, 502*a* have a high contact resistance, a large amount of Joule heating is generated in the vicinity of the contact surface therebetween, and the contact surface is sufficiently heated. Though the metallic plates 502*a*, 504*a* have a low contact resistance, the contact surface therebetween has been heated, and the melted portion is readily formed in the vicinity of the contact surface.

As described above, the nugget can be sufficiently grown between the adjacent metallic plates also by changing the current flow direction in the initial stage and the following stage of the welding. Consequently, the welded assembly can be produced with the excellent bonding strength.

Though the branching current i2 flows from the upper tip 468 to the auxiliary electrodes 476*a*, 476*b* in the fourth embodiment, the auxiliary electrodes 476*a*, 476*b* may be electrically isolated from the power source 450, and the spot welding may be carried out without the branching current i2. In this case, the auxiliary electrodes 476*a*, 476*b* act only as the pressing members.

Also in this case, the total pressing force is distributed from the upper tip 468 to the lower tip 470 as shown in FIG. 48. The contact area between the metallic plates 504*a*, 502*a* is larger than the case without being pressed by the auxiliary electrodes 476*a*, 476*b* (see FIG. 49). Therefore, the contact resistance and the current density at the contact surface between the metallic plates 502*a*, 504*a* are increased, and the generated amount of Joule heating (i.e. the amount of generated heat) is increased. Consequently, the heated region and hence the nugget are grown to a sufficient size in the vicinity of the contact surface between the metallic plates 502*a*, 504*a*.

A first support tip and a support pressing member may be disposed between the stacked body and the upper tip 468 (and the auxiliary electrodes 476*a*, 476*b* (pressing members)), and a second support tip may be disposed between the stacked body and the lower tip 470. A fifth embodiment, which uses the components e.g. in the welding of the stacked body 434*a*, will be described below.

Figure 67:
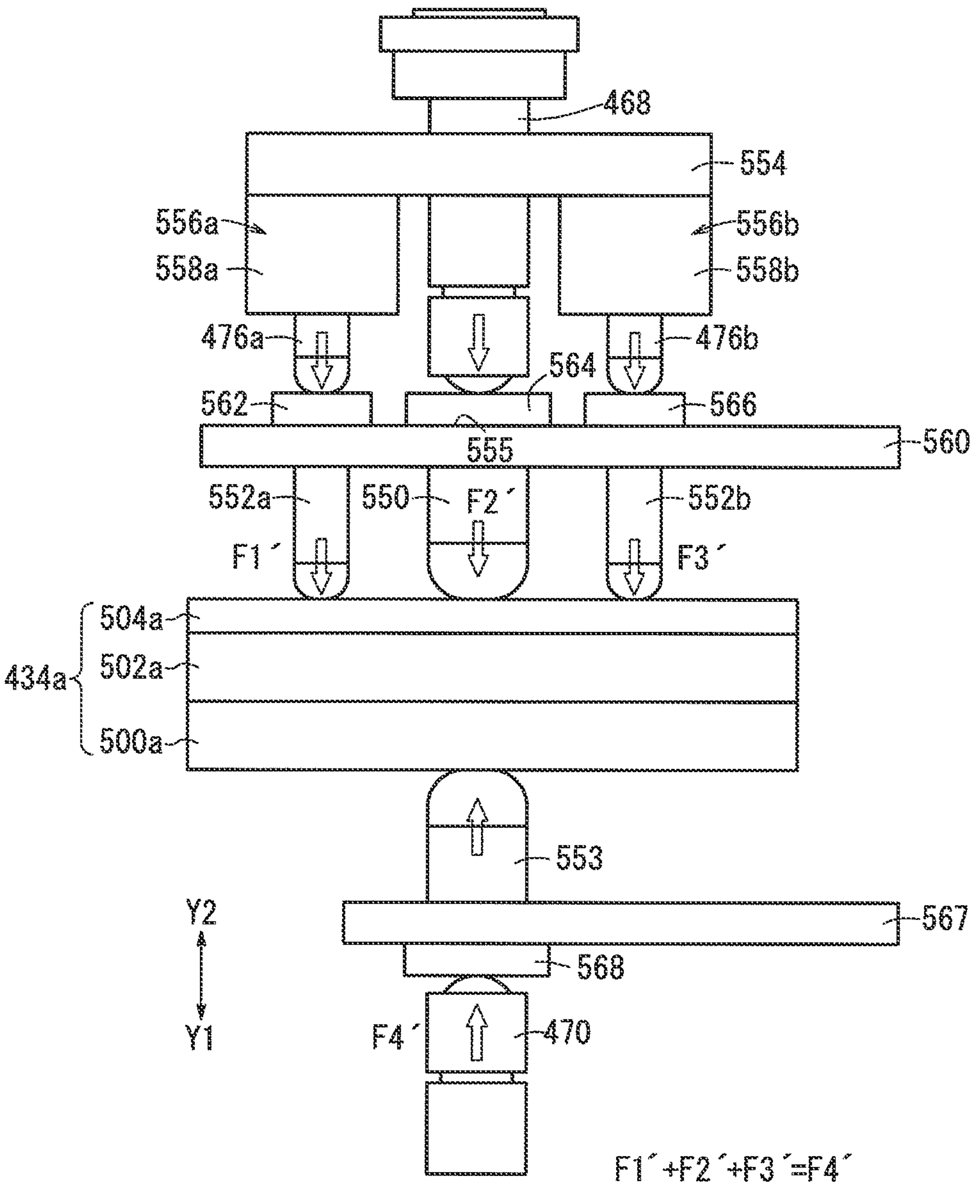
FIG. 67 is a front view of essential features showing an indirect feeding type welding apparatus having support tips and support pressing members between the upper tip (the auxiliary electrodes) and the stacked body.

FIG. 67 is a front view of the essential features of an indirect feeding type welding apparatus having an upper support tip 550 (first support tip), support pressing members 552*a*, 552*b*, and a lower support tip 553 (second support tip). In this indirect feeding type welding apparatus, a bracket 554 is attached to the body of the upper tip 468. The bracket 554 has a through-hole 555, which has a diameter approximately equal to the body diameter of the upper tip 468. The body of the upper tip 468 is inserted and fitted into the through-hole 555.

Specifically, two actuators 556*a*, 556*b* are disposed in the bracket 554. The auxiliary electrodes 476*a*, 476*b*, which act as pressing members, project from tubes 558*a*, 558*b* in the actuators 556*a*, 556*b* and extend parallel to the upper tip 468. The auxiliary electrodes 476*a*, 476*b* are displaced by the actuators 556*a*, 556*b* close to and away from the lower tip 470. Thus, the actuators 556*a*, 556*b* act as displacement mechanisms for displacing the auxiliary electrodes 476*a*, 476*b* and as pressing force generation/control mechanisms for generating and controlling pressing forces of the auxiliary electrodes 476*a*, 476*b*.

The upper support tip 550 and the support pressing members 552*a*, 552*b* are interposed between the metallic plate 504*a* of the stacked body 434*a* and the upper tip 468 (and the auxiliary electrodes 476*a*, 476*b*). The upper support tip 550 and the support pressing members 552*a*, 552*b* are disposed on a first open/close bracket 560 supported by an open/close mechanism (not shown). The first open/close bracket 560 is composed of an insulator.

Long wide pressing parts 562, 564, 566 are disposed on the tops of the upper support tip 550 and the support pressing members 552*a*, 552*b* respectively. The pressing parts 562, 564, 566 are conductors.

Figure 68:
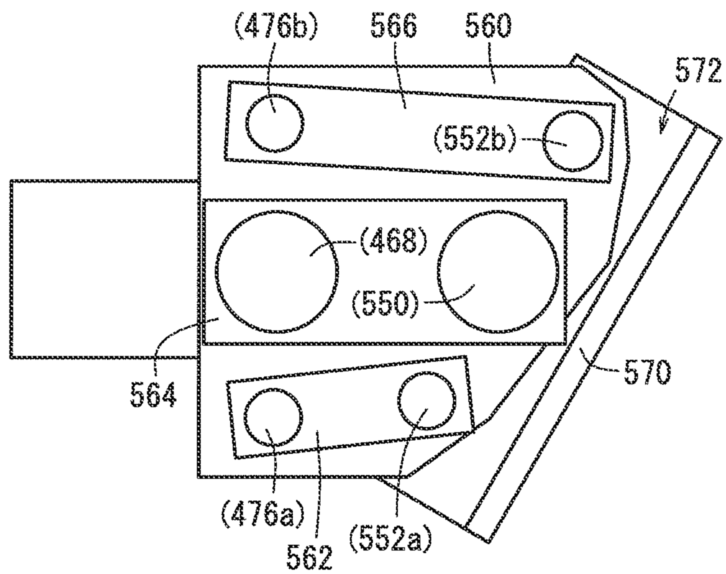
FIG. 68 is a plan view for illustrating positional relations of the support tips and the support pressing members to the upper tip and the auxiliary electrodes around pressing parts.

As shown in FIG. 68, the lower ends of the upper tip 468 and the auxiliary electrodes 476*a*, 476*b* are brought into contact with the upper surfaces of one ends of the pressing parts 562, 564, 566 respectively. The upper support tip 550 and the support pressing members 552*a*, 552*b* project from the lower surfaces of the other ends of the pressing parts 562, 564, 566.

The lower support tip 553 is disposed on a second open/close bracket 567 supported by the open/close mechanism. The lower support tip 553 is interposed between the lower tip 470 and the metallic plate 500*a* of the stacked body 434*a*. Also the second open/close bracket 567 is composed of an insulator.

A pressing part 568 is disposed on the bottom of the lower support tip 553. In the structure of FIG. 68, the top of the lower tip 470 is brought into contact with the lower surface of one end of the pressing part 568. The lower support tip 553 projects from the upper surface of the other end of the pressing part 568.

The advantages of this structure will be described below.

Figure 69:
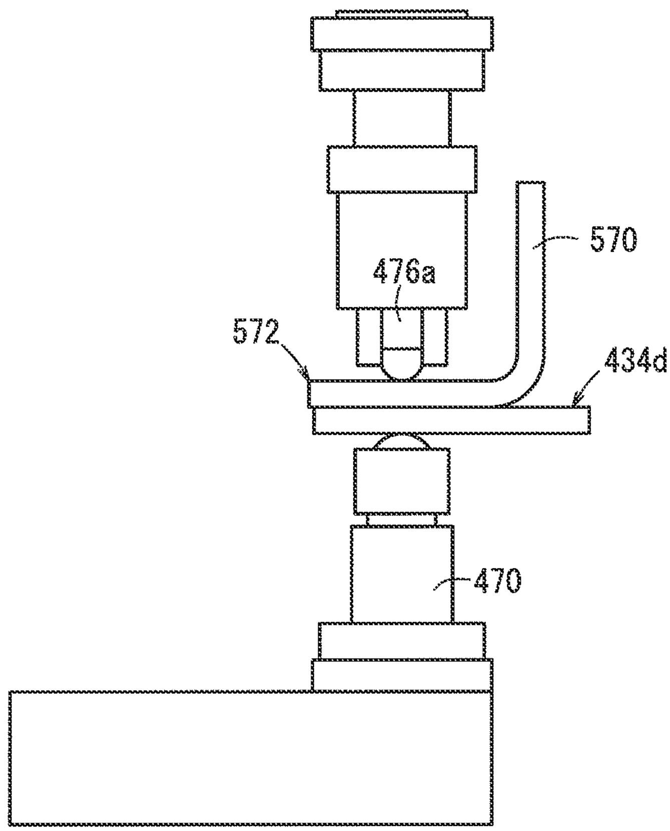
FIG. 69 is a side view of essential features showing a stacked body containing a workpiece having a vertical wall in a welding process.
Figure 70:
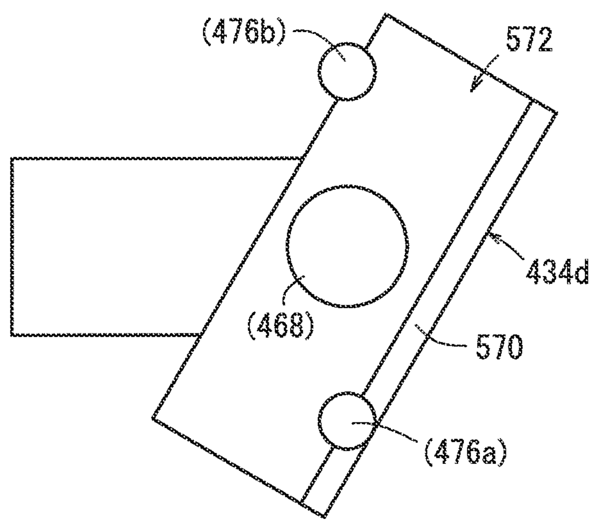
FIG. 70 is a plan view of the stacked body in the state of FIG. 69.

For example, there is a case where a stacked body 434*d* shown in FIG. 69, which contains a shaped workpiece 572 having a vertical wall 570, has to be welded at an angle of FIG. 70. In this case, as is clear from FIG. 70, when only the upper tip 468 and the auxiliary electrodes 476*a*, 476*b* are used, the auxiliary electrode 476*a* may interfere with the vertical wall 570, and the auxiliary electrode 476*b* may be insufficiently contacted with the stacked body 434*d*, disadvantageously.

In contrast, the upper support tip 550, the support pressing members 552*a*, 552*b*, and the lower support tip 553 are used in this embodiment. Therefore, by appropriately controlling the lengths of the pressing parts 562, 564, 566, 568, etc. as shown in FIG. 68, the support pressing member 552*a* can be prevented from interfering with the vertical wall 570, and the support pressing member 552*b* can be sufficiently contacted with the stacked body 434*d*.

In the case of using the indirect feeding type welding apparatus for welding the stacked body 434*a* (see FIG. 67), the first open/close bracket 560 and the second open/close bracket 567 are closed, whereby the upper support tip 550, the support pressing members 552*a*, 552*b*, and the lower support tip 553 are located in the vicinity of the welding position. Thereafter, the gun arm 462 is closed by the open/close cylinder 464 in the same manner as above, so that the upper tip 468 and the lower tip 470 are moved close to each other. Consequently, the upper tip 468 and the lower tip 470 are brought into contact with the upper surfaces of one ends of the pressing parts 564, 568.

Meanwhile, the actuators 556*a*, 556*b* are driven by the gun controller, whereby the auxiliary electrodes 476*a*, 476*b* are lowered toward the stacked body 434*a*. The auxiliary electrodes 476*a*, 476*b* are brought into contact with the upper surfaces of one ends of the pressing parts 562, 566. The auxiliary electrodes 476*a*, 476*b* may be contacted with the pressing parts 562, 566 before, at the same time as, or after the contact of the upper tip 468 and the lower tip 470 with the pressing parts 564, 568.

Of course, the thrust forces of the actuators 556*a*, 556*b* and the driving force of the open/close cylinder 464 are controlled such that the total pressing force (F1'+F2'+F3') of the upper tip 468 and the auxiliary electrodes 476*a*, 476*b* against the metallic plate 504*a* is well balanced with the pressing force (F4') of the lower support tip 553 against the metallic plate 500*a*. By this control, the total pressing force (F1'+F2'+F3') applied to the stacked body 434*a* in the arrow Y1 direction is made approximately equal to the pressing force (F4') applied to the stacked body 434*a* in the direction of the arrow Y2. Consequently, a pressing force distribution equal to that of FIGS. 48 and 49 is achieved.

After the pressing force distribution is achieved, the gun controller 506 sends a control signal to the power source 450. When the power source 450 receives the control signal, the power source 450 acts to supply a welding current. The welding current flows from the upper electrode 444 connected to the positive terminal, through the lower electrode 442, to the negative terminal.

Figure 71:
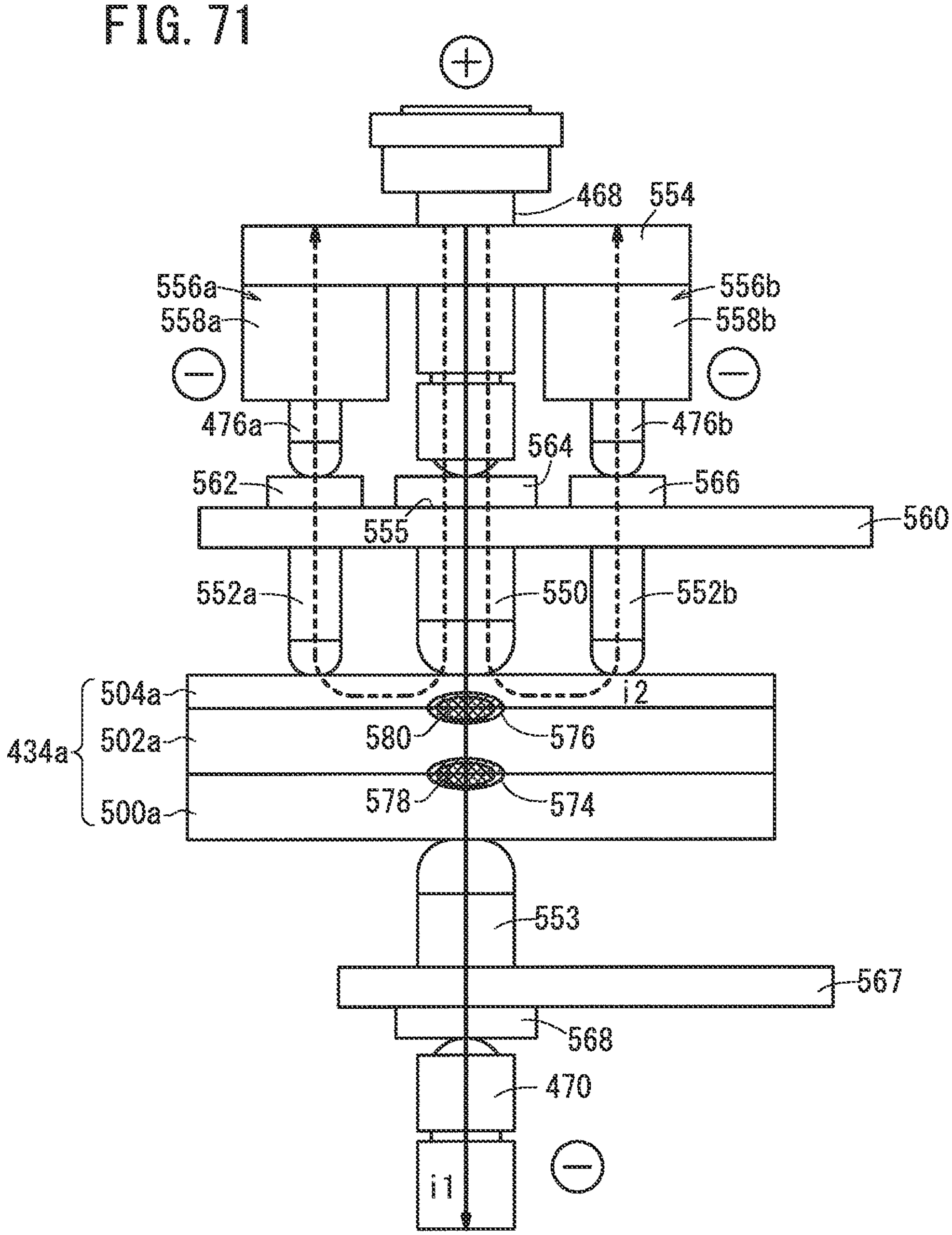
FIG. 71 is a front view of essential features showing current pathways in the state of FIG. 67.

The welding current flows from the upper electrode 444, through the conductive terminal 452*a*, the lead 492, the upper tip 468, the pressing part 564, and the upper support tip 550, to the metallic plate 504*a*. Furthermore, the current is transferred through the metallic plates 502*a*, 500*a*, the lower support tip 553, and the pressing part 568, to the lower tip 470. At the same time, a current flows through the metallic plate 504*a*, the support pressing members 552*a*, 552*b*, and the pressing parts 562, 566, to the auxiliary electrodes 476*a*, 476*b*. Thus, as shown in FIG. 71, a current i1 flows in the direction from the upper support tip 550 (the upper tip 468) to the lower support tip 553 (the lower tip 470), and a branching current i2 flows in the direction from the upper support tip 550 (the upper tip 468) to the support pressing members 552*a*, 552*b* (the auxiliary electrodes 476*a*, 476*b*).

The metallic plates 500*a*, 502*a* and the metallic plates 502*a*, 504*a* are heated by Joule heating generated due to the current i1 and the branching current i2, whereby heated regions 574, 576 are formed respectively.

Also in this case, a sufficiently large amount of Joule heating is generated in the vicinity of the contact surface between the metallic plates 504*a*, 502*a*. This is because the contact area between the metallic plates 504*a*, 502*a* is smaller (i.e. the contact resistance is higher) in this case as compared with the case of using only the upper tip 468 and the lower tip 470 for gripping the stacked body 434*a* (see FIG. 51). Consequently, a nugget 578 in the vicinity of the contact surface between the metallic plates 500*a*, 502*a* and a nugget 580 in the vicinity of the contact surface between the metallic plates 502*a*, 504*a* are grown to approximately the same size.

After the completion of the welding, the gun arm 462 is opened, whereby the upper tip 468, the auxiliary electrodes 476*a*, 476*b*, and the lower tip 470 are separated from the upper support tip 550, the support pressing members 552*a*, 552*b*, and the lower support tip 553 respectively. Furthermore, the first open/close bracket 560 and the second open/close bracket 567 are opened, whereby the upper support tip 550, the support pressing members 552*a*, 552*b*, and the lower support tip 553 are separated from the stacked body 434*a*. The upper support tip 550, the support pressing members 552*a*, 552*b*, and the lower support tip 553, separated from the stacked body 434*a*, may be returned to the original positions by a coil spring or the like.

Also in this embodiment, only the upper tip 468 and the lower tip 470 may be energized in the welding, while the electric power is not supplied to the support pressing members 552*a*, 552*b*. In this case, for example, the support pressing members 552*a*, 552*b* may be composed of an insulator, and the auxiliary electrodes 476*a*, 476*b* may be electrically inactivated.

Figure 72:
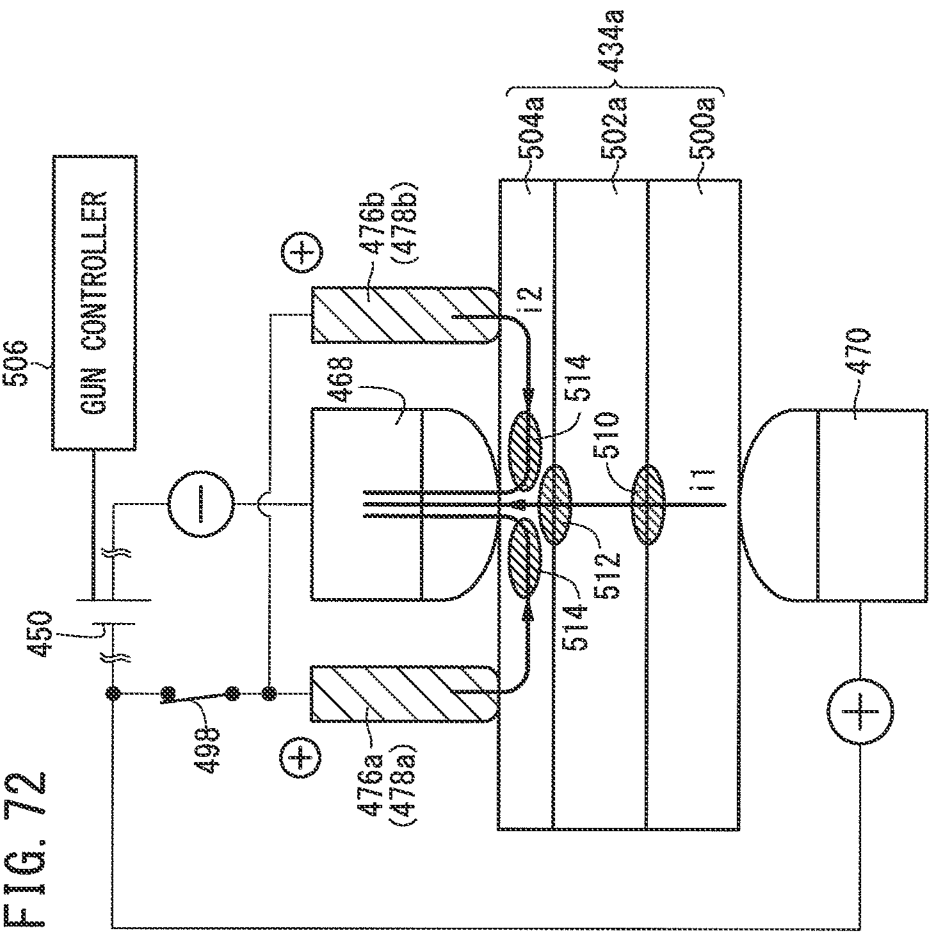
FIG. 72 is a schematic vertical cross-sectional view of the stacked body where a current flows from the lower tip and the auxiliary electrodes to the upper tip in the direction opposite to that of FIG. 52.

In the fourth and fifth embodiments, the current flows in the direction from the upper tip 468 on the metallic plate 504*a* to the lower tip 470 on the metallic plate 500*a*. However, the current may flow in the opposite direction as shown in FIG. 72. Also in this case, the auxiliary electrodes 476*a*, 476*b* on the metallic plate 504*a* have polarities opposite to that of the upper tip 468. Thus, the lower electrode 442 is electrically connected to the positive terminal of the power source 450, whereby the lower tip 470 and the auxiliary electrodes 476*a*, 476*b* have a positive (+) polarity. On the other hand, the upper electrode 444 is electrically connected to the negative terminal of the power source 450, whereby the upper tip 468 has a negative (−) polarity. Consequently, the current i1 flows from the lower tip 470 to the upper tip 468, and the branching current i2 flows from the auxiliary electrodes 476*a*, 476*b* to the upper tip 468.

Of course, also in the case of using the upper support tip 550 and the support pressing members 552*a*, 552*b* (see FIGS. 67 and 71), the current may flow from the support pressing members 552*a*, 552*b* to the upper support tip 550.

Figure 73:
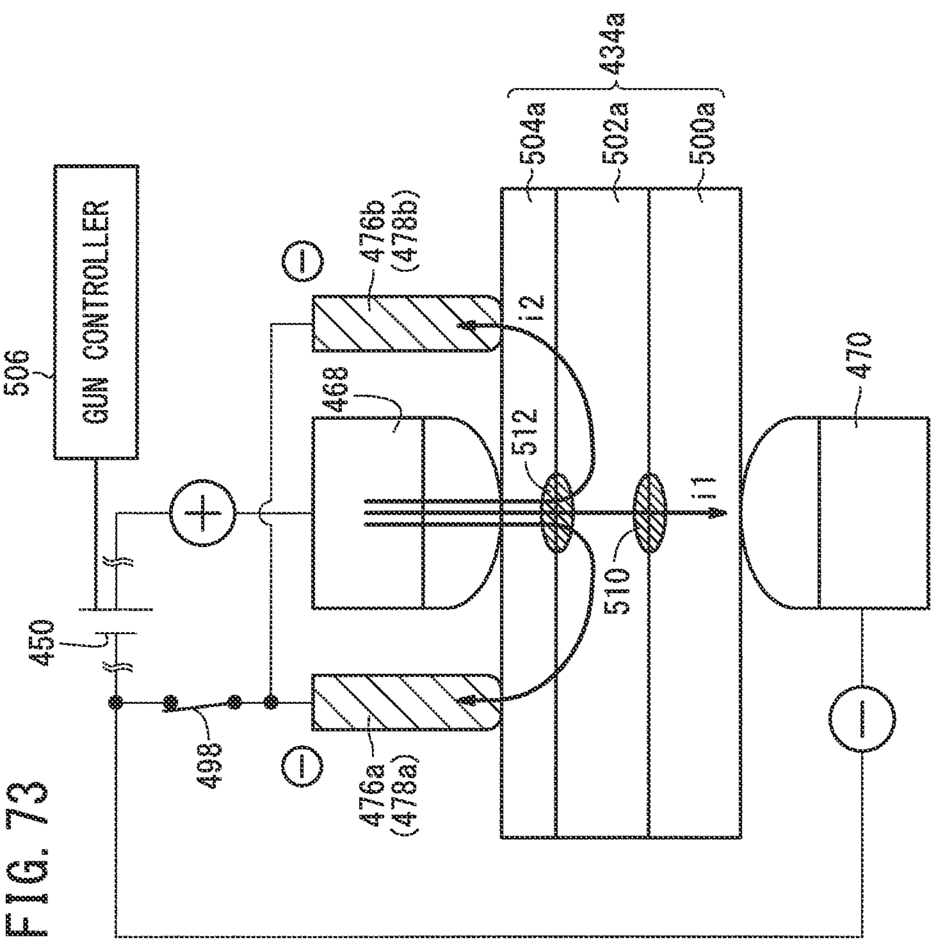
FIG. 73 is a schematic vertical cross-sectional view of a current flow from the upper tip to the auxiliary electrodes through the uppermost workpiece and the workpiece located immediately beneath the uppermost workpiece in the stacked body.
Figure 74:
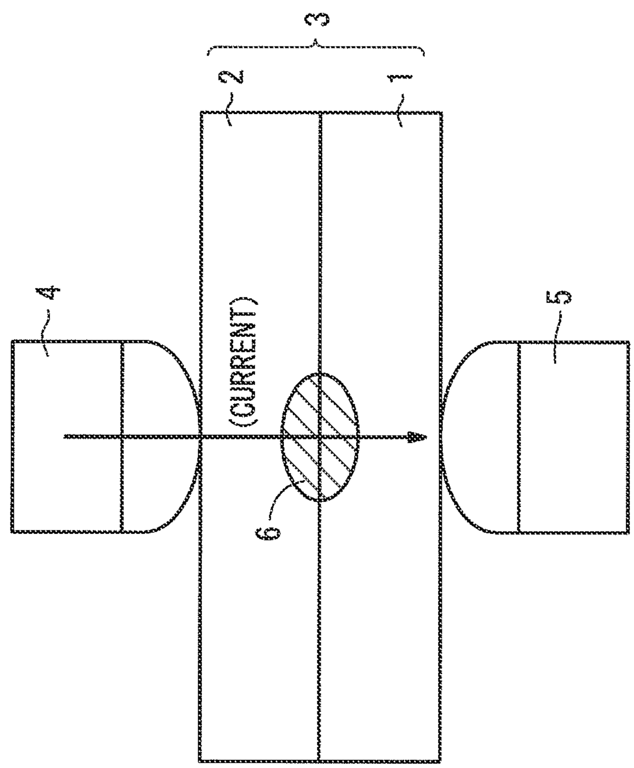
FIG. 74 is a schematic vertical cross-sectional view of a stacked body, gripped only by a lower tip and an upper tip, in the process of generating a current flow from the upper tip to the lower tip in a conventional spot welding method.

As shown in FIG. 73, the branching current i2 may flow not only in the metallic plate 504*a* in contact with the upper tip 468 but also in the metallic plate 502*a* located immediately beneath the metallic plate 504*a*.

Even after the energization from the upper tip 468 to the auxiliary electrodes 476*a*, 476*b* or from the upper support tip 550 to the support pressing members 552*a*, 552*b* is stopped, the stacked body may be continuously pressed by the auxiliary electrodes 476*a*, 476*b* or the support pressing members 552*a*, 552*b*. In this case, for example, the increased contact area is maintained between the metallic plates 502*a*, 504*a*. Therefore, the nugget between the metallic plates 502*a*, 504*a* can be readily grown even under the current i1 flow.

In any case, the auxiliary electrode is not particularly limited to the above-described two auxiliary electrodes 476*a*, 476*b* having the long rod shape. For example, one, three, or more long rods may be used as the auxiliary electrodes. In the case of using three or more auxiliary electrodes, a plurality of the auxiliary electrodes may be contacted with and separated from the outermost metallic plate at the same time in the same manner as with the two auxiliary electrodes. Each auxiliary electrode may have a ring shape surrounding the lower tip 470 or the upper tip 468.

The invention claimed is:

1. A spot welding apparatus for spot welding a stacked body of a plurality of workpieces including a first outermost workpiece and a second outermost workpiece, comprising:

a first welding tip configured to contact the first outermost workpiece and a second welding tip configured to contact the second outermost workpiece, the stacked body being interposed between the first welding tip and the second welding tip, a pressing member configured to be disposed only on a side of the first outermost workpiece of the stacked body, among the side of the first outermost workpiece and a side of the second outermost workpiece of the stacked body, the pressing member configured to contact only the first outermost workpiece, among the first and second outermost workpieces, to press the stacked body, the first welding tip and the pressing member being brought into contact with different portions of the first outermost workpiece, the first outermost workpiece being a thinnest workpiece among the plurality of workpieces, the different portions of the first outermost workpiece into which the first welding tip and the pressing member are brought into contact oppose a portion of the second outermost workpiece, the second outermost workpiece spanning an area that includes and extends beyond said portion, a holder configured to hold the first welding tip and the pressing member, a holder displacement mechanism configured to displace the holder toward and away from the second welding tip so as to relatively displace the first welding tip and the pressing member relative to the second welding tip, and wherein the holder has a bore, a sleeve is inserted into the bore, and a bearing is inserted into the sleeve, wherein an air cylinder is provided in the sleeve in the holder for displacing the pressing member, the air cylinder comprising a piston rod connected to the pressing member at one end, and a piston connected to another end of the piston rod, the piston being in sliding contact with the sleeve, and the sleeve having an insulating property so that the piston is electrically isolated from the holder, wherein a coil spring is provided with one end stopped by an upper end surface of the bearing and another end seated on a lower end surface of the piston, wherein the piston rod extends through the bearing and the coil spring, wherein an air supply and discharge mechanism is configured to supply air to the holder and to discharge air from the holder, wherein the piston is pressed when air is supplied to the holder by the air supply and discharge mechanism, and wherein the air cylinder is configured to displace the pressing member relative to the holder independently from the first welding tip and the second welding tip.

2. The spot welding apparatus according to claim 1, wherein a second welding tip displacement mechanism is provided to relatively displace the second welding tip toward and away from the first welding tip.

3. A spot welding apparatus for spot welding a stacked body of a plurality of workpieces including a first outermost workpiece and a second outermost workpiece, comprising:

a first welding tip configured to contact the first outermost workpiece and a second welding tip configured to contact the second outermost workpiece, the stacked body being interposed between the first welding tip and the second welding tip, a pressing member configured to be disposed only on a side of the first outermost workpiece of the stacked body, among the side of the first outermost workpiece and a side of the second outermost workpiece of the stacked body, the pressing member configured to contact only the first outermost workpiece, among the first and second outermost workpieces, to press the stacked body, the first welding tip and the pressing member being brought into contact with different portions of the first outermost workpiece, the first outermost workpiece being a thinnest workpiece among the plurality of workpieces, the different portions of the first outermost workpiece into which the first welding tip and the pressing member are brought into contact oppose a portion of the second outermost workpiece, the second outermost workpiece spanning an area that includes and extends beyond said portion, a holder configured to hold the first welding tip and the pressing member, a holder displacement mechanism configured to displace the holder toward and away from the second welding tip so as to relatively displace the first welding tip and the pressing member relative to the second welding tip, and wherein the holder has a bore, a sleeve is inserted into the bore, and a bearing is inserted into the sleeve, wherein an air cylinder is provided in the sleeve in the holder for displacing the pressing member, the air cylinder comprising a piston rod connected to the pressing member at one end, and a piston connected to another end of the piston rod, the piston being in sliding contact with the sleeve, and the sleeve having an insulating property so that the piston is electrically isolated from the holder, wherein a coil spring is provided with one end stopped by an upper end surface of the bearing and another end seated on a lower end surface of the piston, wherein the piston rod extends through the bearing and the coil spring, wherein an air supply and discharge mechanism is configured to supply air to the holder and to discharge air from the holder, wherein the piston is pressed when air is supplied to the holder by the air supply and discharge mechanism, wherein the air cylinder is configured to displace the pressing member relative to the holder independently from the first welding tip and the second welding tip, and wherein the pressing member acts as an auxiliary electrode, the auxiliary electrode has a polarity opposite to that of the first welding tip, and a branching current is made to flow either from the first welding tip to the auxiliary electrode, or from the auxiliary electrode to the first welding tip, when electric current is conducted between the first welding tip and the second welding tip.

4. The spot welding apparatus according to claim 3, further comprising another auxiliary electrode disposed in a vicinity of the second welding tip, wherein the other auxiliary electrode has a polarity opposite to that of the second welding tip, and after the branching current from the first welding tip to the auxiliary electrode or from the auxiliary electrode to the first welding tip has vanished, another branching current flows from the other auxiliary electrode to the second welding tip or from the second welding tip to the other auxiliary electrode.

5. The spot welding apparatus according to claim 3, wherein a second welding tip displacement mechanism is provided to relatively displace the second welding tip toward and away from the first welding tip.

* * * * *